United States Patent [19]
Togai et al.

[11] Patent Number: 5,687,692
[45] Date of Patent: Nov. 18, 1997

[54] COMBUSTION STATE DETERMINATION METHOD OF INTERNAL COMBUSTION ENGINE, AS WELL AS COMBUSTION STATE CONTROL METHOD AND COMBUSTION STATE CONTROL SYSTEM FOR INTERNAL COMBUSTION ENGINE

[75] Inventors: Kazuhide Togai; Osamu Hirako; Shogo Omori, all of Tokyo, Japan

[73] Assignee: Mitsubishi Jidosha Kogyo Kabushiki Kaisha, Tokyo, Japan

[21] Appl. No.: 505,248

[22] PCT Filed: Dec. 20, 1994

[86] PCT No.: PCT/JP94/02154

§ 371 Date: Sep. 14, 1995

§ 102(e) Date: Sep. 14, 1995

[87] PCT Pub. No.: WO95/17592

PCT Pub. Date: Jun. 29, 1995

[30] Foreign Application Priority Data

Dec. 21, 1993 [JP] Japan .................... 5-322212
Dec. 22, 1993 [JP] Japan .................... 5-323546
Apr. 8, 1994 [JP] Japan .................... 6-070765

[51] Int. Cl.$^6$ .................................................. F02D 45/00
[52] U.S. Cl. ........................................ 123/436; 73/117.3
[58] Field of Search ................................ 123/419, 436; 73/117.3, 116

[56] References Cited

U.S. PATENT DOCUMENTS

| | | | |
|---|---|---|---|
| 3,789,816 | 2/1974 | Taplin et al. | 123/436 X |
| 4,112,879 | 9/1978 | Assenheimer et al. | 123/493 X |
| 4,188,920 | 2/1980 | Bianchi et al. | 123/436 |
| 4,197,767 | 4/1980 | Leung | 123/436 X |
| 4,930,479 | 6/1990 | Osawa et al. | 123/436 |
| 5,016,591 | 5/1991 | Nanyoshi et al. | 123/436 X |
| 5,035,220 | 7/1991 | Uchinami et al. | 123/436 |
| 5,044,195 | 9/1991 | James et al. | 73/117.3 |
| 5,109,695 | 5/1992 | James et al. | 73/117.3 |
| 5,222,392 | 6/1993 | Baba et al. | 73/116 |
| 5,237,862 | 8/1993 | Mangrulkar et al. | 73/116 |
| 5,503,007 | 4/1996 | Plee et al. | 73/117.3 |

FOREIGN PATENT DOCUMENTS

| | | |
|---|---|---|
| 62-223424 | 10/1987 | Japan . |
| 63-113160 | 5/1988 | Japan . |
| 63-140839 | 6/1988 | Japan . |
| 63-306250 | 12/1988 | Japan . |
| 2-227534 | 9/1990 | Japan . |
| 3-182650 | 8/1991 | Japan . |
| 4-81548 | 3/1992 | Japan . |
| 4-109062 | 4/1992 | Japan . |
| 4-224258 | 8/1992 | Japan . |
| 5-52707 | 3/1993 | Japan . |
| 5-71401 | 3/1993 | Japan . |
| 5-187302 | 7/1993 | Japan . |

Primary Examiner—Tony M. Argenbright

[57] ABSTRACT

A combustion control system for a lean-burn engine, to be mounted on an automotive vehicle, uses probabilistic and statistical nature of combustion variance upon lean-burn operation to obtain reliable combustion control. The system detects a variance value in angular acceleration of a rotating member driven by the engine, normalizes the variance value in accordance with an operating state of the engine to determine a normalized variance value. The system also compares the normalized variance value with a predetermined threshold value to obtain a deteriorated combustion determining value. The system compares the deteriorated combustion determining value with a predetermined reference value and controls a combustion variance adjustment element so that the deteriorated combustion determining value matches the reference value.

16 Claims, 23 Drawing Sheets

5,687,692

COMBUSTION STATE DETERMINATION METHOD OF INTERNAL COMBUSTION ENGINE, AS WELL AS COMBUSTION STATE CONTROL METHOD AND COMBUSTION STATE CONTROL SYSTEM FOR INTERNAL COMBUSTION ENGINE

TECHNICAL FIELD

This invention relates to a combustion state determination method of an internal combustion engine and also to a combustion state control method and combustion state control system for an internal combustion engine, which are suited for use with a lean-burn internal combustion engine which performs a lean-burn operation at an air-fuel ratio on a side leaner than a stoichiometric air/fuel ratio under predetermined operation conditions.

BACKGROUND ART

Lean-burn internal combustion engines (i.e., so-called lean-burn engines) have been provided in recent years, which perform a lean-burn operation at an air/fuel ratio on a side leaner than a stoichiometric air/fuel ratio under predetermined operation conditions.

When a lean burn is performed by making leaner the air/fuel ratio of an air-fuel mixture to be fed to an engine, the production of NOx in this lean-burn range is known to generally decrease to a substantial extent by the above-mentioned leaning as illustrated in FIG. 29. From the view point of decreasing NOx, it is therefore effective to operate an engine by setting the air/fuel ratio still closer toward a lean limit.

In such lean-burn engines, the air/fuel ratio is accordingly set as high as possible (in other words, an air-fuel mixture is set as lean as possible) during a lean-burn operation so that the emission of NOx can be decreased. The value of the air/fuel ratio is generally set close to a limit (lean limit) within which the air-fuel mixture can undergo stable combustion.

By performing such a lean-burn operation, it is possible to significantly improve the gas mileage while suppressing the emission of NOx.

To perform a lean-burn operation, it is the common practice to control the state of combustion by a control system. It has been reported in articles and the like to estimate an engine torque from an angular acceleration of a crankshaft in such control.

However, these estimations are performed moment by moment by using varying momentary values. It has not been contemplated to perform stable and precise control at predetermined intervals while taking into consideration the probabilistic and statistical nature of engine torque Pi.

Further, as is depicted in FIG. 27, combustion variance in an engine varies from one cylinder to another. This variation is caused by a variation in air/fuel ratio, which in turn takes place due to a variation or variations in the shape of an injector or an intake pipe, valving timing, and/or the like.

With the foregoing in view, the state of combustion in a lean-burn operation is therefore controlled in relation to the air/fuel ratio of the cylinder that is undergoing the greatest combustion variance.

Such an approach is, however, accompanied by the problem that no operation is feasible at a limit air/fuel ratio in a cylinder or cylinders of a relatively small combustion variance.

With the foregoing problem in view, the present invention has as a first object the provision of a combustion state determination method of an engine as well as a combustion state control method and combustion state control system for an engine, which in a lean-burn operation, takes into account the probabilistic and statistical nature of combustion variance and makes it possible to perform sure combustion control, especially sure combustion control with respect to each of cylinders.

Incidentally, when lean-burn control is performed based on the level of a combustion variance, a variance equal to or greater than a predetermined level is taken as deterioration in the state of combustion so that the fuel injection quantity or the like is controlled to shift the air/fuel ratio toward a rich side.

When such a control method is performed by estimating a combustion variance from a revolution variance of an engine, there is the potential problem that because of the possibility of occurrence of a large revolution variance upon rough road running too, corrective control may be performed excessively toward the rich side.

With the foregoing problem in view, the present invention has as a second object the provision of a combustion state control system for an engine, which in a lean-burn operation, takes into account the probabilistic and statistical nature of combustion variance and makes it possible to perform appropriate control even when running on a rough road.

On the other hand, performance of a lean-burn operation makes it possible to suppress the emission of NOx and also to substantially improve the gas mileage. To decrease the emission of NOx, a three-way catalyst or the like is employed so that the fuel injection quantity may be controlled to use the catalyst at a maximum efficiency.

Used for this fuel injection quantity control is a method which comprises detecting the composition of combustion gas by an air/fuel ratio sensor (A/F sensor) and correcting the quantity of fuel to be injected.

The air/fuel ratio sensor is generally arranged in an exhaust pipe manifold and can therefore detect only an average air/fuel ratio of individual cylinders. Accordingly, the fuel injection quantity is controlled based on the average air/fuel ratio.

Here, flow rates of injectors in a multicylinder internal combustion engine vary in characteristics as shown in FIG. 28. Namely, fuel injection pulse widths and errors in flow rate are plotted along the abscissa and the ordinate, respectively, in FIG. 28, whereby injection characteristics of injectors selected at will, especially, the injection quantities of the individual injectors are illustrated in comparison with each other. As is shown in FIG. 28, the existence of errors as much as 2–3% is appreciated.

This error in the injection characteristics also tends to be amplified by a configurational error in the proximity of a corresponding valve seat in addition to a variation in the drive of an associated injector valve.

Moreover, by variations in inducted air quantity among cylinders due to the arrangement of intake pipes, variations in inducted air between banks due to variations in the open/close timing of intake valves, and the like, the air/fuel ratios of the individual cylinders are distributed within a certain width centered around the stoichiometric air/fuel ratio. (See FIG. 27).

Accordingly, it is difficult for conventional control means to operate all the cylinders at a maximum efficiency of the catalyst.

It may hence be contemplated to independently conduct air/fuel ratio feedback control with respect to each of the cylinders. As a technique having possible adoptability as such control means, it is contemplated to control the injection quantity by using revolution variance of each cylinder as disclosed, for example, in Japanese Patent Application Laid-Open (Kokai) No. HEI 2-227534.

To detect variance among the individual cylinders during a stoichiometric operation, it is necessary to make the internal combustion engine undergo an idling operation of extremely low rpm or the like. It is therefore difficult to detect such variance during a normal operation.

With the foregoing problem in view, the present invention has as a third object the provision of a combustion control method and combustion control system for an internal combustion engine, which makes it possible to perform sure combustion control cylinder by cylinder even during an operation at a stoichiometric air/fuel ratio by using revolution variance during a lean-burn operation.

SUMMARY OF THE INVENTION

Accordingly, a method according to the present invention for the determination of a state of combustion in an engine comprises: a first step of detecting a variance value in angular acceleration of a rotating shaft driven by the engine; a second step of normalizing the variance value in accordance with a state of operation of the engine to obtain a normalized variance value; and a third step of comparing said normalized variance value with a predetermined threshold to determine a state of deterioration in combustion. By the method, the variance value in the angular acceleration of the rotating shaft driven by the engine is detected, the variance value is normalized in accordance with the state of operation of the engine to obtain the normalized variance value, and the normalized variance value is compared with the predetermined threshold to determine the state of deterioration in combustion. According to this engine combustion state determining method, the state of combustion can be controlled in accordance with the state of operation of the engine, leading to the advantage that a lean limit operation can be performed in a broader operation range.

The engine combustion state determining method is further characterized in that the predetermined threshold is updated corresponding to the state of operation of the engine. By this method, the predetermined threshold is updated corresponding to the state of operation of the engine. According to this engine combustion state determining method, the combustion state can be controlled corresponding to the state of operation of the engine, leading to the advantage that a lean limit operation can be performed in a broader operation range.

The engine combustion state determining method is further characterized in that the determination of the state of deterioration in combustion is conducted by detecting a state in which the normalized variance value is smaller than the predetermined threshold. By this method, the determination of the state of deterioration in combustion is performed by detecting a state in which the normalized variance value is smaller than the predetermined threshold. According to this engine combustion state determining method, the state of combustion can be controlled corresponding to the state of operation of the engine, leading to the advantage that a lean limit operation can be performed in a broader operation range.

The engine combustion state determining method is further characterized in that the first step comprises the following steps: determining an angular acceleration of the rotating shaft; determining a smoothed value of the angular acceleration; and determining a variance value from the difference between the angular acceleration and the smoothed value. By this method, the variance value in the angular acceleration of the rotating shaft driven by the engine is detected by determining the angular acceleration of the rotating shaft, obtaining the smoothed value of the angular acceleration and determining the variance value from the difference between the angular acceleration and the smoothed value. According to this engine combustion state determining method, the state of combustion can be controlled corresponding to statistical characteristics of the state of operation of the engine, leading to the advantage that a lean limit operation can be surely performed in a broader operation range.

Another engine combustion state controlling method, comprises: a first step of detecting a variance value in angular acceleration of a rotating shaft driven by the engine; a second step of normalizing the variance value in accordance with a state of operation of the engine to obtain a normalized variance value; a third step of comparing the normalized variance value with a predetermined threshold to set a deteriorated combustion determining value; and a fourth step of comparing the deteriorated combustion determining value with a predetermined reference value and controlling a combustion variance adjusting element of the engine so that the deteriorated combustion determining value approaches toward the reference value. By this method, the variance value in the angular acceleration of the rotating shaft driven by the engine is detected, the variance value is normalized in accordance with the state of operation of the engine to obtain the normalized variance value, and the normalized variance value and the predetermined threshold are compared to set the deteriorated combustion determining value. Further, the deteriorated combustion determining value is compared with the predetermined reference value, and the combustion variance adjusting element of the engine is controlled so that the deteriorated combustion determining value approaches toward the reference value. According to this engine combustion state controlling method, the state of combustion can be controlled corresponding to the statistical characteristics of the state of operation of the engine, leading to the advantage that a lean limit operation can be surely performed in a broader operation range.

The engine combustion state controlling method is further characterized in that an upper limit reference value and a lower limit reference value are provided as the reference value, and said fourth step comprises controlling the combustion variance adjusting element of the engine so that said deteriorated combustion determining value falls between the upper limit reference value and the lower limit reference value. By this method, the upper limit reference value and the lower limit reference value are provided as reference values, and the combustion variance adjusting element of the engine is controlled so that the deteriorated combustion determining value falls between the upper limit reference value and the lower limit reference value. According to this engine combustion state controlling method, the state of combustion can be controlled corresponding to the statistical characteristics of the state of operation of the engine, leading to the advantage that a lean limit operation can be surely performed in a broader operation range. Moreover, there is also the advantage that a limit cycle which may occur due to a computing error or the like can be surely avoided.

The engine combustion state controlling method is further characterized in that the predetermined threshold is updated corresponding to the state of operation of the engine. By this method, the predetermined threshold is also updated corresponding to the state of operation of the engine in this case. According to this engine combustion state controlling method, the state of combustion can be controlled corresponding to the statistical characteristics of the state of operation of the engine, leading to the advantage that a lean limit operation can be surely performed in a broader operation range.

The engine combustion state controlling method is further characterized in that the deteriorated combustion determining value is obtained by cumulating deterioration quantities of combustions in each of which the normalized variance value is smaller by the corresponding deterioration quantity than the predetermined threshold. By this method, the deteriorated combustion determining value is obtained by cumulating deterioration quantities of combustions in each of which the normalized variance value is smaller by the corresponding deterioration quantity than the predetermined threshold. According to this engine combustion state controlling method, the state of combustion can be controlled corresponding to the statistical characteristics of the state of operation of the engine, leading to the advantage that a lean limit operation can be surely performed in a broader operation range. In addition, there is also the advantage that the state of deteriorated combustion can be quantitatively ascertained without failure, thereby making it possible to perform surer combustion state control.

The engine combustion state controlling method is further characterized in that the deteriorated combustion determining value is updated every preset number of combustions. By this method, the deteriorated combustion determining value is updated every preset number of combustions. According to this engine combustion state controlling method, the state of combustion can be controlled corresponding to the statistical characteristics of the state of operation of the engine, leading to the advantage that a lean limit operation can be surely performed in a broader operation range. In addition, there is also the advantage that the state of deteriorated combustion can be quantitatively ascertained without failure, thereby making it possible to perform surer combustion state control.

Another engine combustion state controlling method is further characterized in that a misfire determining reference value is set on a combustion deteriorated side of the reference value, and the method further comprises a fifth step of determining a misfire on the basis of a change of the deteriorated combustion determining value beyond the misfire determining reference value toward the deteriorated combustion side. By this method, the misfire determining reference value is set on the combustion deteriorated side of the reference value and a misfire is determined on the basis of a change of the deteriorated combustion determining value beyond the misfire determining reference value toward the deteriorated combustion side. According to this engine combustion state controlling method, the state of combustion can be controlled corresponding to the statistical characteristics of the state of operation of the engine, leading to the advantage that a lean limit operation can be surely performed in a broader operation range. Moreover, there is also the advantage that a misfire can be prevented, thereby making it possible to perform surer combustion state control.

Another engine combustion state controlling system is characterized in that in an engine operable at an air/fuel ratio leaner than a stoichiometric air/fuel ratio, the system comprises: variance detecting means for detecting a variance value in an angular acceleration of a rotating shaft driven by the engine; normalized variance value determining means for normalizing the variance value, which has been detected by the variance detecting means, in accordance with a state of operation of the engine to determine a normalized variance value; deteriorated combustion determining value calculating means for comparing the normalized variance value with a predetermined threshold to obtain a deteriorated combustion determining value; and combustion state controlling means for referring to the deteriorated combustion determining value, comparing the same with a predetermined reference value and controlling a combustion variance adjusting element of the engine so that the deteriorated combustion determining value approaches toward the reference value. By this system, to operate the engine at the air/fuel ratio leaner than the stoichiometric air/fuel ratio, the variance value in the angular acceleration of the rotating shaft driven by the engine is detected by said variance detecting means, the variance value is normalized by said normalized variance value determining means in accordance with the state of operation of the engine to determine the normalized variance value, the normalized variance value is compared with the predetermined threshold to obtain a deteriorated combustion determining value by the deteriorated combustion determining value calculating means, and by said combustion state controlling means, the deteriorated combustion determining value is referred to and is compared with the predetermined reference value so that the combustion variance adjusting element of the engine is controlled to make the deteriorated combustion determining value approach toward the reference value. According to this engine operation state controlling system, the state of combustion can be controlled corresponding to the statistical characteristics of the state of operation of the engine, leading to the advantage that a lean limit operation can be surely performed in a broader operation range.

Another engine combustion state controlling system according to the present invention is characterized in that in an engine operable at an air/fuel ratio leaner than a stoichiometric air/fuel ratio, the system comprises: variance detecting means for detecting a variance value in an angular acceleration of a rotating shaft driven by the engine; normalized variance value determining means for normalizing the variance value, which has been detected by the variance detecting means, in accordance with a state of operation of the engine to determine a normalized variance value; combustion state controlling means for performing leaning control of the air/fuel ratio on the basis of the normalized variance value; rough road determining means for comparing the normalized variance value with a predetermined rough road determining threshold to determine rough road running; and leaning control limiting means for limiting the leaning control of the air/fuel ratio at the combustion state control means on the basis of the results of the determination by the rough road determining means.

By this engine combustion state controlling system, to operate the engine at the air/fuel ratio leaner than the stoichiometric air/fuel ratio, the variance value in the angular acceleration of the rotating shaft driven by the engine is detected by said variance detecting means; the variance value is normalized by said normalized variance value determining means in accordance with the state of operation of the engine to determine the normalized variance value; and by said combustion state controlling means, leaning control of said air/fuel ratio is performed on the basis of the normalized variance value. If rough road running is determined by said rough road determining means as a result of a comparison between the normalized variance value and the predetermined rough road determining threshold, the leaning control of the air/fuel ratio at said combustion state control means is limited by said leaning control limiting means.

According to the above engine combustion state controlling system according to the present invention, the following effects or advantages can be brought about:

(1-1) The state of combustion can be controlled corresponding to the statistical characteristics of the state of operation of the engine so that a lean limit operation can be performed in a broader operation range.

(1-2) A deteriorated combustion state can be quantitatively ascertained without failure, thereby making it possible to perform surer combustion state control.

(1-3) No additional sensor is needed to cope with rough roads, thereby making it possible to perform a lean operation under protection from adverse effects of a rough road without raising the cost.

Another combustion controlling method according to the present invention for the internal combustion engine, the method including detecting, with respect to each cylinder, a revolution variance occurred upon operation of a multicylinder internal combustion engine at an air/fuel ratio on a side leaner than a stoichiometric air/fuel ratio and permitting operation of the internal combustion engine in the vicinity of a lean-burn limit on the basis of the results of the detection, characterized in that the method comprises: a first step of changing a fuel injection quantity so that a combustion variance determined from said revolution variance upon lean-burn operation can be held within a permissible range; a second step of detecting variations in intercylinder air/fuel ratio from the quantity of the change of the fuel injection quantity; and a third step of correcting, based on the results of the detection, an injector drive time upon operation at the stoichiometric air/fuel ratio.

By this combustion controlling method of this invention for the internal combustion engine, the revolution variance occurred upon operation of the multicylinder internal combustion engine at the air/fuel ratio on the side leaner than the stoichiometric air/fuel ratio is detected with respect to each cylinder and on the basis of the results of the detection, the internal combustion engine is operated in the vicinity of the lean-burn limit. In the first step, the fuel injection quantity is changed so that the combustion variance determined from the revolution variance upon lean-burn operation can be held within the permissible range. From the quantity of the change, the variations in intercylinder air/fuel ratio are detected in the second step. Then, based on the results of the detection, the injector drive time upon operation at the stoichiometric air/fuel ratio is corrected in the third step.

According to the above combustion controlling method of this invention for the internal combustion engine, the following effects or advantages can be brought about:

(2-1) The combustion variance limit differs from one cylinder to another because of variations in air/fuel ratio which are in turn caused by variations in flow rate among injectors, variations in configuration among intake pipes and/or shifts in valving timing. Such differences can be surely corrected so that the individual cylinders can all be set at a combustion limit.

(2-2) Differences among the cylinders due to variations in air/fuel ratio, which are in turn caused by variations in flow rate among injectors, variations in configuration among intake pipes and/or shifts in valving timing, can be surely corrected even in an operation at the stoichiometric air/fuel ratio, whereby combustions in the individual cylinders can all be controlled in an ideal state.

(2-3) A three-way catalyst can be used at a maximum efficiency so that cleaning of exhaust gas can be efficiently performed.

(2-4) Owing to the above effects or advantages (2-1) to (2-3), the emission of NOx can be minimized.

(2-5) The detection of revolution variance and the correction and control of variations in the air/fuel ratio for each cylinder can be performed by a single crank angle sensor, thereby making it possible to perform surer lean-burn control and a stoichiometric operation at low cost.

Further, another combustion control system of this invention for the internal combustion engine is characterized in that said system comprises: revolution variance detecting means for detecting, with respect to each cylinder, a revolution variance occurred when the multicylinder internal combustion engine is operated at an air/fuel ratio on a side leaner than a stoichiometric air/fuel ratio; lean-burn limit operation means for operating the internal combustion engine in the vicinity of a lean-burn limit on the basis of the results of the detection by the revolution variance detecting means; fuel injection quantity changing means for changing a fuel injection quantity so that a combustion variance determined from said revolution variance upon lean-burn operation by the lean-burn limit operation means can be held within a permissible range; intercylinder air/fuel ratio variation detecting means for detecting variations in intercylinder air/fuel ratio from the quantity of the change by said fuel injection quantity changing means; and injector drive correction means for correcting, based on the results of the detection by the intercylinder air/fuel ratio variation detecting means, an injector drive time upon operation at the stoichiometric air/fuel ratio.

According to this combustion control system of this invention for the internal combustion engine, the revolution variance occurred when the multicylinder internal combustion engine is operated at the air/fuel ratio on the side leaner than the stoichiometric air/fuel ratio is detected with respect to each cylinder by said revolution variance detecting means, and on the basis of the results of the detection, the internal combustion engine is operated in the vicinity of a lean-burn limit by said lean-burn limit operation means. Then, the fuel injection quantity is changed by said fuel injection quantity changing means so that the combustion variance determined from the revolution variance upon lean-burn operation by said lean-burn limit operation means can be held within the permissible range. From the quantity of the change by said fuel injection quantity changing means, the variations in the air/fuel ratio among the cylinders are detected by said intercylinder air/fuel ratio variation detecting means, and based on the results of the detection, the injector drive time upon operation at the stoichiometric air/fuel ratio is corrected by said injector drive correction means.

According to the above combustion controlling system of this invention for the internal combustion engine, the following effects or advantages can be brought about:

(3-1) The combustion variance limit differs from one cylinder to another because of variations in air/fuel ratio which are in turn caused by variations in flow rate among injectors, variations in configuration among intake pipes and/or shifts in valving timing. Such differences can be surely corrected so that the individual cylinders can all be set at a combustion limit.

(3-2) Differences among the cylinders due to variations in air/fuel ratio, which are in turn caused by variations in flow rate among injectors, variations in configuration among intake pipes and/or shifts in valving timing, can be surely corrected even in an operation at the stoichiometric air/fuel ratio, whereby combustions in the individual cylinders can all be controlled in an ideal state.

(3-3) A three-way catalyst can be used at a maximum efficiency so that cleaning of exhaust gas can be efficiently performed.

(3-4) Owing to the above effects or advantages (3-1) to (3-3), the emission of NOx can be minimized.

(3-5) The detection of revolution variance and the correction and control of variations in the air/fuel ratio for each cylinder can be performed by a single crank angle sensor, thereby making it possible to perform surer lean-burn control and a stoichiometric operation at low cost.

BRIEF DESCRIPTION OF THE DRAWINGS

FIGS. 1 through 15 illustrate, as a first embodiment of the present invention, a combustion state determining method for an internal combustion engine as well as a combustion state controlling method and combustion state controlling system for an internal combustion engine, in which FIG. 1 is a control block diagram, FIG. 2 is an overall construction diagram of an engine system equipped with the combustion state control system, FIG. 3 is a hardware block diagram showing a control system of the engine system equipped with the combustion state control system, FIG. 4 is a flow chart for explaining operation of the combustion state controlling system, FIG.5 is a flow chart for explaining the operation of the combustion state controlling system, FIG. 6 is a waveform diagram for explaining the operation of the combustion state controlling system, FIG. 7 is a correction characteristic map for explaining the operation of the combustion state controlling system, FIG. 8 is a schematic graph for explaining the operation of the combustion state controlling system, FIG. 9 is a schematic graph for explaining the operation of the combustion state controlling system, FIG. 10 is a normalizing characteristic map for explaining the operation of the combustion state controlling system, FIG. 11 is a schematic perspective view showing a revolution variance detector in the combustion state controlling system, and FIGS. 12 to 15 are all diagrams explaining characteristics of combustion variance of an engine;

FIGS. 16 through 21 depict an engine combustion state controlling system according to a second embodiment of the present invention, in which FIG. 16 is its control block diagram, FIG. 17 is a flow chart for explaining its operation, FIG. 18 is a flow chart for explaining its operation, FIG. 19 is a schematic graph showing a controlled characteristic, FIG. 20 is a schematic graph showing the controlled characteristic, and FIG. 21 is a diagram for explaining a large-small relationship between a threshold for determining a rough road and that for determining deteriorated combustion;

FIGS. 22 through 26 show, as a third embodiment of the present invention, a combustion controlling method and combustion controlling system of an internal combustion engine, in which FIG. 22 and FIG. 23 are control block diagrams of a system for practicing the method, and FIGS. 24 to 26 are all flow charts for explaining operation of the system.

BEST MODE FOR CARRYING OUT THE INVENTION

The embodiments of the present invention will hereinafter be described with reference to the drawings.

(a) Description of the first embodiment

Figure 1:
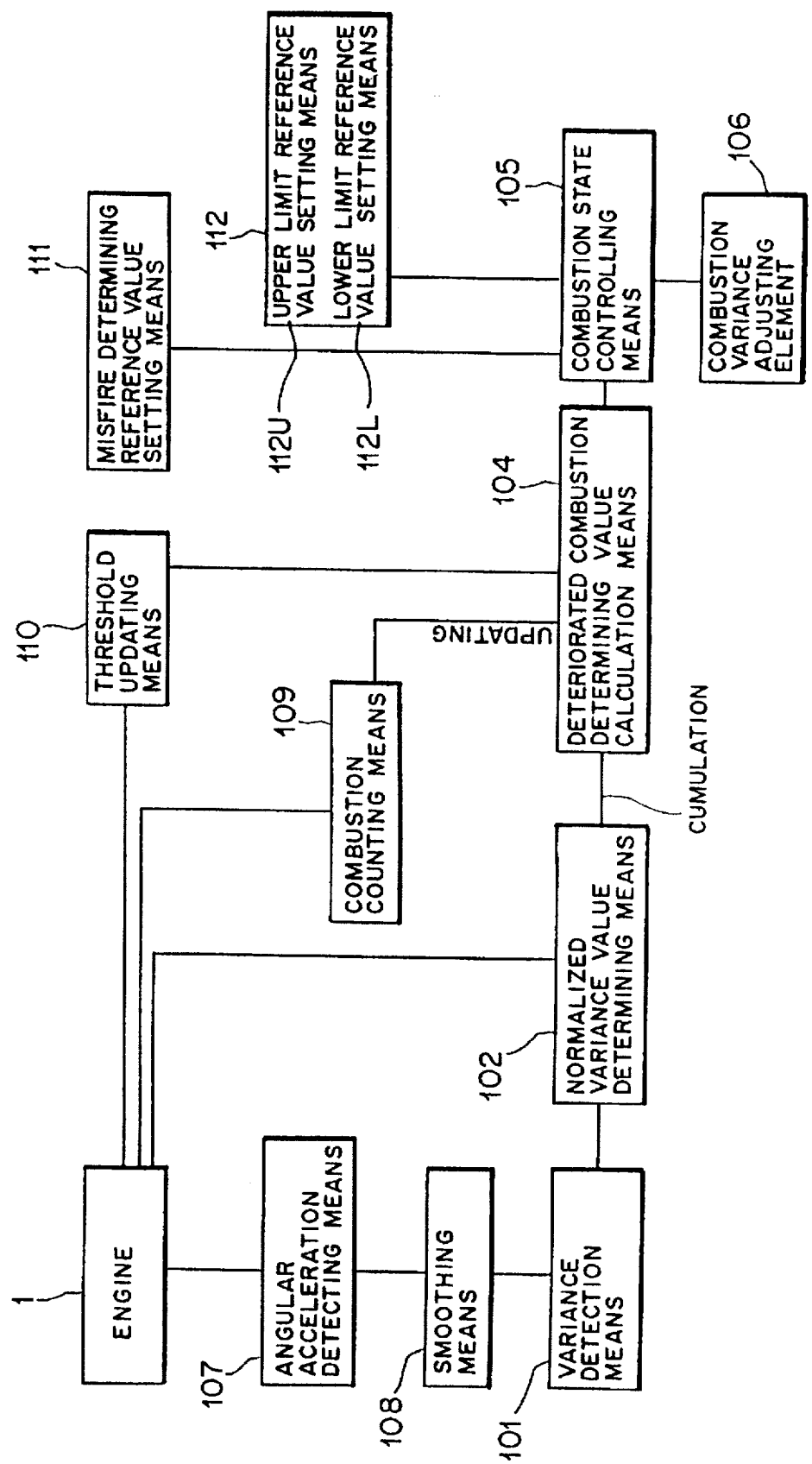
Figure 2:
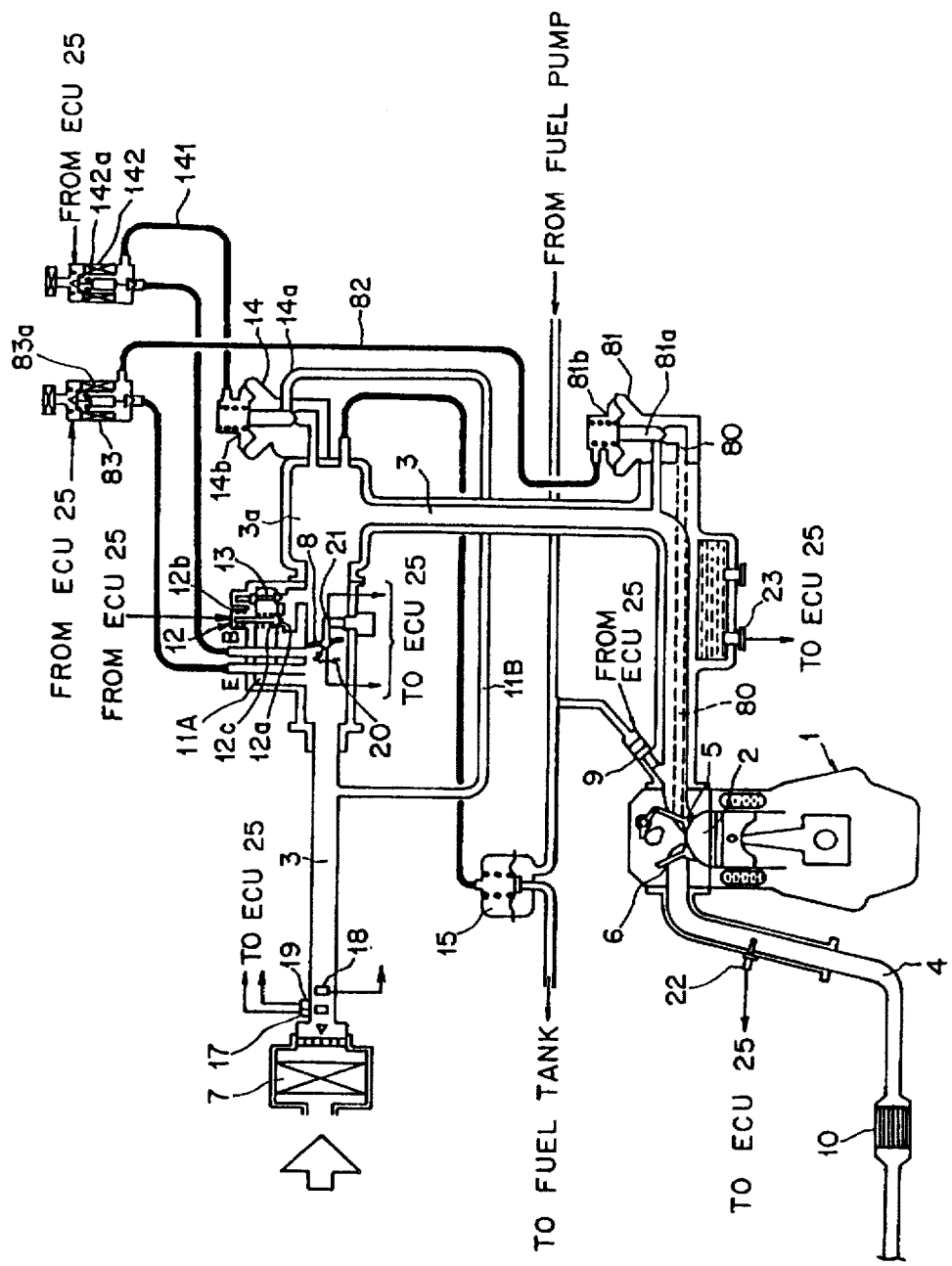

An engine for an automotive vehicle, said engine being equipped with the present control system, is constructed as a lean-burn engine which performs a lean-burn operation at an air/fuel ratio leaner than a stoichiometric air/fuel ration under predetermined operation conditions. One example of such engine is illustrated as shown in FIG. 2. In FIG. 2, the (internal combustion) engine 1 has an intake passage 3 and an exhaust passage 4, both of which are communicated to a combustion chamber 2. The communication between the intake passage 3 and the combustion chamber 2 is controlled by an intake valve 5, while the communication between the exhaust passage 4 and the combustion chamber 2 is controlled by an exhaust valve 6.

The intake passage 3 is provided with an air cleaner 7, a throttle valve 8 and, as fuel feeding means, an electromagnetic fuel injection valve (injector) 9, which are arranged successively from an upstream side of the intake passage 3. The exhaust passage 4, on the other hand, is provided with a three-way catalyst 10 and an unillustrated muffler (noise eliminator) successively from an upstream side of the exhaust passage 4. Incidentally, each cylinder of the engine 1 is provided with its own injector 9. Further, the exhaust passage 3 is provided with a surge tank 3a.

The three-way catalyst 10 is to eliminate CO, HC and NOx while the engine is operated at the stoichiometric air/fuel ratio, and is of a known construction.

The throttle valve 8 is connected to an accelerator pedal (not shown) via a wire cable so that the position of the throttle valve 8 is regulated according to the stroke of the accelerator pedal.

The intake passage 3 is provided with a first bypass passage 11A which extends bypassing the throttle valve 8. Inserted in this bypass passage 11A is a stepper motor valve (hereinafter called the "STM valve") 12 which functions as an ISC (idling speed control) valve. In the first bypass passage 11A, a first idling air valve 13 of the wax type whose opening is regulated according to the temperature of an engine coolant is also arranged in a side-by-side relationship with the STM valve 12.

The STEM valve 12 is constructed of a valve element 12a which can be brought into contact with a valve seat portion formed in the first bypass passage 11A, a stepper motor (ISC actuator) 12b for controlling the position of the valve element, and a spring 12c normally biasing the valve element against the valve seat portion (i.e., in the direction that the first bypass passage 11A is closed by the valve element).

By adjusting the position of the valve element 12a stepwise (according to the number of steps) relative to the valve seat portion by the stepper motor 12b, the opening between the valve seat portion and the valve element 12a, that is, the position of the STM valve 12 can be controlled.

By controlling the position of the STM valve 12 in accordance with an electronic control unit (ECU) 25 as a controller, which will be described subsequently herein, intake air can be fed to the engine 1 through the first bypass passage 11A irrespective of operation of the accelerator pedal by the driver. By changing the position of the STM valve 12, the quantity of air to be inducted through the throttle bypass passage 11A can be controlled.

As an ISC actuator, a DC motor can also be used instead of the stepper motor 12b.

The intake passage 3 is additionally provided with a second bypass passage 11B which also extends bypassing the throttle valve 8. An air bypass valve 14 is inserted in the second bypass passage 11B.

The air bypass valve 14 is constructed of a valve element 14a which can be brought into contact with a valve seat portion formed in the second bypass passage 11B and a diaphragm-type actuator 14b for controlling the position of the valve element 14a. A diaphragm compartment of the diaphragm-type actuator 14b is provided with a pilot passage 141 which is in communication with the intake passage on a side upstream of the throttle valve. An air-bypass-valve-controlling electromagnetic valve 142 is inserted in the pilot passage 141.

By controlling the position of the air-bypass-valve-controlling electromagnetic valve 142 with ECU 25, which will be described subsequently herein, it is also possible to supply intake air into the engine 1 through the second bypass passage 11B irrespective of an operation of the accelerator pedal by the driver. Further, the quantity of air to be inducted while bypassing the throttle valve 8 can be controlled by changing the position of the air-bypass-valve-controlling electromagnetic valve 142. Incidentally, it is the basic mode of operation of the air-bypass-valve-controlling electromagnetic valve 142 that it is open in a lean-burn operation but is otherwise kept closed.

Between the exhaust passage 4 and the intake passage 3, an exhaust gas recirculation passage (EGR passage) 80 is inserted to return exhaust gas to the intake system. An EGR valve 81 is inserted in the EGR passage 80.

The EGR valve 81 is constructed of a valve element 81a which can be brought into contact with a valve seat portion formed in the EGR passage 80 and a diaphragm-type actuator 81b for controlling the position of the valve element 81a. A diaphragm compartment of the diaphragm-type actuator 81b is provided with a pilot passage 82 which is in communication with the intake passage on a side upstream of the throttle valve. An EGR-valve-controlling electromagnetic valve 83 is inserted in the pilot passage 82.

By controlling the position of the EGR-valve-controlling electromagnetic valve 83 with ECU 25 which, will be described subsequently herein, exhaust gas can be returned to the intake system through the EGR passage 80.

In FIG. 2, numeral 15 indicates a fuel pressure regulator. This fuel pressure regulator 15 is actuated responsive to a negative pressure in the intake passage 3 to control the quantity of fuel to be returned from an unillustrated fuel pump to an unillustrated fuel tank, so that the pressure of fuel to be injected from the injector 9 can be controlled.

To control the engine system, various sensors are arranged. First, as is shown in FIG. 2, at a portion of the intake passage 3 just downstream of the air cleaner 7, an air flow sensor (inducted air quantity sensor) 17 for detecting the quantity of the inducted air from Karman vortex information, an intake air temperature sensor 18 as inducted air humidity parameter detection means, and an atmospheric pressure sensor 19 are provided.

This intake air temperature sensor 18 is arranged to detect the temperature of intake air of the engine 1.

At the position of arrangement of the throttle valve 8 in the intake passage 3, there are arranged a throttle position sensor 20 in the form of a potentiometer for detecting the position of the throttle valve 8 as well as an idling switch 21.

On the side of the exhaust passage 4, on the other hand, a linear oxygen concentration sensor (hereinafter referred to simply as the "linear $O_2$ sensor") 22 for linearly detecting the concentration of oxygen ($O_2$ concentration) in the exhaust gas is disposed. Other sensors include a coolant temperature sensor 23 for detecting the temperature of coolant of the engine 1, a crank angle sensor 24 (see FIG. 3) for detecting a crank angle (which can also function as a speed sensor for detecting an engine speed Ne), a vehicle speed sensor 30, etc.

Figure 3:
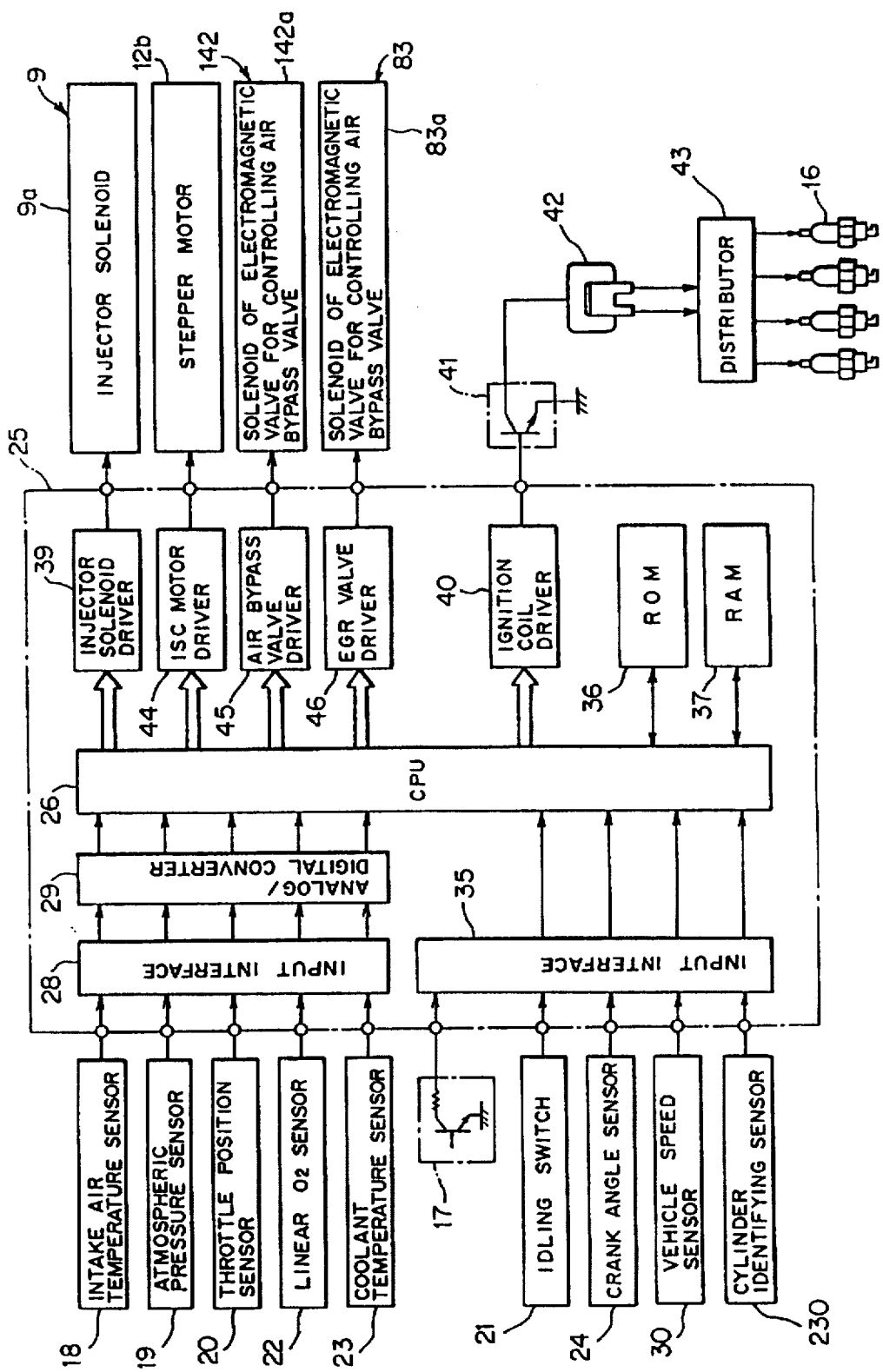

Detection signals from these sensors and switch are inputted to ECU 25 as shown in FIG. 3.

An example of a construction of the ECU 25 is illustrated in FIG. 3. ECU 25 is constructed as a computer which is provided as a principal component thereof with a CPU (processor) 26. To the CPU 26, detection signals from the intake air temperature sensor 18, the atmospheric pressure sensor 19, the throttle position sensor 20, the linear $O_2$ sensor 22, the coolant temperature sensor 23 and the like are inputted via an input interface 28 and an A/D converter 29.

Directly inputted through an input interface 35 to the CPU 26 are detection signals from the air flow sensor 17, the idling switch 21, the crank angle sensor 24, the vehicle speed sensor 30 and the like.

Through a bus line, the CPU 26 also exchanges data with a ROM (memory means) 36, in which various data are stored along with program data and fixed value data, and also with a RAM 37 which is updated, that is, successively rewritten.

As a result of computation by the CPU 26, the ECU 25 outputs signals for controlling the state of operation of the engine 1, for example, various control signals such as a fuel injection control signal, an ignition timing control signal, an ISC control signal, a bypass air control signal and an EGR control signal.

Here, the fuel injection control (air/fuel ratio control) signal is outputted from the CPU 26 to an injector solenoid 9a (more specifically, a transistor for the injector solenoid 9a), which is arranged to drive the injector 9, via an injector solenoid driver 39. The ignition timing control signal is outputted from the CPU 26 to a power transistor 41 via an ignition coil driver 40, so that a current is supplied from the power transistor 41 via an ignition coil 42 to a distributor 43 to make individual spark plugs 16 successively produce sparks.

The ISC control signal is outputted from CPU 26 to the stepper motor 12b via an ISC driver 44, while the bypass air control signal is outputted from the CPU 26 to the solenoid 142a of the air-bypass-valve-controlling electromagnetic valve 142 via an air bypass valve driver 45.

Further, the EGR control signal is outputted from CPU 26 to the solenoid 83a of the EGR-valve-controlling electromagnetic valve 83 via the EGR driver 46.

Now paying attention to the fuel injection control (air/fuel ratio control), for this fuel injection control (control of an injector drive time), the ECU 25 is provided with functions of variance detection means 101, normalized variance value determining means 102, deteriorated combustion determining value calculation means 104, combustion state controlling means 105, a combustion variance adjusting element 106, angular acceleration detecting means 107, smoothing means 108, threshold updating means 110 and misfire determining reference value setting means 111.

Here, the combustion variance adjusting element 106 is to adjust a fuel injection pulse width Tinj to a desired state by a control signal from the combustion state controlling means 105 so that a lean-burn operation is performed at an air/fuel ratio which is supposed to be achieved. The injector 9 functions as the combustion variance adjusting element 106.

Incidentally, the fuel injection pulse width Tinj is expressed by the following formula:

$$Tinj(j) = TB \cdot KAC(j) \cdot K \cdot KAFL + Td \qquad (1\text{-}1)$$

TB in the above formula is a basic drive time of the injector 9. From information on an inducted air quantity A from the air flow sensor 17 and information on an engine speed N from the crank angle sensor (engine speed sensor) 24, information on an inducted air quantity A/N per engine revolution is obtained, and based on this information, the basic drive time TB is determined.

On the other hand, KAFL is a leaning correction coefficient, which is determined corresponding to an operation state of the engine from characteristics stored in a map. The air/fuel ratio can therefore be made lean or stoichiometric depending on the operation state.

KAC(j) is, as will be described subsequently herein, a correction coefficient for performing combustion state control in correspondence to variance in combustion.

Further, the correction coefficient K is set in accordance with the engine coolant temperature, the inducted air temperature, the atmospheric pressure and the like. By the dead time (invalid time) Td, the drive time is corrected according to the battery voltage.

It is also designed to perform a lean-burn operation when predetermined conditions are found to be met by lean operation condition determining means.

Accordingly, the ECU 25 has the function of air/fuel ratio controlling means which controls the air/fuel ratio to have an air/fuel ratio on a side leaner than a stoichiometric air/fuel ratio under predetermined operation conditions.

Incidentally, the combustion state controlling system according to this embodiment is equipped with the angular acceleration detecting means 107 which detects an angular acceleration of the rotating shaft (crankshaft) driven by the engine. The angular acceleration detecting means 107 is constructed as will be described next.

Figure 11:
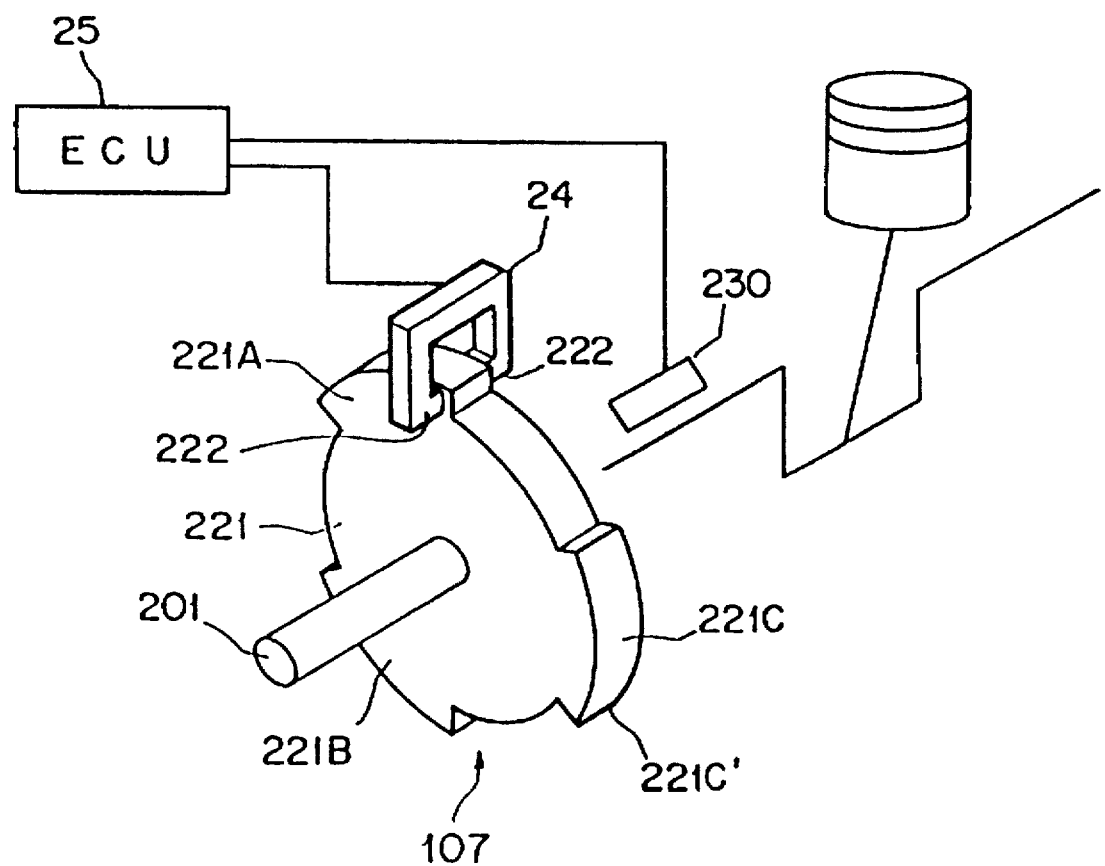

Namely, as is shown in FIG. 11, the angular acceleration detecting means 107 is provided as principal elements with the crank angle sensor 24, a cylinder-identifying sensor 230 and the ECU 25 as a controller. The crank angle sensor 24 is provided with a rotating member 222 which rotates integrally with a crankshaft 201 of the engine.

On a peripheral edge of the rotating member 221, are formed a first, second and third vanes 221A,221B, 221C which extend out in radial directions, respectively. A detector 222, which is arranged to confront the vanes 221A,221B, 221C on opposite sides thereof, either optically or electromagnetically detects passage of the vanes 221A,221B,221C caused by rotation of the rotating member 221 so that corresponding pulses are outputted.

The vanes 221A,221B,221C have an angular length corresponding to a predetermined angle of rotation of the crankshaft and are arranged at intervals of a predetermined angle spacedly from each other in the angular direction.

Specifically, the opposing edges of the mutually adjacent vanes are arranged at an angular interval of 120 degrees.

The cylinder-identifying sensor 230 is fixedly mounted on an unillustrated camshaft, and generates a pulse output whenever the camshaft takes a specific rotational position corresponding to a cylinder while the crankshaft 201 rotates twice and the camshaft rotates once.

The system of this embodiment, which is mounted on a 6-cylinder engine in which ignition is performed in the order of cylinder numbers, is constructed, for example, in such a way that the crankshaft enters a first crankshaft rotational angle region corresponding to one of a first cylinder and a fourth cylinder making up a first cylinder group (preferably and primarily, an expansion stroke in said one cylinder) when the end edge (a leading edge 221C' or a trailing edge) of the third vane 221C has moved past the detector 222 and the crankshaft leaves the first rotational angle range when the end edge of the first vane 221A has moved past the detector 222.

Likewise, upon passage of the end edge of the first vane 221A, the crankshaft enters a second crankshaft rotational angle range corresponding to one of a second and fifth cylinders making up a second cylinder group and upon passage of the end edge of the second vane 221B, the crankshaft leaves the region.

Further, upon passage of the end edge of the second vane 221B, the crankshaft enters a third crankshaft rotational angle region corresponding to one of a third and sixth cylinders making up a third cylinder group and upon passage of the end edge of the third vane 221C, the crankshaft leaves the region.

The distinction between the first cylinder and the fourth cylinder, the distinction between the second cylinder and the fifth cylinder, and the distinction between the third cylinder and the sixth cylinder are conducted based on outputs from the cylinder-identifying sensor 230.

Owing to the above construction, detection of an angular acceleration is performed as will be described next.

During an operation of the engine, the ECU 25 is successively inputted with pulse outputs from the crank angle sensor 24 and detection signals from the cylinder-identifying sensor 230 and periodically and repeatedly performs computations.

On the other hand, the ECU 25 determines the numbering of each pulse output from crank sensor 24 among pulse outputs successively inputted since the time point of input of a pulse output from the cylinder-identifying sensor 230.

This makes it possible to identify which cylinder the pulse signal inputted from the crank angle sensor 24 corresponds to. Preferably, a cylinder in which an expansion stroke (output stroke: BTDC 75°) is primarily performed at the current time point is identified as an identified cylinder.

Upon determination of entrance to the crankshaft rotational angle region corresponding to an identified cylinder group m (m: 1, 2 or 3) in accordance with a pulse input from the crank angle sensor 24, the ECU 25 then starts a period measuring timer (not illustrated).

When the next pulse output is inputted from the crank angle sensor 220, the ECU 25 determines a departure from the crankshaft rotational angle region corresponding to the identified cylinder group m, stops the time counting operation of the period measuring timer and reads the result of the time so counted.

This result represents the time interval TN(n) from the time point of the entrance to the crankshaft rotational angle region corresponding to the identified cylinder group m until the time point of the departure from the region, in other words, the period TN(n) determined by two predetermined crank angles corresponding to the identified cylinder group.

Here, the suffix "n" in the period TN(n) indicates that the period corresponds to the nth (current) igniting operation in the identified cylinder.

Further, the period TN(n), in the case of a 6-cylinder engine, is a 120° cranking period of the identified cylinder group (the time interval between BTDC 75° operation states in the adjacent cylinders) and in more general, is a (720/N)° cranking period in an N-cylinder engine.

Incidentally, the above-described pulse output which indicates a departure from the crankshaft rotational angle region corresponding to the currently identified cylinder also indicates an entrance to the crankshaft rotational angle region corresponding to the cylinder to be identified next.

Accordingly, responsive to this pulse output, a cylinder identifying step is performed with respect to the cylinder to be identified next and the period measuring timer is restarted to begin measurement of a period relating to the cylinder to be identified next.

Figure 6:
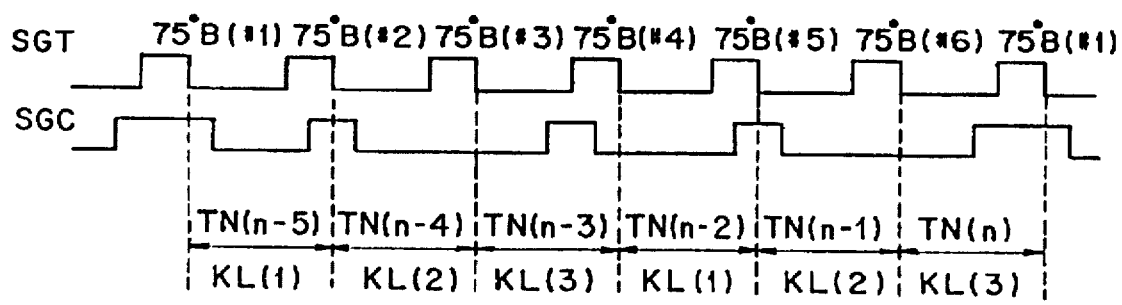

By these operations, ECU 25 detects the 120° cranking period TN(n). A series of states from the #1 cylinder to the #6 cylinder can be illustrated as shown in FIG. 6. The 120° cranking periods are indicated by TN(n−5) to TN(n), respectively. Using these detection values, the angular acceleration ACC(n) of the crankshaft in the period is calculated by the following formula:

$$ACC(n)=1/TN(n)\times\{KL(m)/TN(n)-KL(m-1)/TN(n-1)\} \quad (1\text{-}2)$$

where KL(m) is a segment correction value. To perform a correction with respect to the currently identified cylinder so that any error in the measurement of the period due to variations in the angular intervals of the vanes caused upon fabrication and mounting of the vanes can be eliminated, a segment correction value KL(m) is calculated by ECU 25 in accordance with the following formula:

$$KL(m)=\{KL(m-3)\times(1-XMFDKFG)+KR(n)\times(XMFDKFD)\} \quad (1\text{-}3)$$

where XMFDKFG represents a segment correction value gain.

Now, "m" in KL(m) is set for each corresponding cylinder group, whereby m=1 corresponds to the cylinder groups #1 and #4, m=2 to the cylinder groups #2 and #5, and m=3 to the cylinder groups #3 and #6. As is shown in FIG. 6, KL(1) to KL(3) are repeated.

Further, "m−1" in KL(m−1) means that the segment correction value is that immediately before the segment correction value corresponding to "m". It is therefore indicated that KL(m−1)=KL(3) when KL(m)=KL(1), KL(m−1)=KL(1) when KL(m)=KL(2), and KL(m−1)=KL(2) when KL(m)=KL(3).

Moreover, KL(m−3) in the above formula indicates KL(m) in the preceding correction with respect to the same cylinder group. As KL(m−3) upon computation for the #4 cylinder, KL(1) in the preceding correction for the #1 cylinder is used, and as KL(m−3) upon computation for the #1 cylinder, KL(1) in the preceding correction for the #4 cylinder is used. As KL(m−3) upon computation for the #5 cylinder, KL(2) in the preceding correction for the #2 cylinder is used, and as KL(m−3) upon computation of the #2 cylinder, KL(2) in the preceding correction for the #5 cylinder is used. As KL(m−3) upon computation for the #6 cylinder, KL(3) in the preceding correction for the #3 cylinder is used, and as KL(m−3) upon computation for the #3 cylinder, KL(3) in the preceding correction for the #6 cylinder is used.

On the other hand, KR(n) in the above formula is determined in accordance with the following formula:

$$KR(n)=3\times TN(n)/\{TN(n)+TN(n-1)+TN(N-2)\} \quad (1\text{-}4)$$

This is a measurement value corresponding to an average measurement time period from the measurement time period TN(n−2) of the two measurements ago until the measurement time period TN(n) of the current measurement. Upon calculation of the segment correction value KL(m), KR(n) is subjected to a primary filtering processing by the segment correction value gain XMFDKFG while using the above-described formula.

Incidentally, the engine combustion state controlling system according to this embodiment is provided with said variance detection means 101 which detects a variance value in angular acceleration by using a detection signal from said angular acceleration detecting means 107.

The computation by said variance detection means 101 is conducted by determining the difference between a smoothed value, which has been obtained by smoothing a detected angular velocity by said smoothing means 108, and an angular acceleration outputted from said angular acceleration detecting means 107.

Namely, at said variance detection means 101, an acceleration variance value ΔACC(n) is calculated by the following formula:

$$\Delta ACC(n)=ACC(n)-ACCAV(n) \quad (1\text{-}5)$$

Here, ACCAV(n) is the smoothed value obtained by smoothing the detected angular velocity by said smoothing means 108 and is calculated by conducting a primary filtering processing in accordance with the following formula:

$$ACCAV(n)=\alpha\times ACCAV(n-1)+(1-\alpha)\times ACC(n) \quad (1\text{-}6)$$

where α is an updating gain in the primary filtering processing and takes a value of 0.95 or so.

Also provided is said normalized variance value determining means 102 which normalizes the variance value ΔACC(n) outputted from said variance detection means 101 in accordance with the state of operation of the engine to obtain a normalized variance value IAC(n).

Figure 10:
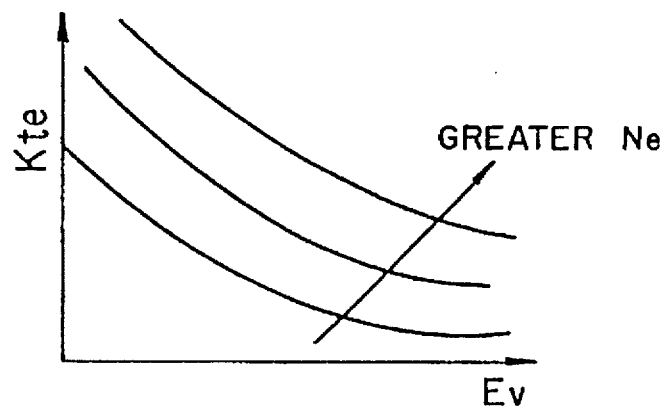

The calculation of the normalized variance value IAC(n) at said normalized variance determining means 102 is conducted in accordance with the following formula:

$$IAC(n)=\Delta ACC(n)\times Kte(Ev,Ne) \quad (1\text{-}7)$$

where Kte(Ev,Ne) is an output correction coefficient and is set by the characteristics shown in FIG. 10.

The characteristic of FIG. 10 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, the characteristics of FIG. 10 are stored as a map. From the engine speed Ne calculated from the detection signal of the crank angle sensor 24 or the like and the volumetric efficiency Ev, the output correction coefficient Kte(Ev,Ne) set at ECU 25, so that normalization is performed by a correction corresponding to an engine output.

Also provided is said deteriorated combustion determining value calculation means 104, which compares the normalized variance value IAC(n) with a predetermined threshold IACTH to determine a deteriorated combustion determining value VAC(j). This deteriorated combustion determining value VAC(j) is obtained by cumulating the quantities of deteriorations in each of which the normalized variance value IAC(n) is smaller by the corresponding deterioration quantity than the threshold IACTH.

Namely, the deteriorated combustion determining value VAC(j) is calculated by the following formula:

$$VAC(j)=\Sigma\{IAC(j)<IACTH\}\times\{IACTH-IAC(j)\} \quad (1\text{-}8)$$

In the above formula, {IAC(j)<IACTH} is a function which stands for "1" when IAC(j)<IACTH is met but for "0" when this condition is not met. When each normalized variance value IAC(n) is smaller than the predetermined threshold IACTH, this negative difference is cumulated as a deterioration quantity.

Accordingly, the deteriorated combustion determining value VAC(j) is obtained by cumulating each quantity of deterioration which is weighted by the difference between the threshold IACTH and the normalized variance value IAC(j), so that effects of values around the threshold can be minimized to precisely reflect the state of deterioration.

Further, the predetermined threshold IACTH in said deteriorated combustion determining value calculation means 104 is updated corresponding to the state of operation of the engine by said threshold updating means 110.

Incidentally, the above-described suffix "j" indicates the number of each cylinder.

As an alternative, the deteriorated combustion determining value VAC(j) may also be determined by using a simpler program and cumulatively counting the number of detections in each of which the normalized variance value IAC(n) is smaller than the threshold IACTH (namely, VAC(j)=Σ{IAC(j)<IACTH}).

Computation results from said deteriorated combustion determining value calculation means 104, such as those described above, are employed at said combustion state controlling means 105.

Namely, referring to the deteriorated combustion determining value VAC(j) calculated by said deteriorated combustion determining value calculation means 104, said combustion state controlling means 105 controls the combustion variance adjusting element 106 of the engine with respect to the predetermined reference values from reference value setting means 112.

As the reference values for the control of the combustion variance adjusting element 106 by said combustion state controlling means 105, are provided an upper limit reference value (VACTH1) set by upper limit reference value setting means 112U and a lower limit reference value (VACTH2) set by upper limit reference value setting means 112L.

The control by the combustion variance adjusting element 106 is performed so that the deteriorated combustion determining value VAC(j) falls between the upper limit reference value (VACTH1) and the lower limit reference value (VACTH2).

More specifically, the control by the combustion variance adjusting element 106 is performed by correcting the basic injection pulse width upon injection of fuel as described above. The injection pulse width Tinj(j) is calculated in accordance with the following formula:

$$Tinj(j)=TB \times KAC(j) \times K \times KAFL + Td \qquad (1-9)$$

Further, the correction coefficient KAC(j) in the above formula can be adjusted as will be described next.

First, where the deteriorated combustion determining value VAC(j) is greater than the upper limit reference value VACTH1, the combustion variance value is taken as having deteriorated to or beyond the predetermined level. An enriching correction for increasing the fuel injection quantity is therefore performed by calculating a correction coefficient KAC(j) in accordance with the following formula:

$$KAC(j)=KAC(j)+KAR \cdot \{VAC(j)-VACTH1\} \qquad (1-10)$$

Figure 7:
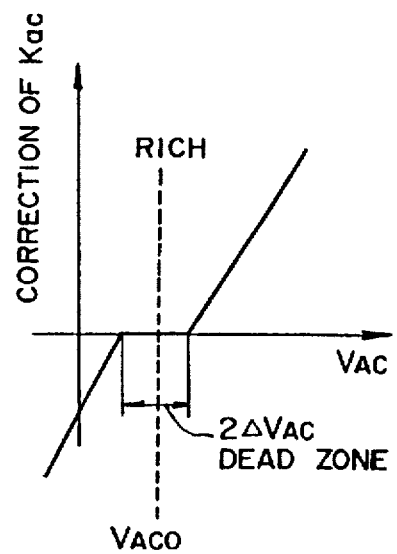

This is to calculate the correction value of the rich-side upper right characteristics among the correction characteristics shown in FIG. 7, and KAR is a coefficient indicating the gradient of the characteristics. KAC(j) on the right side indicates a correction coefficient calculated in the preceding computation cycle (n−1) with respect to the cylinder numbered j and is updated according to the above formula.

FIG. 7 shows correction characteristics by plotting deteriorated combustion determining values VAC along the abscissa and correction coefficients KAC along the ordinate.

On the other hand, where the deteriorated combustion determining value VAC(j) is smaller than the lower limit reference value VACTH2, the combustion is taken as permitting further leaning so that a leaning correction for reducing the fuel injection quantity is performed by calculating a correction coefficient KAC(j) in accordance with the following formula:

$$KAC(j)=KAC(j)-KAL \cdot \{VAC(j)-VACTH2\} \qquad (1-11)$$

This is to calculate the correction value of the lean-side lower left characteristics shown in FIG. 7, and KAL is a coefficient indicating the gradient of the characteristics.

Further, where the deteriorated combustion determining value VAC(j) is equal to or greater than the lower limit reference value VACTH2 but is equal to or smaller than the upper limit reference value VACTH1, the engine is taken as being in an adequate operation state so that no change is made to the correction coefficient KAC(j) to maintain the fuel injection quantity in the preceding state.

This corresponds to horizontal characteristics between the lean-side lower left characteristics and the rich-side upper right characteristics shown in FIG. 7, and forms a dead zone for corrections.

Here, the lower limit reference value VACTH2 and the upper limit reference value VACTH1 are set with a combustion variance target value VAC0 located at the center therebetween, that is, the lower limit reference value VACTH2 is set at the value of (VAC0−ΔVAC) and the upper limit reference value VACTH1 at the value (VAC0+ΔVAC).

The combustion variance target value VAC0 is a value corresponding to a target value (10% or so) of COV (coefficient of variance). By preventing any fuel correction within the range of ΔVAC on both sides of the combustion variance target value VAC0, it is possible to avoid a limit cycle which would otherwise be caused by an error due to evaluation of rotational variance within a limited period (128 cycles) or due to computation based on a value smaller than the threshold.

The above-described correction coefficient KAC(j) is designed to be clipped at both upper and lower limits and is set to meet, for example, the following inequality: 0.9<KAC(j)<1.1. The correction coefficient is therefore set to avoid any abrupt correction and to gradually perform a correction so that occurrence of a shock or the like can be prevented and the control can be performed stably.

Further, the deteriorated combustion determining value VAC(j) can be updated every preset number of combustions, for example, every 128 (or 256) cycles. By performing the control while ascertaining the state of combustion over a relative long period, the control can be performed stably and surely while reflecting statistical characteristics.

The misfire determining reference value is set on a combustion deteriorated side of the reference value set by said reference value setting means 112. Based on a change in the normalized variance value IAC(n) toward the combustion deteriorated side beyond the misfire determining reference value, a misfire is determined, information on the misfire is stored at a misfire information address (j) for the current cylinder, and control is performed against the misfire.

Figure 4:
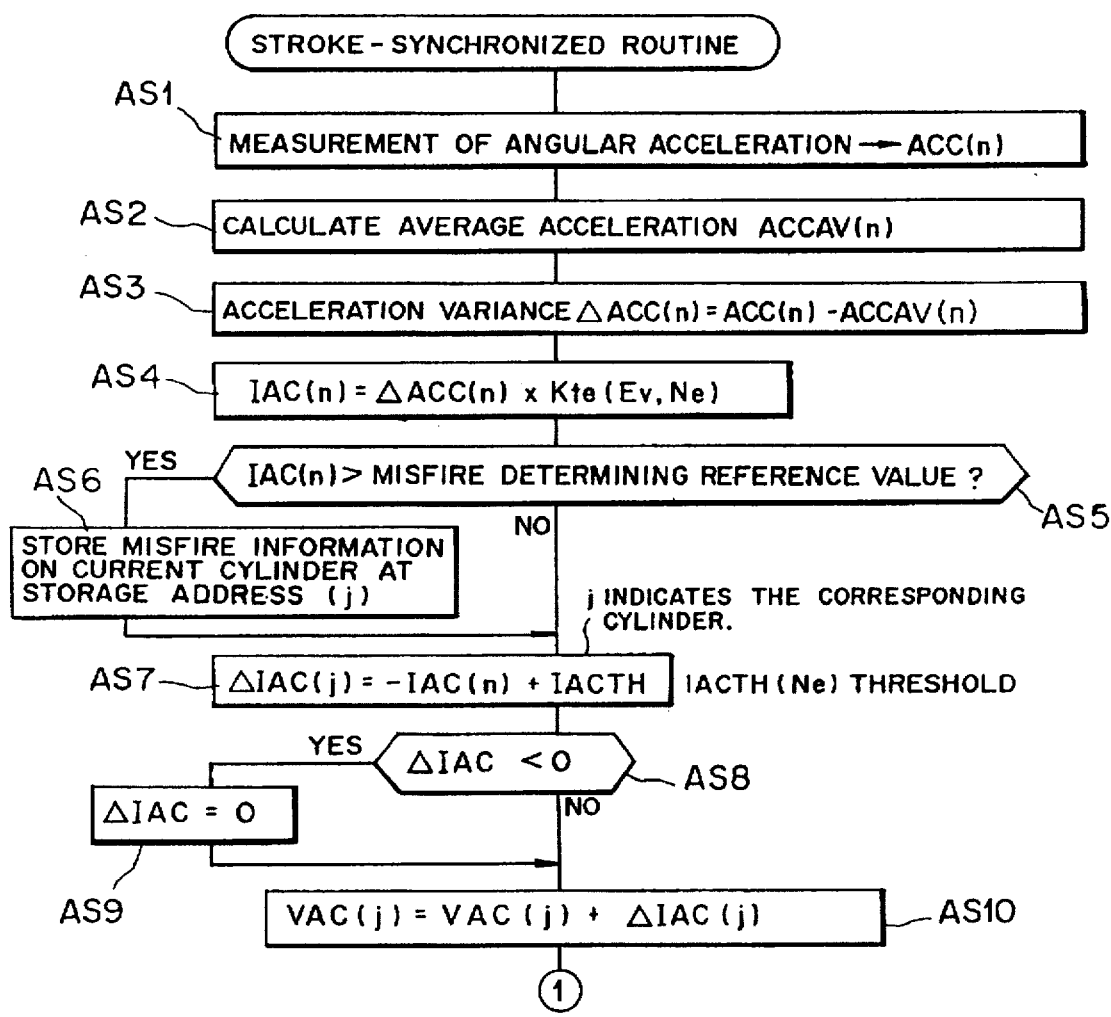
Figure 5:
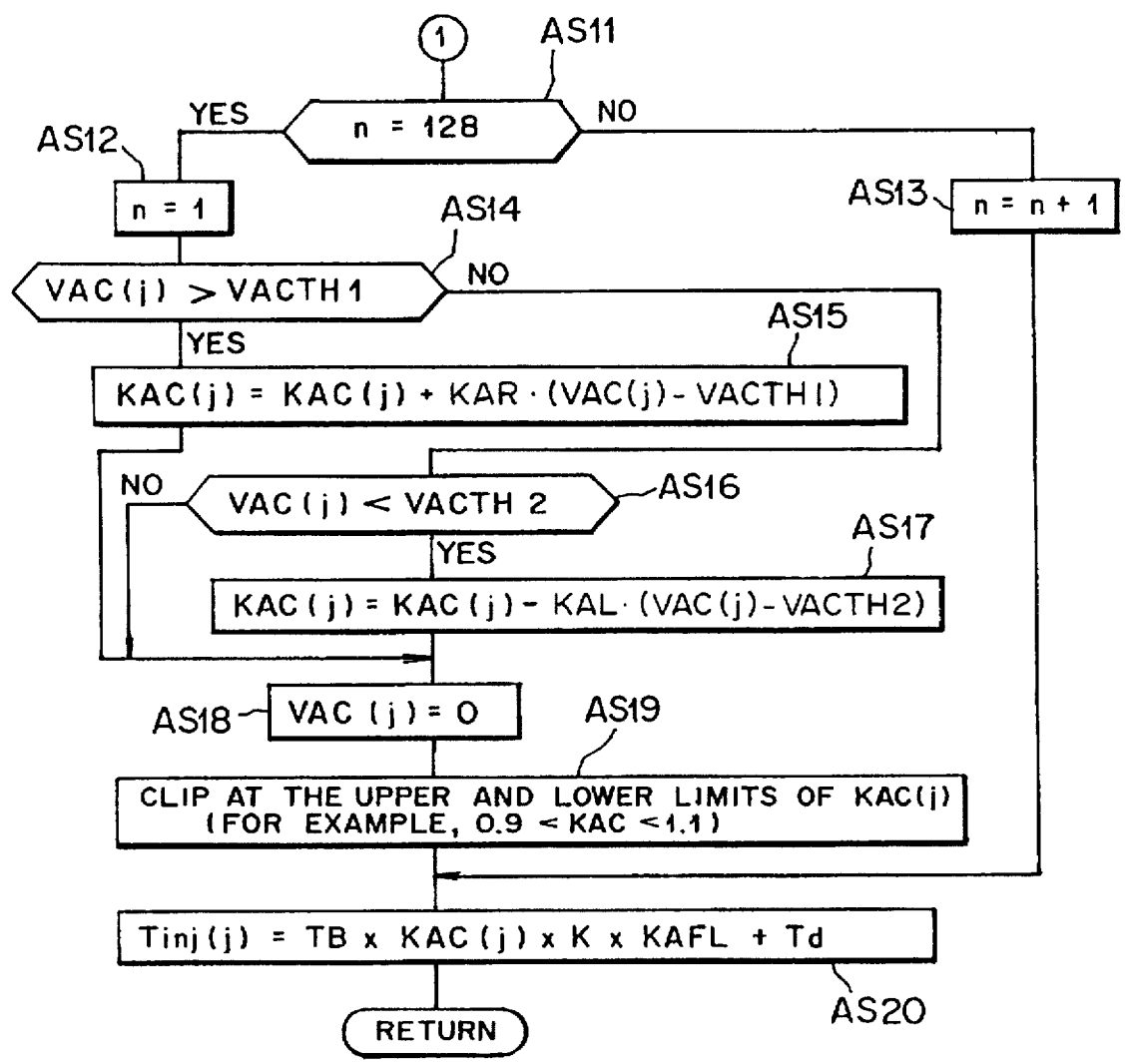

Since the engine combustion state determining method and combustion state controlling system according to the first embodiment of the present invention are constructed as described above, operations illustrated in FIGS. 4 and 5 are successively performed during a lean-burn operation.

First, in step AS1, an angular acceleration ACC(n) is detected by said angular acceleration detecting means 107.

Here, computation employed for the detection is performed in accordance with the following formula:

$$ACC(n)=1/TN(n) \cdot \{KL(m)/TN(n)-KL(m-1)/TN(n-1)\} \qquad (1-12)$$

where KL(m) is a segment correction value. To perform a correction with respect to the currently identified cylinder so that any error in the measurement of the period due to variations in the angular intervals of the vanes caused upon fabrication and mounting of the vanes can be eliminated, a segment correction value KL(m) is calculated in accordance with the following formula:

$$KL(m)=\{KL(m-3)\times(1-XMFDKFG)+KR(n)\times(XMFDKFD)\} \quad (1\text{-}13)$$

where XMFDKFG represents a segment correction value gain.

On the other hand, KR(n) in the above formula is determined in accordance with the following formula:

$$KR(n)=3\cdot TN(n)/\{TN(n)+TN(n-1)+TN(n-2)\} \quad (1\text{-}14)$$

This is a measurement value corresponding to an average measurement time period from the measurement time period TN(n−2) of the two measurements ago until the measurement time period TN(n) of the current measurement. Upon calculation of the segment correction value KL(m), the primary filtering processing by the segment correction value gain XMFDKFG is performed by using the above-described formula.

An average acceleration ACCAV(n) is then calculated in step AS2.

Here, ACCAV(n) is the smoothed value obtained by smoothing the detected angular velocity ACC(n) by said smoothing means 108 and is calculated by conducting a primary filtering processing in accordance with the following formula:

$$ACCAV(n)=\alpha\cdot ACCAV(n-1)+(1-\alpha)\cdot ACC(n) \quad (1\text{-}15)$$

where $\alpha$ is an updating gain in the primary filtering processing and takes a value of 0.95 or so.

In step AS3, an acceleration variance value $\alpha ACC(n)$ is next detected by said variance detection means 101.

Namely, by determining the difference between the angular velocity ACC(n) detected by said angular acceleration detection means 107 and the average acceleration ACCAV (n) as the smoothed value obtained by smoothing by said smoothing means 108, an acceleration variance value $\Delta ACC$ (n) is calculated in accordance with the following formula:

$$\Delta ACC(n)=ACC(n)-ACCAV(n) \quad (1\text{-}16)$$

In step AS4, a normalized variance value IAC(n), which is available by normalizing the variance value $\Delta ACC(n)$ outputted from said variance detection means 101 in accordance with the state of operation of the engine, is calculated by said normalized variance value determining means 102 in accordance with the following formula:

$$IAC(n)=\Delta ACC(n)\cdot Kte(Ev,Ne) \quad (1\text{-}17)$$

where Kte(Ev,Ne) is an output correction coefficient and is set by the characteristics shown in FIG. 10.

The characteristic of FIG. 10 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, in the characteristics of FIG. 10 stored as a map, the output correction coefficient Kte(Ev,Ne) is set at the ECU 25 from the engine speed Ne calculated from the detection signal of the crank angle sensor 220 or the like and the volumetric efficiency Ev, so that normalization is performed by a correction corresponding to an engine output.

Here, a description will be made of control characteristics where normalization is conducted corresponding to an engine output as described above.

Namely, an angular acceleration $\omega'$ is expressed as shown by the following formula:

$$\omega'=1/Ie\cdot(Te-Tl) \quad (1\text{-}18)$$

where Te is an engine torque, Tl is a load torque, and Ie is a moment of inertia.

On the other hand, $$\omega'=\omega_o'+\Delta\omega' \quad (1\text{-}19)$$

where $\omega_o'$ is an average angular acceleration.

From formulae (1-18) and (1-19), $$\begin{aligned}\omega_o'+\Delta\omega' &= 1/Ie\cdot(Te-Tl) \quad (1\text{-}20)\\ &= 1/Ie\cdot(Te_o-Tl)+\Delta Te/Ie\end{aligned}$$

Hence, $\Delta\omega'=\Delta Te/Ie$ (1-21)

Incidentally, according to the above-described detection method of the angular acceleration ACC(n) in step AS1, engine torque information is stored relatively well where no load disturbance exists. Further, as is indicated by formula (1-21), by conducting the control while using a variance $\Delta\omega'$ from the average angular acceleration $\omega_o'$ [acceleration variance value $\Delta ACC(n)$] and the normalized output taking the moment of inertia Ie into account [normalized variance value IAC(n)], the control can be performed while taking into account the statistical nature of combustion variance and surely reflecting the combustion variance.

After the operation of step AS4 has been performed, determination of a misfire is then performed in step AS5.

Namely, the misfire determining reference value set by said misfire determining reference value setting means 111 is set on the combustion deteriorated side than the reference value which is set by said reference value setting means 112 and is employed by said deteriorated combustion determining value calculation means 104. It is determined whether or not the normalized variance value IAC(n) has changed toward the combustion deteriorated side beyond the misfire determining reference value. If determined to have changed, occurrence of a misfire is determined.

If this determination has been made, step AS6 is performed to store information on the misfire at the misfire information address (j) for the current cylinder so that control against the misfire is performed.

On the other hand, if no misfire has been determined or after step AS6 has been performed subsequent to determination of a misfire, operations by said deteriorated combustion determining value calculation means 104 in step AS7 to step AS10 are performed, whereby the normalized variance value IAC(n) and the predetermined threshold IACTH are compared and a deteriorated combustion determining value VAC(j) is calculated in accordance with the following formula:

$$VAC(j)=\Sigma\{IAC(j)<IACTH\}\times\{IACTH-IAC(j)\} \quad (1\text{-}22)$$

First, in step AS7, the difference $\Delta IAC(n)$ between the normalized variance value IAC(n) and the predetermined threshold IACTH is calculated and in step AS8, it is then determined whether the difference $\Delta IAC(n)$ is negative or not.

This determination corresponds to the function {IAC(j) <IACTH} in the above formula, and an operation is performed to take "1" when IAC(j)<IACTH is met but "0" when this condition is not met.

Namely, when IAC(J)<IACTH is met, ΔIAC(n) is positive. The routine then advances through the "NO" route and cumulation of the deteriorated combustion determining value VAC(j) in step AS10 is performed, resulting in the state that the above-described function takes "1".

When IAC(J)<IACTH is not met, on the other hand, ΔIAC(n) is negative. The routine then advances through the "YES" route and ΔIAC(n)=0 is performed in step AS9. As a consequence, no cumulation of the deteriorated combustion determining value VAC(j) is performed in step AS10, resulting in the state that the above-described function takes "0".

Figure 8:
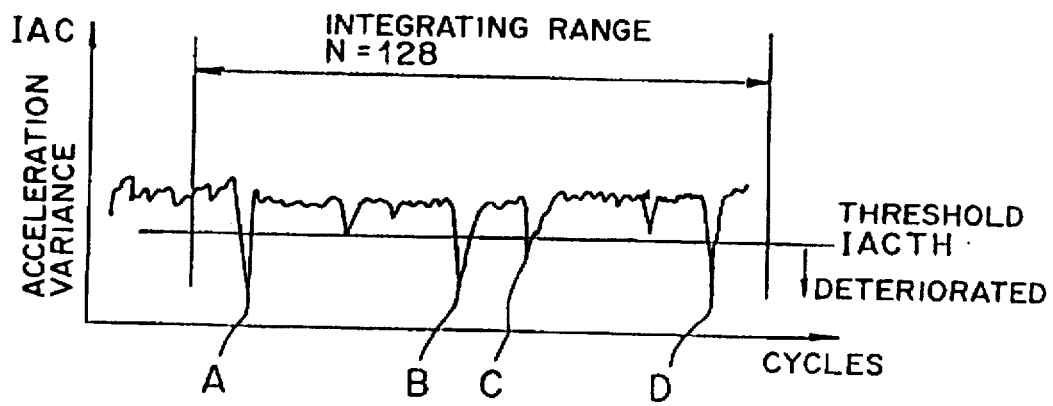

Accordingly, when the normalized variance value IAC(n) is smaller than the predetermined threshold IACTH as indicated by dots A to D in FIG. 8, these negative differences are cumulated as deterioration quantities.

Accordingly, the deteriorated combustion determining value VAC(j) is obtained by cumulating each deterioration quantity which is weighted by the difference between the threshold IACTH and the normalized variance value IAC(j), so that effects of values around the threshold can be minimized to precisely reflect the state of deterioration.

Further, the predetermined threshold IACTH in said deteriorated combustion determining value calculation means 104 is updated corresponding to the state of operation of the engine by said threshold updating means 110, thereby making it possible to realize an operation state still closer to the lean limit.

Incidentally, the above-described suffix "j" indicates the number of each cylinder. The deteriorated combustion determining value VAC(j) is cumulated with resect to each cylinder j.

Next, step AS11 is performed to determine whether n, which indicates the number of samplings, has exceeded 128 or not.

In other words, it is determined whether or not the integrating range shown in FIG. 7 has been gone through. If not, the routine advances through the "NO" route and step AS13 is performed to increase the number n by "1", whereby step AS20 is performed without conducting any fuel correction. As a consequence, in the integrating range of 128 cycles, the correction by the correction coefficient KAC(j) to the injection pulse width Tinj is not performed and cumulation of the deteriorated combustion determining value VAC(j) is performed primarily.

Accordingly, the deteriorated combustion determining value VAC(j) is updated an every preset number of combustions, for example, every 128 cycles. By conducting control while ascertaining the state of combustion over a relatively long period, the control can be performed stably and surely while reflecting statistical characteristics.

Incidentally, the above-described deteriorated combustion determining value VAC(j) is set for the following significance from the viewpoint that variance in combustion is probabilistic.

Figure 12:
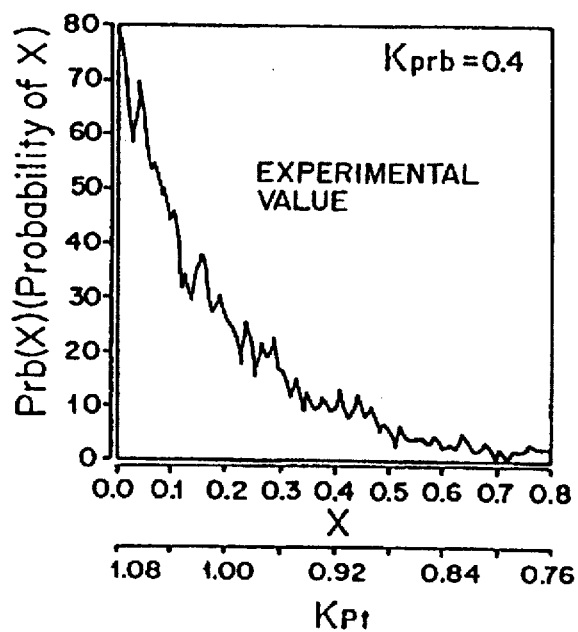

Namely, variance in combustion can be hypothesized as having such variance characteristics as illustrated in FIG. 12. Based on random numbers which occur at a probability in compliance with an exponential distribution, the state of the variance can be expressed by the below-described formulae (1-23) and (1-24).

Along the abscissa in FIG. 12, ratios Kpt (ratios X) of internal cylinder pressures Pi to average effective pressures avPi of the engine are plotted and corresponding probability densities Prb of combustion variance are plotted, so that possible variances of combustions are shown.

$$Prb(x) = \lambda \cdot \exp(-\lambda \cdot x) \tag{1-23}$$

$$Kpt = (1 - x \cdot Kprb)/\{1 - 1/(\lambda \cdot Kprb)\} \tag{1-24}$$

Figure 13:
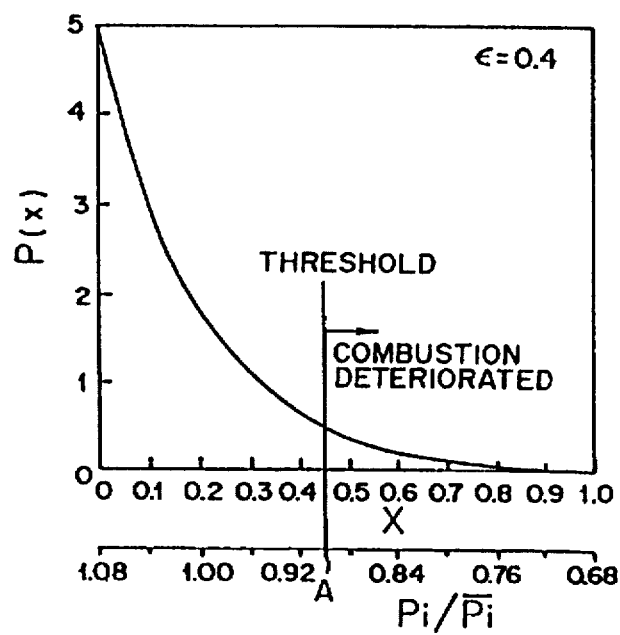

These characteristics of the combustion variance can be approximated by an exponential distribution in which the population parameter (λ) is 5. These approximated characteristics are shown in FIG. 13.

Namely, the probability density P(x) of the combustion variance can be expressed:

$$P(x) = \lambda \cdot \exp(-\lambda \cdot x) \tag{1-25}$$

On the other hand, each Pi/avPi plotted along the abscissa corresponds to that obtained by normalizing an internal cylinder pressure while using a coefficient s which represents the probabilistic magnitude of the variance, and is expressed by the following formula (1-26):

$$Pi/avPi = (1 - \epsilon \cdot x)/(1 - \epsilon/x) \tag{1-26}$$

Here, assuming that $a = \lambda/(\lambda - \epsilon)$ and $b = \lambda \cdot \epsilon/(\lambda - \epsilon)$, the above formula can be expressed as follow:

$$Pi/avPi = a - b \cdot x \tag{1-27}$$

Incidentally, avPi represents an average of Pi.

As is indicated by the characteristics in FIG. 13, the characteristics located more rightwards have a lower probability of appearance, and indicate the situation that the state of combustion is deteriorated. Now assuming that a rightward change beyond a boundary A in FIG. 13 is determined to mean a deterioration in combustion, the deteriorated combustion determining threshold is set at 0.9 (Pi/avPi=0.9).

When the combustion variance COV is expressed using a probability, the following expression can be established.

First, the distribution V (Pi/avPi) of Pi/avPi is:

$$V(Pi/avPi) = b^2/\lambda^2 \tag{1-28}$$

The standard deviation σ(Pi/avPi) of Pi/avPi is:

$$\sigma(Pi/avPi) = \{V(Pi/avPi)\}^{1/2} \tag{1-29}$$
$$= b/\lambda$$

$$\text{Hence, } COV = \sigma(Pi/avPi) = b/\lambda \tag{1-30}$$
$$= \epsilon/(\lambda - \epsilon)$$

Since a good correlation is known to exist between internal cylinder pressure and combustion index, a further discussion will be made by replacing Pi/avPi with Ci/avCi which corresponds to one obtained by normalizing the combustion index. Expressing a deteriorated combustion index Vc by using a probability, the deteriorated combustion index Vc of control data ①, said deteriorated combustion index being constituted by the number of detections in which the combustion index Ci changes toward the combustion deteriorated side beyond the deteriorated combustion determining threshold threshold Cth, is the probability that Ci/avCi ≦ Cth/avCi is met.

Here, Cth/avCi is a threshold of the combustion index and takes a value of 0.9.

If the threshold of x is assumed to be $x_o$, the deteriorated combustion index Vc will be a value which is obtained by integrating the probability density P(x) of the combustion variance from the threshold $x_o$ to 1/ε.

Now, $1/\epsilon$ is the value of x when $Ci/avCi = a - b \cdot x = 0$, and is obtained by substituting $a = \lambda/(\lambda - \epsilon)$ and $b = \lambda \cdot \epsilon/(\lambda - \epsilon)$ defined above.

Thus, with respect to the control data ①, $$Vc = \int_{x_o}^{1/\epsilon} \lambda \cdot \exp(-\lambda \cdot x) dx \qquad (1\text{-}31)$$

$$= [-\exp(-\lambda \cdot x)]_{x_o}^{1/\epsilon}$$

$$= -\exp(-\lambda \cdot x) + \exp(-\lambda \cdot x_o)$$

Now, substituting $$x_o = (a - Cth/avCi)/b \qquad (1\text{-}32)$$

$$= \{\lambda - (\lambda - \epsilon) \cdot Cth/avCi\}/\lambda \cdot \epsilon$$

Vc can be expressed as follow:

$$Vc = -\exp(-\lambda/\epsilon) + \exp[\{(\lambda - \epsilon) \cdot Cth/avCi - \lambda\}/\epsilon] \qquad (1\text{-}33)$$

Figure 14:
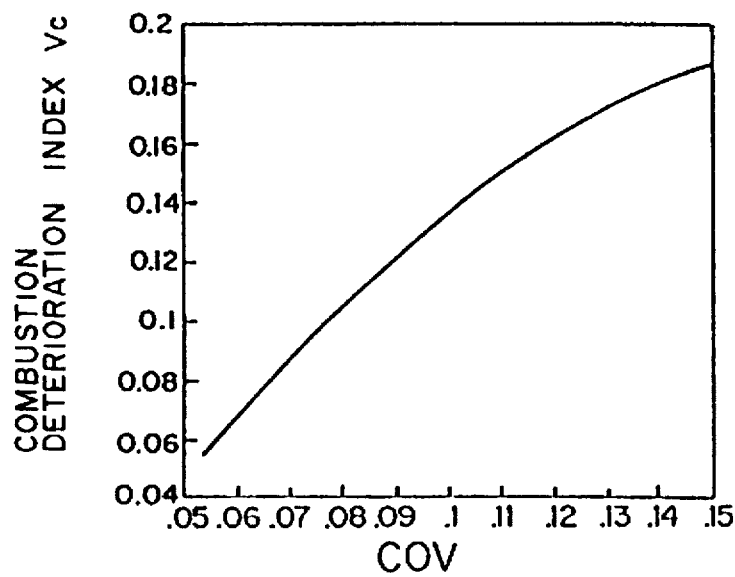

When this deteriorated combustion index Vc is plotted against the combustion variance COV by changing $\epsilon$, a graph is obtained as shown in FIG. 14.

Namely, FIG. 14 shows the correlation between the combustion variance COV and the deteriorated combustion index Vc by plotting the former along the abscissa and the latter along the ordinate, respectively. As is shown in the diagram, they can be said to have a good linear correlation.

Accordingly, there is the good correlation between the deteriorated combustion index Vc and the combustion variance COV. By adopting the deteriorated combustion index Vc as a control element against combustion variance and conducting feedback control, the control can be performed in a probabilistically stable and precise manner.

On the other hand, the deteriorated combustion index Vc of the control data ②, said deteriorated combustion index being formed of the excess quantity (Cav−Ci) by which the combustion index Ci has changed toward the combustion deteriorated side beyond the average combustion index Cav, is that obtained by multiplying, by Cav−Ci, the probability of becoming Ci<Cth. When calculated with the foregoing in view, the deteriorated combustion index can be expressed as will be described next.

$$Vc = \int_{x_o}^{1/\epsilon} \{Cav/avCi - Ci/avCi\} \lambda \cdot \exp(-\lambda \cdot x) dx \qquad (1\text{-}34)$$

Since $Cav/avCi = 1$ and $Ci/avCi = a - b \cdot x$, Vc can be expressed as follows:

$$Vc = \int_{x_o}^{1/\epsilon} (1 - a + b \cdot x) \cdot \lambda \cdot \exp(-\lambda \cdot x) dx \qquad (1\text{-}35)$$

$$= -(\lambda/(\lambda - \epsilon)) \cdot \exp(-\lambda \cdot \epsilon) +$$

$$[\{\lambda - (\lambda - \epsilon) \cdot Cth/avCi\}/(\lambda - \epsilon)] \times$$

$$\exp[-\{\lambda - (\lambda - \epsilon) \cdot Cth/avCi\}/\epsilon]$$

Figure 15:
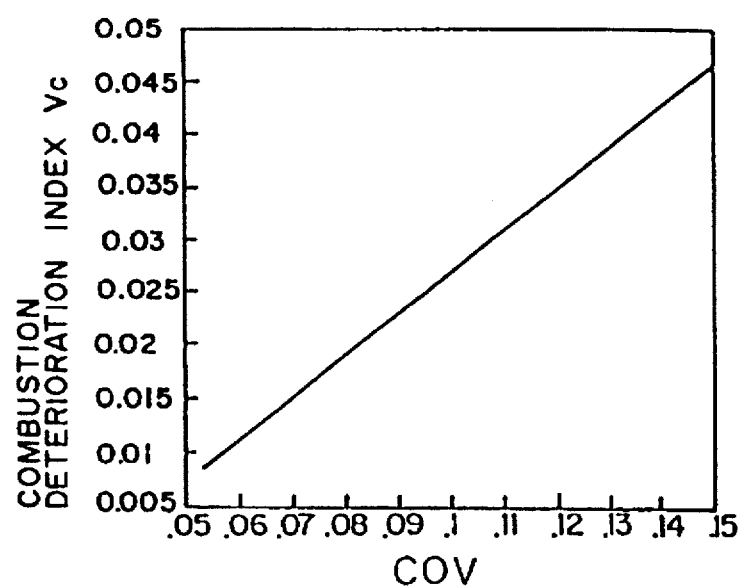

When this deteriorated combustion index Vc is plotted against the combustion variance COV by changing $\epsilon$, a graph is also obtained as shown in FIG. 15.

Namely, FIG. 15 shows the correlation between the combustion variance COV and the deteriorated combustion index Vc by plotting the former along the abscissa and the latter along the ordinate, respectively. As is shown in the diagram, they can be said to have a good linear correlation.

Accordingly, there is the good correlation between the deteriorated combustion index Vc and the combustion variance COV. By adopting the deteriorated combustion index Vc as a control element against combustion variance and conducting feedback control, the control can be performed in a probabilistically stable and precise manner.

In the present embodiment in which the rotational variation IAC(j) of the rotating shaft driven by combustions in the internal combustion engine is used as a parameter representing the state of an output from the internal combustion engine instead of the inner cylinder pressure Pi whose measurement is difficult and the deteriorated combustion determining value VAC(j) is adopted as the deteriorated combustion index Vc, there is the good correlation between the deteriorated combustion determining value VAC(j) and the combustion variance COV. By performing control in which the deteriorated combustion determining value VAC (j) is adopted as a control element against combustion variance, the control can be conducted in a probabilistically stable and precise manner.

Incidentally, statistical data are obtained by cumulating the deteriorated combustion determining value VAC(j) for the constant period (128). When a predetermined integrating period for obtaining such statistical control data has been gone through, the routine advances through the "YES" route from step AS11 and step AS12 to step AS18 are performed.

First, the number n is reset to "1" in step AS12. Then, in step AS14 and step AS16, the deteriorated combustion determining value VAC(j) is referred to and is compared with the predetermined reference value set by said reference value setting means 112.

Figure 9:
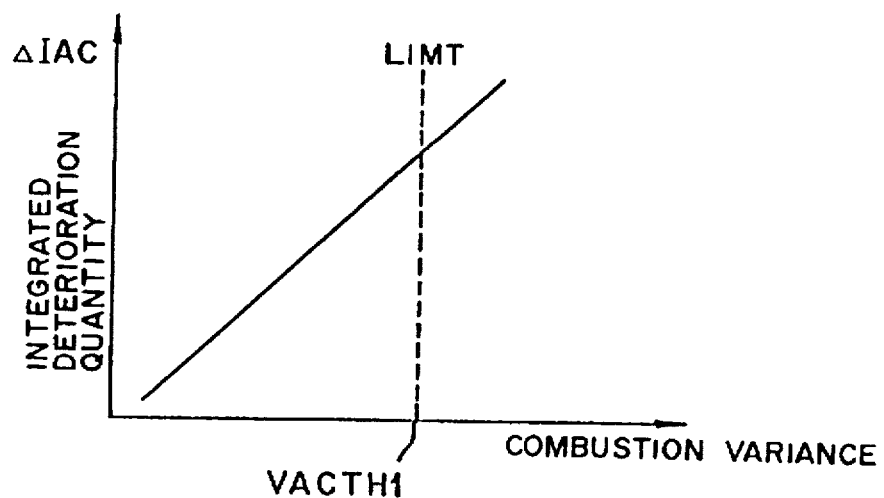

First, the comparison between the deteriorated combustion determining value VAC(j) and the upper limit reference value VACTH1 is performed. When the deteriorated combustion determining value VAC(j) is greater than the upper limit reference value VACTH1, namely, when the deterioration quantity of combustion variance is greater than the upper limit reference value VACTH1 as shown in FIG. 9, calculation of the correction coefficient KAC(j) is performed in step AS15.

$$KAC(j) = KAC(j) + KAR \cdot \{VAC(j) - VACTH1\} \qquad (1\text{-}36)$$

This is to calculate the correction value of the rich-side upper right characteristics shown in FIG. 7. Taking the combustion variance value as having deteriorated to or beyond the predetermined level, an enriching correction for increasing the fuel injection quantity is performed by calculating the correction coefficient KAC(j).

Here, KAR is the coefficient indicating the gradient of the characteristics. KAC(j) on the right side indicates a correction coefficient calculated in the preceding computation cycle (n−1) and is updated according to the above formula.

On the other hand, where the deteriorated combustion determining value VAC(j) is smaller than the lower limit reference value VACTH2, the routine advances through the "YES" route after step AS16, and the combustion is taken as permitting further leaning so that a leaning correction for reducing the fuel injection quantity is performed by calculating a correction coefficient KAC(j) in accordance with the following formula (see step AS17):

$$KAC(j) = KAC(j) - KAL \cdot \{VAC(j) - VACTH2\} \qquad (1\text{-}37)$$

This is to calculate the correction value of the lean-side lower left characteristics shown in FIG. 7, and KAL is the coefficient indicating the gradient of the characteristics.

Further, where the deteriorated combustion determining value VAC(j) is equal to or greater than the lower limit reference value VACTH2 but is equal to or smaller than the upper limit reference value VACTH1, the routine advances through the "NO" route after both step AS14 and step AS16.

The engine is taken as being in an adequate operation state so that no change is made to the correction coefficient KAC(j) to maintain the fuel injection quantity in the preceding state.

This corresponds to the horizontal characteristics between the lean-side lower left characteristics and the rich-side upper right characteristics shown in FIG. 7, and forms the dead zone for corrections.

Here, the lower limit reference value VACTH2 and the upper limit reference value VACTH1 are set with the combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is the value corresponding to the target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of rotational within the limited period (128 cycles) or due to computation based on a value smaller than the threshold.

Step AS18 is then performed to reset the deteriorated combustion determining value VAC(j) at "0".

Further, if the correction coefficient KAC(j) is greater or smaller than the upper or lower limit value in step AS19, the correction coefficient is clipped at the limit value on the corresponding side. If KAC(j) is set to fall, for example, within the range of 0.9<KAC(j)<1.1, the correction coefficient is set at 1.1 when the value calculated in step AS15 exceeds 1.1 while the correction coefficient is set at 0.9 when the value calculated in step AS16 is smaller than 0.9.

By gradually conducting a correction without conducting any abrupt correction as described above, occurrence of a shock or the like can be prevented and the control can be performed stably.

In step AS20, the basic injection pulse width is corrected upon injection of fuel by the correction coefficient KAC(j) determined as described above.

$$Tinj(j)=TB \times KAC(j) \times K \times KAFL+Td \qquad (1\text{-}38)$$

By the correction to the basic injection pulse width, the control of the combustion variance adjusting element 106 by said combustion state controlling means 105 is performed so that the engine is maintained in a desired lean limit operation state. Incidentally, control of an EGR quantity can also be contemplated as the combustion adjusting element.

Operations are performed as described above. According to this first embodiment, the following effects or advantages are brought about.

(1) It is possible to perform estimation of a combustion variance of an engine by taking probabilistic characteristic of engine torque into account and also to perform an air/fuel ratio control by using the estimation.

(2) Combustion state control of an engine, which takes statistical nature of a combustion variance, can be performed in real time and by an on-vehicle computer.

(3) Differences in combustion variance limit among the cylinders due to variations in air/fuel ratio, which are in turn caused by variations among injectors, variations in configuration among intake pipes and/or shifts in valving timing, can be surely corrected, whereby the individual cylinders can all be set at a combustion limit.

(4) Owing to the above items, the emission of NOx can be minimized.

(5) The detection or control of revolution variance for each cylinder can be performed by a single crank angle sensor, thereby making it possible to perform surer lean-burn control at low cost.

(b) Description of the second embodiment

A description will next be made of the combustion state control system according to the second embodiment of the present invention.

An engine for an automotive vehicle, said engine being equipped with the system according to this embodiment, is also constructed like the above-described first embodiment as a lean-burn engine which performs a lean-burn operation at an air/fuel ratio leaner than a stoichiometric air/fuel ratio under predetermined operation conditions. An overall construction diagram of the engine system and a hardware block diagram showing its control system are similar to those shown in FIGS. 2 and 3 as in the above-described first embodiment. Their description is therefore omitted herein.

Figure 16:
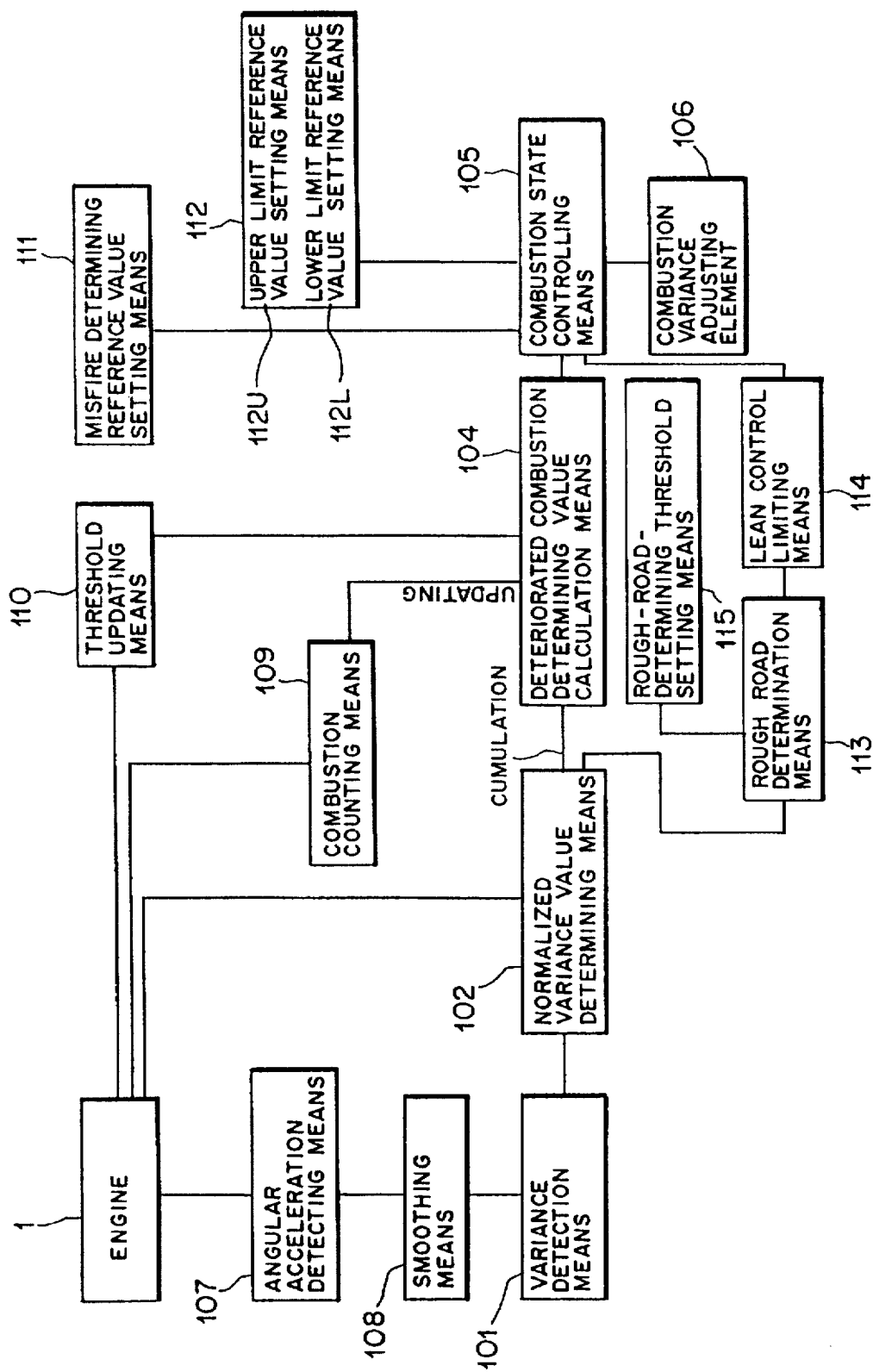

Now paying attention to fuel injection control (air/fuel ratio control) in this embodiment too, for this fuel injection control (control of an injector drive time), ECU 25 is provided, as shown in FIG. 16, with functions of said variance detection means 101, said normalized variance value determining means 102, said deteriorated combustion determining value calculation means 104, said combustion state controlling means 105, combustion variance adjusting element 106, said angular acceleration detecting means 107, said smoothing means 108, said threshold updating means 110, said misfire determining reference value setting means 111, rough road determination means 113 and lean control limiting means 114.

Here, the combustion variance adjusting element 106 is to adjust a fuel injection pulse width Tinj to a desired state by a control signal from the combustion state controlling means 105 so that a lean-burn operation is performed at an air/fuel ratio which is supposed to be achieved. The injector 9 functions as the combustion variance adjusting element 106.

Incidentally, the fuel injection pulse width Tinj is expressed by the following formula:

$$Tinj(j)=TB \cdot KAC(j) \cdot K \cdot KAFL+Td \qquad (2\text{-}1)$$

or $$Tinj(j)=TB \cdot KAC(j) \cdot K+Td \qquad (2\text{-}2)$$

TB in the above formula is a basic drive time of the injector 9. From information on an inducted air quantity A from the air flow sensor 17 and information on an engine speed N from the crank angle sensor (engine speed sensor) 24, information on an inducted air quantity A/N per engine revolution is obtained and based on this information, the basic drive time TB is determined.

On the other hand, KAFL is a leaning correction coefficient and from characteristics stored in a map, is determined corresponding to an operation state of the engine. The air/fuel ratio can therefore be made lean or stoichiometric depending on the operation state.

KAC(j) is, as will be described subsequently herein, a correction coefficient for performing combustion state control in correspondence to variance in combustion.

Further, the correction coefficient K is set in accordance with the engine coolant temperature, the inducted air temperature, the atmospheric pressure and the like. By the dead time (invalid time) Td, the drive time is corrected according to the battery voltage.

It is also designed to perform a lean-burn operation when predetermined conditions are found to be met by lean operation condition determining means.

Accordingly, the ECU 25 has the function of air/fuel ratio controlling means which controls the air/fuel ratio to have an air/fuel ratio on a side leaner than a stoichiometric air/fuel ratio under predetermined operation conditions.

Incidentally, the combustion state controlling system according to this embodiment is also equipped with said angular acceleration detecting means 107 which detects an angular acceleration of the rotating shaft (crankshaft) driven by the engine. Said angular acceleration detecting means 107 is of a similar construction as to that in the first embodiment and therefore, its description is omitted herein.

The engine combustion state controlling system according to this embodiment is also provided with said variance detection means 101 for detecting a variance in angular acceleration by using a detection signal from said angular acceleration detecting means 107. Computation by this variance detection means 101 is the same as that performed by the corresponding means in the first embodiment and therefore, its description is omitted herein.

Also provided is said deteriorated combustion determining value calculation means 104, which compares the normalized variance value IAC(n) with a predetermined threshold IACTH to determine a deteriorated combustion determining value VAC(j). This deteriorated combustion determining value VAC(j) is obtained by cumulating the quantities of deteriorations in each of which the normalized variance value IAC(n) is smaller by the corresponding deterioration quantity than the threshold IACTH. This deteriorated combustion determining value VAC(j) is also determined in the same manner as in the above-described first embodiment.

Namely, $$VAC(j)=\Sigma\{IAC(j)<IACTH\}\times\{IACTH-IAC(j)\} \quad (2\text{-}3)$$

In the above formula, $\{IAC(j)<IACTH\}$ is a function which stands for "1" when $IAC(j)<IACTH$ is met but for "0" when this condition is not met. When each normalized variance value IAC(n) is smaller than the predetermined threshold IACTH, this negative difference is cumulated as a deterioration quantity.

Accordingly, the deteriorated combustion determining value VAC(j) is obtained by cumulating each quantity of deterioration which is weighted by the difference between the threshold IACTH and the normalized variance value IAC(j), so that effects of values around the threshold can be minimized to precisely reflect the state of deterioration.

Further, the predetermined threshold IACTH in said deteriorated combustion determining value calculation means 104 is updated corresponding to the state of operation of the engine by said threshold updating means 110.

Incidentally, the above-described suffix "j" indicates the number of each cylinder.

As an alternative, the deteriorated combustion determining value VAC(j) may also be determined by using a simpler program and cumulatively counting the number of detections in each of which the normalized variance value IAC(n) is smaller than the threshold IACTH (namely, $VAC(j)=\Sigma\{IAC(j)<IACTH\}$).

Computation results from said deteriorated combustion determining value calculation means 104, such as those described above, are employed at said combustion state controlling means 105.

Namely, referring to the deteriorated combustion determining value VAC(j) calculated by said deteriorated combustion determining value calculation means 104, said combustion state controlling means 105 controls the combustion variance adjusting element 106 of the engine with respect to the predetermined reference values from reference value setting means 112. Accordingly, said combustion state controlling means 105 performs leaning control of the air/fuel ratio on the basis of a normalized variance value.

As the reference values for the control of the combustion variance adjusting element 106 by said combustion state controlling means 105, are provided an upper limit reference value (VACTH1) set by upper limit reference value setting means 112U and a lower limit reference value (VACTH2) set by upper limit reference value setting means 112L.

The control by the combustion variance adjusting element 106 is performed so that the deteriorated combustion determining value VAC(j) falls between the upper limit reference value (VACTH1) and the lower limit reference value (VACTH2).

More specifically, the control by the combustion variance adjusting element 106 is performed by correcting the basic injection pulse width upon injection of fuel as described above. The injection pulse width Tinj(j) is calculated in accordance with the following formula:

$$Tinj(j)=TB\times KAC(j)\times K\times KAFL+Td \quad (2\text{-}4)$$

or $$Tinj(j)=TB\times KAC(j)\times K+Td \quad (2\text{-}5)$$

Further, the correction coefficient KAC(j) in the above formula can be adjusted as will be described next.

First, where the deteriorated combustion determining value VAC(j) is greater than the upper limit reference value VACTH1, the combustion variance value is taken as having deteriorated to or beyond the predetermined level. An enriching correction for increasing the fuel injection quantity is therefore performed by calculating a correction coefficient KAC(j) in accordance with the following formula:

$$KAC(j)=KAC(j)+KAR\cdot\{VAC(j)-VACTH1\} \quad (2\text{-}6)$$

This is to calculate the correction value of the rich-side upper right characteristics among the correction characteristics shown in FIG. 7, and KAR is a coefficient indicating the gradient of the characteristics. KAC(j) on the right side indicates a correction coefficient calculated in the preceding computation cycle (n−1) and is updated according to the above formula.

FIG. 7 shows correction characteristics by plotting deteriorated combustion determining values VAC along the abscissa and correction coefficients KAC along the ordinate.

On the other hand, where the deteriorated combustion determining value VAC(j) is smaller than the lower limit reference value VACTH2, the combustion is taken as permitting further leaning so that a leaning correction for reducing the fuel injection quantity is performed by calculating a correction coefficient KAC(j) in accordance with the following formula:

$$KAC(j)=KAC(j)-KAL\cdot\{VAC(j)-VACTH2\} \quad (2\text{-}7)$$

This is to calculate the correction value of the lean-side lower left characteristics shown in FIG. 7, and KAL is a coefficient indicating the gradient of the characteristics.

Further, where the deteriorated combustion determining value VAC(j) is equal to or greater than the lower limit reference value VACTH2 but is equal to or smaller than the upper limit reference value VACTH1, the engine is taken as being in an adequate operation state so that no change is made to the correction coefficient KAC(j) to maintain the fuel injection quantity in the preceding state.

This corresponds to horizontal characteristics between the lean-side lower left characteristics and the rich-side upper right characteristics shown in FIG. 7 and forms a dead zone for corrections.

Here, the lower limit reference value VACTH2 and the upper limit reference value VACTH1 are set with a combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is a value corresponding to a target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of revolution variance within a limited period (128 cycles) or due to computation based on a value smaller than the threshold.

The above-described correction coefficient KAC(j) is designed to be clipped at both upper and lower limits and is set to meet, for example, the following inequality: 0.9<KAC(j)<1.1. The correction coefficient is therefore set to avoid any abrupt correction and to gradually perform a correction so that occurrence of a shock or the like can be prevented and the control can be performed stably.

Further, the deteriorated combustion determining value VAC(j) can be updated every preset number of combustions, for example, every 128 cycles. By performing the control while ascertaining the state of combustion over a relative long period, the control can be performed stably and surely while reflecting statistical characteristics.

These construction and operations are the same as in the above-described first embodiment.

Also provided is a rough road determining means 113, which determines rough road running based on a change in the normalized variance value IAC(n) toward the accelerated side beyond a predetermined rough road determining upper limit threshold (rough road determining threshold) IACTHU from rough road determining threshold setting means 115. Moreover, there is also provided a lean control limiting means (leaning control limiting means) 114, which limits lean control (air/fuel ratio leaning control) at said combustion state controlling means 105 on the basis of the results of a determination by said rough road determining means 113.

The rough road determining means 113 also cumulates quantities of deteriorations in each of which the normalized variance value IAC(n) is smaller toward the decelerated side by the corresponding deterioration quantity than a predetermined rough road determining lower limit threshold (rough road determining threshold) IACTHL, so that determination of a rough road can be performed more accurately.

Figure 21:
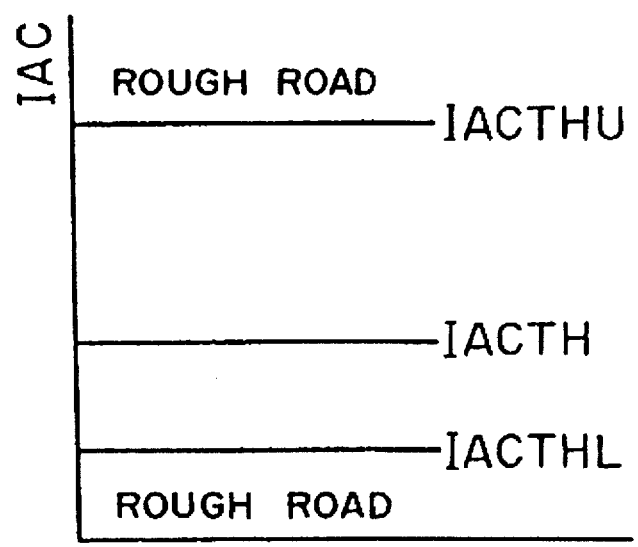

Incidentally, the quantity relationship among the rough road determining upper limit threshold IACTHU, the rough road determining lower limit threshold IACTHL and the combustion determining threshold IACTH is set as shown in FIG. 21, mamely, is IACTHU>IACTH>IACTHL.

Said rough road determining means 113 is designed to perform predetermined computation by using individual thresholds and reference values, such as those to be described below, as values to be compared with, so that determination can be made as required.

First, whenever the normalized variance value IAC(n) exceeds the rough road determining upper limit threshold IACTHU toward the accelerated side, the quantity by which the upper limit threshold has been exceeded is cumulated, whereby a rough road determining upper value VACU(j) is calculated as the results of the cumulation.

Further, whenever the normalized variance value IAC(n) exceeds the rough road determining lower limit threshold IACTHL toward the decelerated side, the quantity by which the lower limit threshold has been exceeded is cumulated, whereby a rough road determining lower value VACL(j) is calculated as the results of the cumulation.

A rough road determining index MM is then obtained by counting the number of detections which satisfy the condition that the rough road determining upper value VACU(j) exceeds an upper rough road reference value VACUL and the rough road determining lower value VACL(j) exceeds a lower rough road reference value VACLL. It is designed to determine rough road running when the rough road determining index MM exceeds a rough road index determining value m2.

When rough road running has been determined, a value which does not perform any correction by the leaning correction coefficient KAFL is calculated at said lean control limiting means 114 upon calculation of the injection pulse width Tinj(j) in the fuel injection control, so that the lean control is limited.

When said lean control limiting means 114 is not activated, the injection pulse width Tinj(j) is calculated in accordance with the following formula:

$$Tinj(j)=TB \times KAC(j) \times K \times KAFL + Td \qquad (2\text{-}8)$$

Upon actuation of said lean control limiting means 114 subsequent to determination of rough road running, on the other hand, the injection pulse width Tinj(j) is calculated in accordance with the following formula:

$$Tinj(j)=TB \times KAC(j) \times K + Td \qquad (2\text{-}9)$$

Accordingly, with respect to a correction specifically related to the leaning correction coefficient KAFL, the leaning control is limited.

Figure 17:
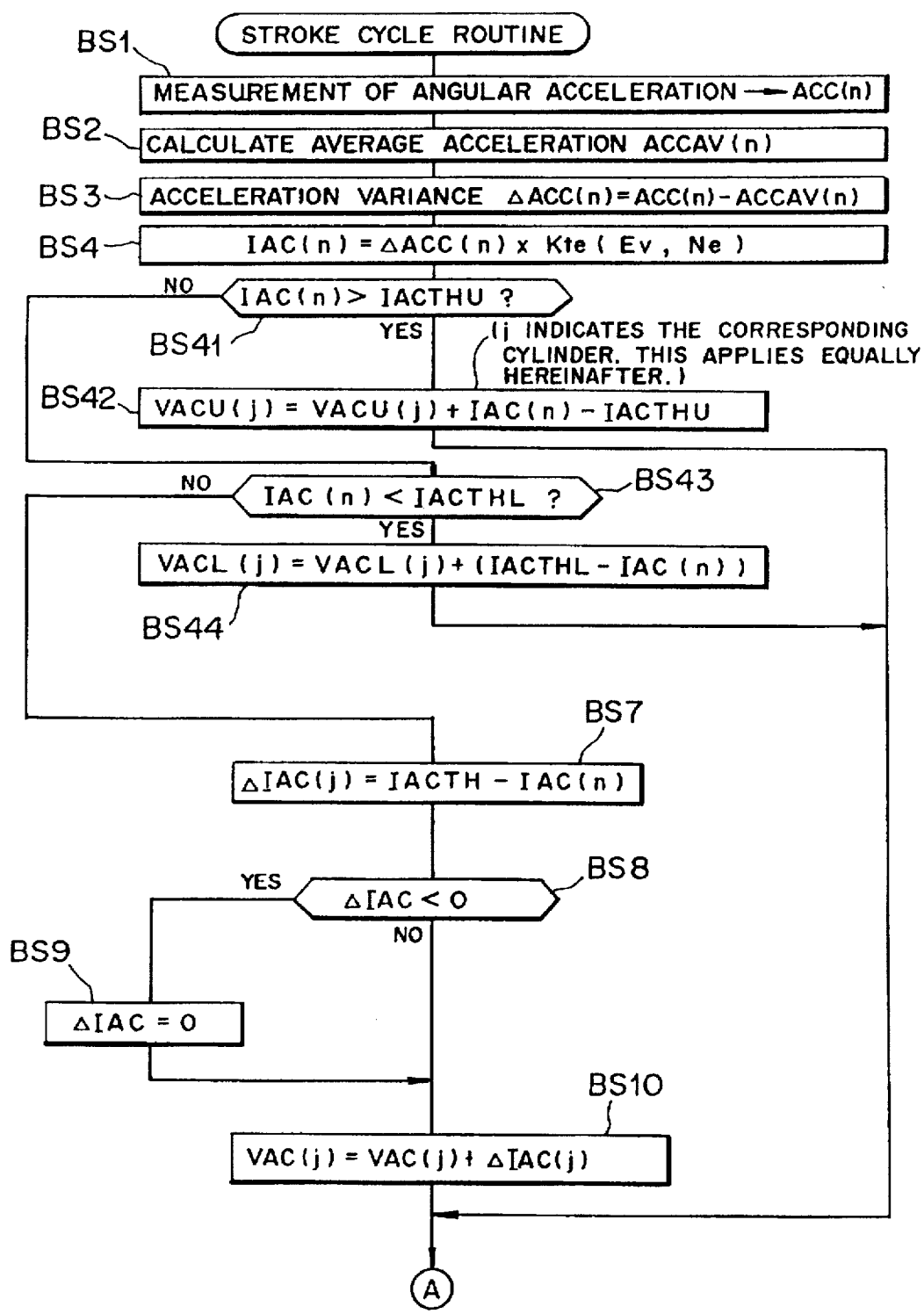
Figure 18:
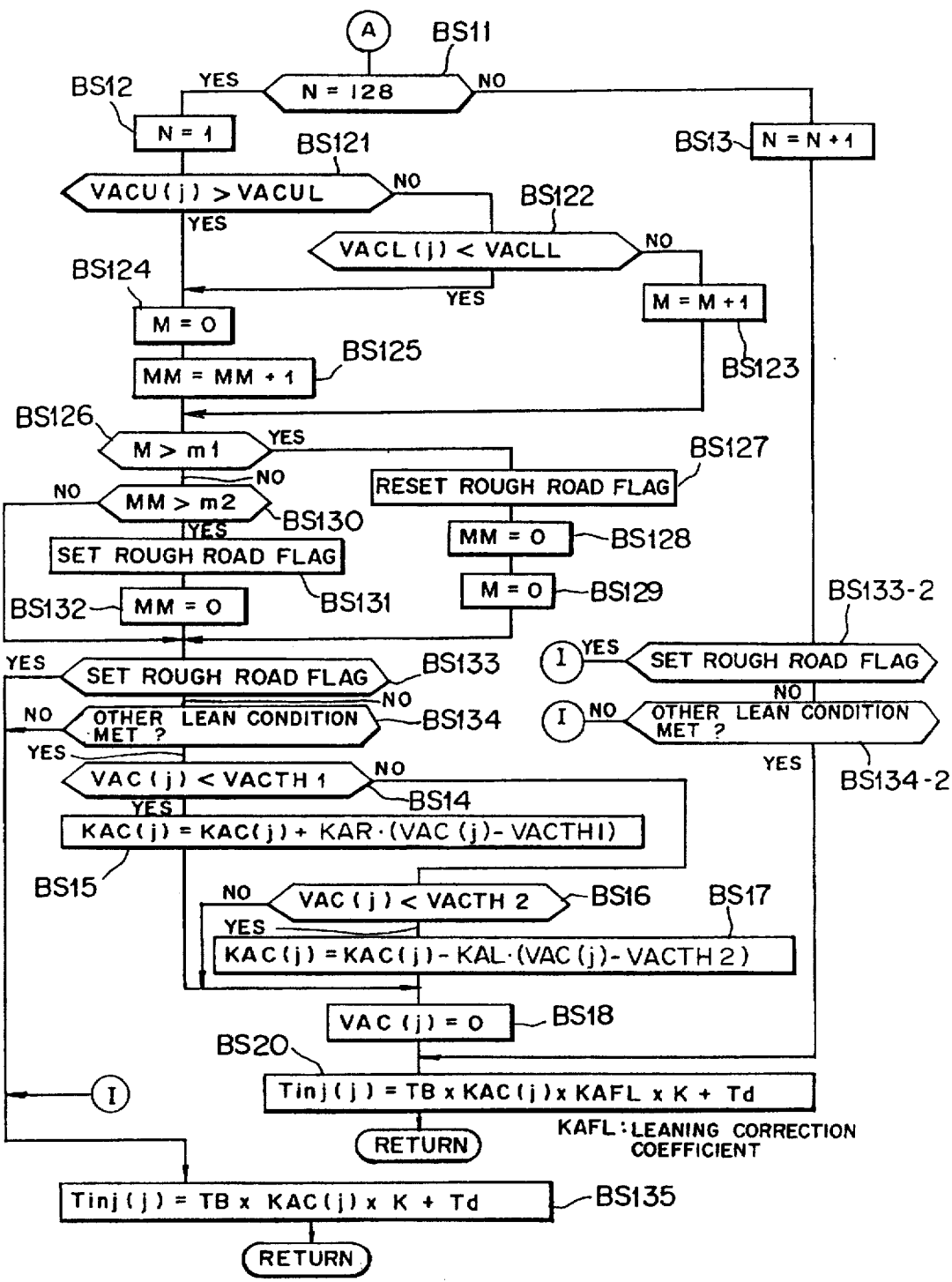

As the engine combustion state controlling system according to the second embodiment of this invention is constructed as described above, the operations shown in the flow charts in FIG. 17 and FIG. 18 are successively performed during a lean-burn operation.

First, in step BS1, an angular acceleration ACC(n) is detected by said angular acceleration detecting means 107.

Here, computation employed for the detection is performed in accordance with the following formula:

$$ACC(n)=1/TN(n) \cdot \{KL(m)/TN(n)-KL(m-1)/TN(n-1)\} \qquad (2\text{-}10)$$

where KL(m) is a segment correction value. To perform a correction with respect to the currently identified cylinder so that any error in the measurement of the period due to variations in the angular intervals of the vanes caused upon fabrication and mounting of the vanes can be eliminated, a segment correction value KL(m) is calculated in accordance with the following formula:

$$KL(m)=\{KL(m-3) \times (1-XMFDKFG)+KR(n) \times (XMFDKFD)\} \qquad (2\text{-}11)$$

where XMFDKFG represents a segment correction value gain.

On the other hand, KR(n) in the above formula is determined in accordance with the following formula:

$$KR(n)=3 \cdot TN(n)/\{TN(n)+TN(n-1)+TN(n-2)\} \qquad (2\text{-}12)$$

This is a measurement value corresponding to an average measurement time period from the measurement time period TN(n−2) of the two measurements ago until the measurement time period TN(n) of the current measurement. Upon calculation of the segment correction value KL(m), the primary filtering processing by the segment correction value gain XMFDKFG is performed by using the above-described formula.

An average acceleration ACCAV(n) is then calculated in step BS2.

Here, ACCAV(n) is the smoothed value obtained by smoothing the detected angular velocity ACC(n) by said smoothing means 108 and is calculated by conducting a primary filtering processing in accordance with the following formula:

$$ACCAV(n)=\alpha \cdot ACCAV(n-1)+(1-\alpha) \cdot ACC(n) \quad (2\text{-}13)$$

where $\alpha$ is an updating gain in the primary filtering processing and takes a value of 0.95 or so.

In step BS3, an acceleration variance value $\Delta ACC(n)$ is next detected by said variance detection means 101.

Namely, by determining the difference between the angular velocity ACC(n) detected by said angular acceleration detection means 107 and the average acceleration ACCAV (n) as the smoothed value obtained by smoothing by said smoothing means 108, an acceleration variance value $\Delta ACC$ (n) is calculated in accordance with the following formula:

$$\Delta ACC(n)=ACC(n)-ACCAV(n) \quad (2\text{-}14)$$

In step BS4, a normalized variance value IAC(n), which is obtained by normalizing the variance value $\Delta ACC(n)$ outputted from said variance detection means 101 in accordance with the state of operation of the engine, is calculated by said normalized variance value determining means 102 in accordance with the following formula:

$$IAC(n)=\Delta ACC(n) \cdot Kte(Ev,Ne) \quad (2\text{-}15)$$

where Kte(Ev,Ne) is an output correction coefficient and is set by the characteristics shown in FIG. 10.

The characteristic of FIG. 10 are illustrated by plotting volumetric efficiencies Ev along the abscissa and output correction coefficients Kte(Ev,Ne), which correspond to the volumetric efficiencies Ev, along the ordinate, and the characteristics of a curve on a more upper right side are adopted as the engine speed Ne becomes higher.

Accordingly, in the characteristics of FIG. 10 stored as a map, the output correction coefficient Kte(Ev,Ne) is set at ECU 25 from the engine speed Ne calculated from the detection signal of the crank angle sensor 220 or the like and the volumetric efficiency Ev, so that normalization is performed by a correction corresponding to an engine output.

Here, a description will be made of control characteristics where normalization is conducted corresponding to an engine output as described above.

Namely, an angular acceleration $\omega'$ is expressed as shown by the following formula:

$$\omega'=1/Ie \cdot (Te-Tl) \quad (2\text{-}16)$$

where Te is an engine torque, Tl is a load torque, and Ie is a moment of inertia.

On the other hand, $$\omega'=\omega_o'+\Delta \omega' \quad (2\text{-}17)$$

where $\omega_o'$ is an average angular acceleration.

From formulae (2-16) and (2-17), $$\omega_o'+\Delta \omega' = 1/Ie \cdot (Te-Tl) \quad (2\text{-}18)$$
$$= 1/Ie \cdot (Te_o-Tl)+\Delta Te/Ie$$

Hence, $\Delta \omega'=\Delta Te/Ie$ \quad (2-19)

Incidentally, according to the above-described detection method of the angular acceleration ACC(n) in step BS1, engine torque information is stored relatively well where no load disturbance exists. Further, as is indicated by formula (2-19), by conducting the control while using a variance $\Delta \omega'$ from the average angular acceleration $\omega_o'$ [acceleration variance value $\Delta ACC(n)$] and the normalized output taking the moment of inertia Ie into account [normalized variance value IAC(n)], the control can be performed while taking into account the statistical nature of combustion variance and surely reflecting the combustion variance.

After the operation of step BS4 has been performed, calculations of the rough road determining values VACU, VACL are then performed in steps BS41 through BS44.

Namely, it is determined in step BS41 whether or not the normalized variance value IAC(n) is greater than the rough road determining upper limit threshold IACTHU. If greater, the routine advances through the "YES" route and the rough road determining upper value VACU(j) is calculated in accordance with the following formula (see step BS42):

$$VACU(j)=VACU(j)+IAC(n)-IACTHU \quad (2\text{-}20)$$

Further, it is also determined in step BS43 whether or nor the normalized variance value IAC(n) is smaller than the rough road determining lower limit threshold IACTHL. If smaller, the routine advances through the "YES" route and the rough road determining lower value VACL(j) is calculated in accordance with the following formula (see step BS44):

$$VACL(j)=VACL(j)+IAC(n)-IACTHL \quad (2\text{-}21)$$

Namely, the rough road determining upper value VACU(j) and the rough road determining lower value VACL(j) are calculated as the cumulation of quantities by which the normalized variance value IAC(n) is greater than the rough road determining upper limit threshold IACTHU and the cumulation of quantities by which the normalized variance value IAC(n) is smaller than the rough road determining lower value VACL(j), respectively.

When these computations are performed, the normalized variance value IAC(n) has not changed due to deterioration in the state of combustion but the change in the normalized variance value has been caused by a revolution variance occurred due to a slip or the like of a wheel. The routine therefore advances to step BS11 without performing the operations for the calculation of the deteriorated combustion determining value VAC(j) in step BS7 through step BS10.

Where the normalized variance value IAC(n) is a value between the rough road determining upper limit threshold IACTHU and the rough road determining lower limit threshold IACTHL, the routine advances through the "NO" routes subsequent to step BS41 and step BS43, respectively, so that the operations in step BS7 through step BS10 are performed.

Because the change in the normalized variance value IAC(n) has not occurred due to a slip or the like for a rough road but has occurred due to a change in the state of combustion, the operation by said deteriorated combustion determining value calculation means 104 is performed, whereby the normalized variance value IAC(n) is compared with the predetermined threshold IACTH and the deteriorated combustion determining value VAC(j) is calculated in accordance with the following formula:

$$VAC(j)=\Sigma\{IAC(J)<IACTH\}\times\{IACTH-IAC(J)\} \quad (2\text{-}22)$$

First, in step BS7, the difference ΔIAC(n) between the normalized variance value IAC(n) and the predetermined threshold IACTH is calculated. It is next determined in step BS8 whether or not the difference ΔIAC(n) is negative.

This determination corresponds to the function {IAC(J) <IACTH} in the above formula, and an operation is performed to take "1" when IAC(J)<IACTH has been met but "0" when IAC(J)<IACTH has not been satisfied.

Because ΔIAC(n) is positive when IAC(J)<IACTH has been met, the routine advances through the "NO" route so that cumulation of the deteriorated combustion determining value VAC(j) is performed in step BS10, resulting in the state that the above-described function has taken "1".

When IAC(J)<IACTH has not been satisfied on the other hand, ΔIAC(n) is negative so that the routine advances through the "YES" route and ΔIAC(n)=0 is performed in step BS9. This leads to the state that the cumulation of the deteriorated combustion determining value VAC(j) is not performed in step BS10, resulting in the state that the above-described function has taken "0".

Accordingly, when the normalized variance value IAC(n) is smaller than the predetermined threshold IACTH as indicated by dots A to D in FIG. 8, these negative differences are cumulated as deterioration quantities.

Accordingly, the deteriorated combustion determining value VAC(j) is obtained by cumulating each deterioration quantity which is weighed by the difference between the threshold IACTH and the normalized variance value IAC(j), so that effects of values around the threshold can be minimized to have the state of deterioration precisely reflected to the deteriorated combustion determining value VAC(j).

Further, the predetermined threshold IACTH in said deteriorated combustion determining value calculation means 104 is updated corresponding to the state of operation of the engine by said threshold updating means 110, thereby making it possible to realize an operation state still closer to the lean limit.

Incidentally, the above-described suffix "j" indicates the number of each cylinder. The deteriorated combustion determining value VAC(j) is cumulated with resect to each cylinder j.

Next, step BS11 is performed to determine whether N, which indicates the number of samplings, has exceeded 128 or not.

In other words, it is determined whether or not the integrating range shown in FIG. 8 has been gone through. If not, the routine advances through the "NO" route and step BS13 is performed to increase the number N by "1". When no rough road flag has been set but the other lean conditions have been met (see step BS133-2 and BS134-2), step BS20 is performed without conducting any fuel correction. As a consequence, in the integrating range of 128 cycles, the correction by the correction coefficient KAC(j) to the injection pulse width Tinj is not performed and cumulation of the deteriorated combustion determining value VAC(j) is performed primarily.

Accordingly, the deteriorated combustion determining value VAC(j) is updated every preset number of combustions, for example, every 128 cycles. By conducting control while ascertaining the state of combustion over a relatively long period, the control can be performed stably and surely while reflecting statistical characteristics.

When the integrating range has been gone through, the routine advances through the "YES" route subsequent to step BS11 so that the operations of steps BS12 and onwards are performed.

First, the number N is reset to "1" in step BS12 and next, it is determined in step BS121 whether or not the rough road determining upper value VACU(j) is greater than the preset upper rough road reference number VACUL. If greater, the routine advances through the route "YES" so that a non-rough road determining index M is set at "0" in step BS124.

When the rough road determining upper value VACU(j) is not greater than the upper rough road reference value VACUL on the other hand, the routine advances through the "NO" route, followed by further determination in step BS122.

It is determined in step BS122 whether or not the rough road determining lower value VACL(j) is greater than the preset lower rough road reference value VACLL. If greater, the routine advances through the "YES" route and the non-rough road determining index M is reset to "0" in step BS124.

After step BS124, the running state is taken as a rough road running state irrespective to the route so that in step BS125, the rough road determining index MM is incremented.

When the rough road determining lower value VACL(j) is not greater than the lower rough road reference value VACLL, the routine advances through the "NO" route subsequent to step BS122. Step BS123 is therefore performed to add "1" to the non-rough road determining index M, resulting in an increase in the non-rough road determining index M.

Figure 19:
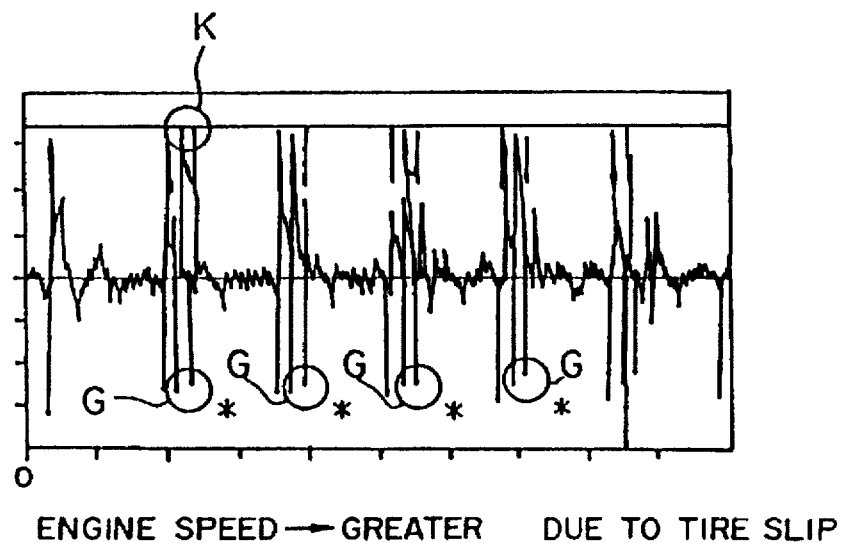

Namely, where the rough road determining upper value VACU(j) exceeds the upper rough road reference value VACUL on the accelerated side, the state is the one indicated by a dot K in FIG. 19. Where the rough road determining lower value VACL(j) exceeds the lower rough road reference value VACLL on the decelerated side, the state is the one indicated by a dot G in FIG. 19. Revolution variance of the engine therefore occurs on both the accelerated side and the decelerated side.

Figure 20:
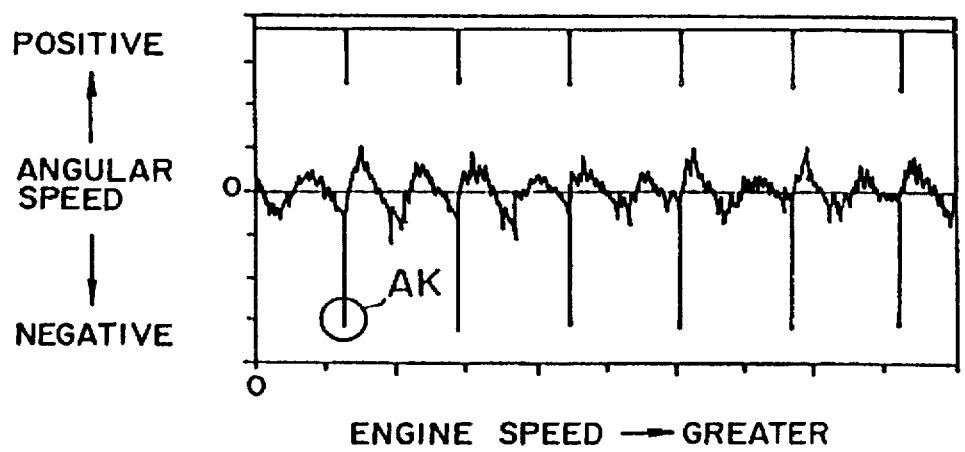

In contrast, variance in angular acceleration at a dot AK in FIG. 20 occurs only on the decelerated side.

Analyzing these phenomena through a comparison therebetween, the state in FIG. 20 is a variance toward the decelerated side due to deterioration in combustion. It is therefore considered that the state in FIG. 20 does not occur by deterioration in combustion but is a variance in angular acceleration caused by a slip or the like of a wheel on a rough road.

Therefore, the situation which corresponds to the state shown in FIG. 19 and leads to step BS125 is interpreted as running on a rough road, so that the addition to the rough road determining index MM is conducted.

The rough road determining index MM is then compared with the predetermined rough road index determining value m2 in step BS130. If the rough road determining index MM greater than the rough road index determining value m2, the added rough road determining index MM is indicated to be in such a state that rough road running should be determined. Step BS131 is therefore performed so that a rough road flag is set. Thereafter, the rough road determining index MM is reset to "0" (step BS132).

If the non-rough road determining index M exceeds a non-rough road index determining value m1 on the other hand, the routine advances through the YES route after step BS126. Step BS127 is performed so that a rough road flag is reset. After that, the rough road determining index MM and the non-rough road determining index M are each reset to "0" (steps BS128, BS129).

In other words, if the rough road determining upper value VACU(j) or the rough road determining lower value VACL (j) calculated by 128 samplings exceeds the upper rough road reference value VACUL or the lower rough road reference value VACLL, the state is determined to be a rough road running state so that the rough road determining index MM is set and the rough road flag is set. Otherwise, the state is determined to be a state other than a rough road running state so that the rough road flag is reset.

The rough road flag which has been set or reset as described above is referred to in step BS133 or BS133-2. When the rough road flag has been set, the routine advances through the "YES" route and step BS135 is performed.

In step BS135, the operation of said lean control limiting means 114 is performed. This operation is conducted by calculating Tinj(j), which is the width of the fuel injection pulse, in accordance with the following formula and performing fuel injection control based on the thus-calculated value through ECU 25.

$$Tinj(j)=TB \times KAC(j) \times K+Td \quad (2\text{-}23)$$

Compared with a fuel injection pulse width Tinj(j) in step BS20 which will be described subsequently herein, a leaning coefficient KAFL is omitted in the above formula. According to the above formula, a leaning correction using the leaning coefficient KAFL in the fuel injection control is not conducted so that the lean control is limited.

If the rough road flag has not been set, on the other hand, the routine advances through the "NO" route from step BS133 or BS133-2 so that the operation of step BS134 or BS134-2 is performed.

In steps BS134 or BS134-2, it is determined based on detection signals from various sensors if other lean conditions have been met. If not met, the above-described limitation is performed to the lean control in step BS135.

If in step BS134, the lean conditions are determined to have been met, the state is not a rough road running state but is a state where lean control should be performed. Steps BS14 onwards are therefore performed so that an operation is performed under lean control while avoiding deterioration in combustion. If the answer is YES in step BS134-2, the processing of step BS20 is performed.

Namely, when the routine advances through the "YES" route from step BS134, the deteriorated combustion determining value VAC(j) is referred to and compared with the predetermined reference value in step BS14 and step BS15.

Namely, a comparison between the deteriorated combustion determining value VAC(j) and the upper limit reference value (VACTH1) 112U is performed. Where the deteriorated combustion determining value VAC(j) in FIG. 9 is greater than the upper limit reference value VACTH1, the correction coefficient KAC(j) is calculated in step BS15 in accordance with the following formula:

$$KAC(j)=KAC(j)+KAR \cdot \{VAC(j)-VACTH1\} \quad (2\text{-}24)$$

This is to calculate the correction value of the rich-side upper right characteristics shown in FIG. 7. Determining that the combustion variance value has deteriorated to or beyond the predetermined value, an enriching correction for increasing the fuel injection quantity is performed by calculating the correction coefficient KAC(j).

Here, KAR is the coefficient indicating the gradient of the characteristics. KAC(j) on the right side indicates a correction coefficient calculated for the cylinder j in the preceding computation cycle (n−1) and is updated according to the above formula.

On the other hand, where the deteriorated combustion determining value VAC(j) is smaller than the lower limit reference value VACTH2, the routine advances through the "YES" route from step BS16. The combustion is taken as permitting further leaning so that a leaning correction for reducing the fuel injection quantity is performed by calculating the correction coefficient KAC(j) in accordance with the following formula (see step BS17):

$$KAC(j)=KAC(j)-KAL \cdot \{VAC(j)-VACTH2\} \quad (2\text{-}25)$$

This is to calculate the correction value of the lean-side lower left characteristics shown in FIG. 7, and KAL is a coefficient indicating the gradient of the characteristics.

Further, where the deteriorated combustion determining value VAC(j) is equal to or greater than the lower limit reference value VACTH2 but is equal to or smaller than the upper limit reference value VACTH1, the routine advances the "NO" route no matter whether the routine advances form step BS14 or from step BS16. The engine is hence taken as being in an adequate operation state so that no change is made to the correction coefficient KAC(j) to maintain the fuel injection quantity in the preceding state.

This corresponds to the horizontal characteristics between the lean-side lower left characteristics and the rich-side upper right characteristics shown in FIG. 7, and forms the dead zone for corrections.

Here, the lower limit reference value VACTH2 and the upper limit reference value VACTH1 are set with the combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is the value corresponding to the target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of revolution variance within a limited period (128 cycles) or due to computation based on a value smaller than the threshold.

Step BS18 is then performed to reset the deteriorated combustion determining value VAC(j) to "0".

In step BS20, a correction to the basic injection pulse width upon fuel injection is carried out by the correction coefficient KAC(j) determined as described above.

Namely, the injection pulse width Tinj(j) is calculated in accordance with the following formula:

$$Tinj(j)=TB \times KAC(j) \times K \times KAFL+Td \quad (2\text{-}26)$$

By this correction to the basic injection pulse width, the control of the combustion variance adjusting element 106 by said combustion state controlling means 105 is effected so that the engine is maintained in the desired lean limit operation state.

Incidentally, the above-described operations in step BS12 through step BS18 are performed when N=1, that is, in the first one of the 128 cycles. However the operation of step BS20 and that of step BS135 are also performed when N≠1.

When the rough road flag is determined not to have been set in step BS133-2 and the other lean conditions are determined to have been met in step BS134-2, step BS20 is performed to conduct an operation under the lean control.

On the other hand, when it is determined in step BS133-2 that the rough road flag has been set or when it is determined in step BS134-2 that the other lean conditions have not been met, step BS135 is performed so that fuel injection control limited by said lean control limiting means 114 to avoid the correction by the leaning coefficient KAFL is conducted.

Various operations are performed as described above. According to this second embodiment, the following effects or advantages are brought about.

(1) It is possible to perform estimation of a combustion variance of an engine by taking probabilistic characteristic of engine torque into account and also to perform an air/fuel ratio control by using the estimation.

(2) Combustion state control of an engine, which has taken statistical nature of a combustion variance into account, can be performed in real time and by an on-vehicle computer.

(3) Differences in combustion variance limit among the cylinders due to variations in air/fuel ratio, which are in turn caused by variations among injectors, variations in configuration among intake pipes and/or shifts in valving timing, can be surely corrected, whereby the individual cylinders can all be set at a combustion limit.

(4) Owing to the above items, the emission of NOx can be minimized.

(5) The detection or control of revolution variance for each cylinder can be performed by a single crank angle sensor, thereby making it possible to perform surer lean-burn control at low cost.

(6) It is unnecessary to arrange any additional sensor as a measure for rough roads, thereby making it possible to conduct a lean operation without increasing the cost while preventing adverse influence by rough roads.

(7) A stoichiometric mode is used on a rough road where detection is difficult, thereby making it possible to avoid deterioration in exhaust gas and/or deterioration in drivability.

(c) Description of the third embodiment

A description will next be made of the combustion state control system according to the third embodiment of the present invention.

An engine for an automotive vehicle, said engine being equipped with the system according to this embodiment, is also constructed like the above-described first and second embodiments as a lean-burn engine which performs a lean-burn operation at an air/fuel ratio leaner than a stoichiometric air/fuel ratio under predetermined operation conditions. An overall construction diagram of the engine system and a hardware block diagram showing its control system are similar to those shown in FIGS. 2 and 3 as in the above-described first embodiment. Their description is therefore omitted herein.

Figure 22:
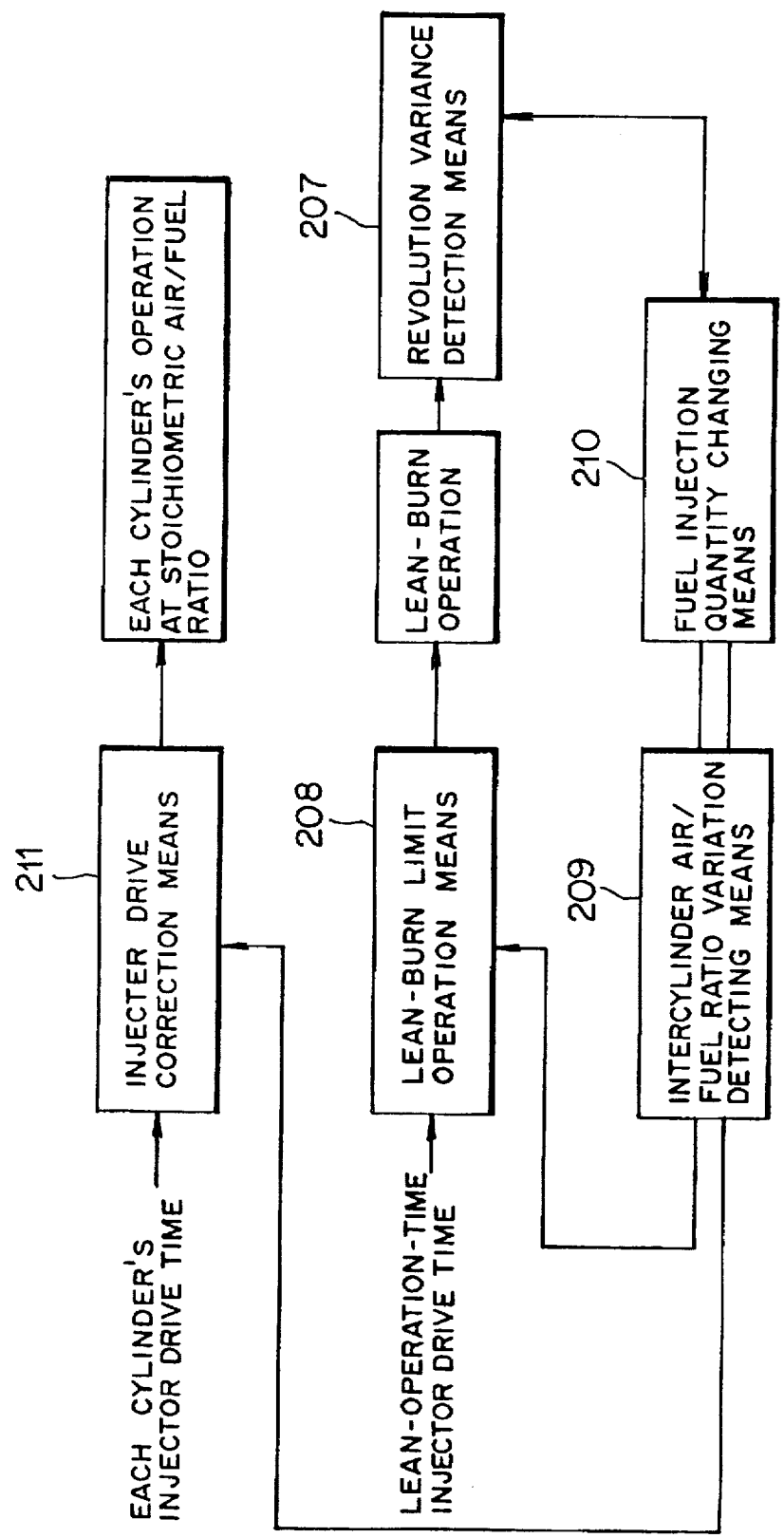

Now paying attention to fuel injection control (air/fuel ratio control) in this embodiment too, for this fuel injection control (control of an injector drive time), an ECU 25 is provided, as shown in FIG. 22, with revolution variance detection means 207, lean-burn limit operation means 208, intercylinder air/fuel ratio variation detecting means 209, interfuel injection quantity changing means 210 and injector drive correction means 211.

Here, said fuel injection quantity changing means 210 adjusts the fuel injection pulse width Tinj into a desired state by a control signal outputted from said lean-burn limit operation means 208 in correspondence to an evolutional variance detected by said revolution variance detecting means 207, so that a lean-burn operation is conducted at an air/fuel ratio to be achieved. The injector 9 functions as said fuel injection quantity changing means 210.

Incidentally, the fuel injection pulse width Tinj is expressed by the following formula:

$$Tinj(j) = TB \times KAFL \times (1 + KC + KAC(j)) \times KAP \times \quad (3\text{-}1)$$
$$KAT \times KWUP \times (1 + KAS) \times KFI \pm$$
$$\text{acceleration/deceleration correction value} + Td$$

TB in the above formula means the basic drive time of the injector 9. From information on an inducted air quantity A from the air flow sensor 17 and information on an engine speed N from the crank angle sensor (engine speed sensor) 24, information on an inducted air quantity A/N per engine revolution is obtained and based on this information, the basic drive time TB is determined.

On the other hand, KAFL is the leaning correction coefficient (excess air percentage) and from the characteristics stored in the map, is determined corresponding to an operation state of the engine. The air/fuel ratio can therefore be made lean or stoichiometric depending on the operation state.

Further, KC is, as will be described subsequently herein, a correction coefficient for conducting combustion state control on a revolution variance corresponding to a combustion variance.

KAC(j) is, as will be described subsequently herein, the correction coefficient for performing at said injector drive correction means 211 injector drive corrections corresponding to variations in air/fuel ratio among cylinders.

Further, correction coefficients KAP, KAT, KWUP, KAS and KFI are set corresponding to the atmospheric pressure, the inducted air temperature, engine coolant temperature and the like, and the drive time is corrected by dead time (invalid time) Td corresponding to the battery voltage.

It is also designed to perform a lean-burn operation when predetermined conditions are found to be met by lean operation condition determining means.

Accordingly, the ECU 25 has the function of air/fuel ratio controlling means which controls the air/fuel ratio to have an air/fuel ratio on a side leaner than a stoichiometric air/fuel ratio under predetermined operation conditions and during an operation at a stoichiometric air/fuel ratio, also has the function of performing injector drive corrections corresponding to variations in air/fuel ratio among the cylinders.

Said revolution variance detection means 207 is provided with said angular acceleration detecting means 107 for detecting an angular acceleration of the rotating shaft (crankshaft) driven by the engine. As this angular acceleration detecting means 107 is also of the same construction as the above-described corresponding means in the first embodiment, its description is omitted herein.

The combustion control system of this embodiment for the internal combustion engine is, as described above, provided with said revolution variance detection means 207 for detecting, with respect to each cylinder (j), a revolution variance VAC which occurs when the multicylinder combustion engine is operated at an air/fuel ratio on a side leaner than the stoichiometric air/fuel ratio and also with said lean-burn limit operation means 208 for operating the internal combustion engine in the vicinity of a lean-burn limit on the basis of the detection results VAC(j) of the revolution variance detection means 207. In addition to these means, the following means are also provided.

Namely, said fuel injection quantity changing means 210 to change the fuel injection quantity Tinj so that during a lean-burn operation by said lean-burn limit operation means 208, the combustion variance obtained from the revolution variance VAC(j) can be maintained within a permissible range.

Also provided is said intercylinder air/fuel ratio variation detecting means 209 for detecting variations in air/fuel ratio among cylinders from changing quantities by said fuel injection quantity changing means 210.

Provided further is said injector drive correction means 211 which corrects, by the detection results KCL(j) of said intercylinder air/fuel ratio variation detecting means 209, the injector drive time Tinj during an operation at a stoichiometric air/fuel ratio.

$$KCL(j)=(KAC(i)-KACAV)\times KST \qquad (3\text{-}2)$$

KST is a gain correction value between a lean air/fuel ratio and a stoichiometric air/fuel ratio whereas KACAV is an average of detection results KAC(j) by said intercylinder air/fuel ratio variation detecting means 209, so that it is designed to perform the correction by the deviation from the average.

$$KACAV=(1/n)\cdot\Sigma KAC(j) \qquad (3\text{-}3)$$

where $\Sigma KAC(j)$ means the sum for j=1 to n.

Said revolution variance detection means 207 is provided with the hardware construction of FIG. 11 and by using a detection signal detected by said angular acceleration detecting means 107 (see FIG. 23) in accordance with the operations shown in FIG. 6, detects a variance value in angular acceleration as described above so that a revolution variance is detected.

Figure 23:
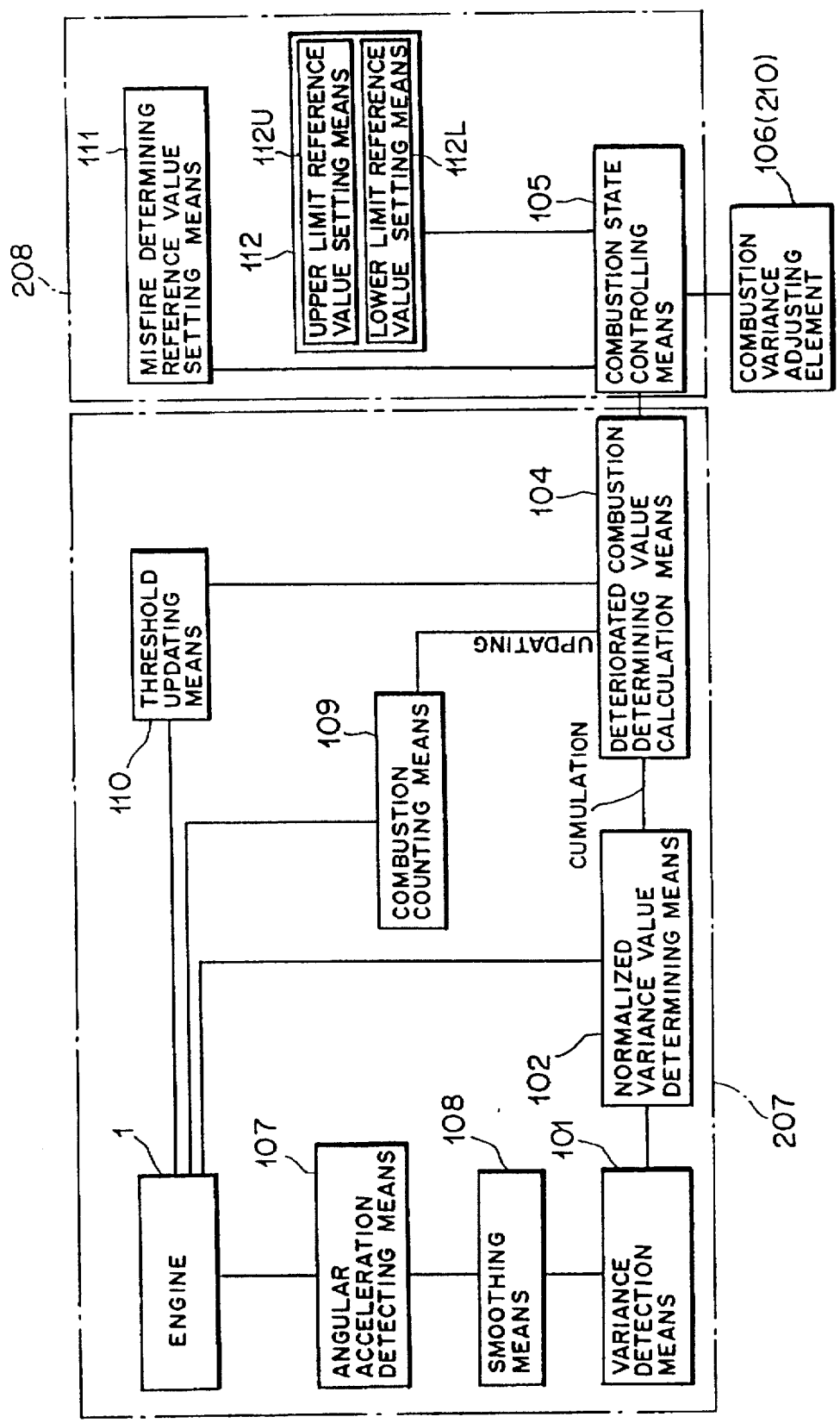

In addition, said revolution variance detection means 207 is, as illustrated in FIG. 23, also provided with said smoothing means 108, said variance detection means 101, said normalized variance value determining means 102, said deteriorated combustion determining value calculation means 104 and said threshold updating means 110. The ECU 25 is equipped with computing means for achieving the functions of these individual means.

The computation by said variance detection means 101 is also conducted, as in the above-described first and second embodiments, by determining the difference between a smoothed value, which has been obtained by smoothing a detected angular velocity by said smoothing means 108, and an angular acceleration outputted from said angular acceleration detecting means 107.

Namely, at said variance detection means 101 too, an acceleration variance value $\Delta ACC(n)$ is calculated by the following formula:

$$\Delta ACC(n)=ACC(n)-ACCAV(n) \qquad (3\text{-}4)$$

Here, ACCAV(n) is the smoothed value obtained by smoothing the detected angular velocity by said smoothing means 108 and is calculated by conducting the primary filtering processing in accordance with the following formula:

$$ACCAV(n)=\alpha\cdot ACCAV(n-1)+(1-\alpha)\cdot ACC(n) \qquad (3\text{-}5)$$

where $\alpha$ is an updating gain in the primary filtering processing and takes a value of 0.85 or so.

Also provided is said normalized variance value determining means 102 which normalizes the variance value $\Delta ACC(n)$ outputted from said variance detection means 101 in accordance with the state of operation of the engine to obtain a normalized variance value IAC(n). As in the first and second embodiments described above, the calculation of the normalized variance value IAC(n) at said normalized variance determining means 102 is also conducted in accordance with the following formula:

$$IAC(n)=\Delta ACC(n)\cdot Kte(Ev,Ne) \qquad (3\text{-}6)$$

where Kte(Ev,Ne) is an output correction coefficient and is set by the characteristics shown in FIG. 10.

Accordingly, the characteristics of FIG. 10 are stored as a map. From an engine speed Ne calculated from a detection signal of the crank angle sensor 24 or the like and a volumetric efficiency Ev, an output correction coefficient Kte(Ev,Ne) is set at ECU 25, so that normalization is performed by a correction corresponding to an engine output.

Also provided is said deteriorated combustion determining value calculation means 104, which compares the normalized variance value IAC(n) with a predetermined threshold IACTH to determine a deteriorated combustion determining value VAC(j). This deteriorated combustion determining value VAC(j) is also obtained, as in the above-described first and second embodiments, by cumulating the quantities of deteriorations in each of which the normalized variance value IAC(n) is smaller by the corresponding deterioration quantity than the threshold IACTH. Namely, the deteriorated combustion determining value VAC(j) is calculated by the following formula:

$$VAC(j)=\Sigma\{IAC(j)<IACTH\}\times\{IACTH-IAC(j)\} \qquad (3\text{-}7)$$

In the above formula, {IAC(j)<IACTH} is a function which stands for "1" when IAC(j)<IACTH is met but for "0" when this condition is not met. When each normalized variance value IAC(n) is smaller than the predetermined threshold IACTH, this negative difference is cumulated as a deterioration quantity.

Accordingly, the deteriorated combustion determining value VAC(j) is obtained by cumulating each quantity of deterioration which is weighted by the difference between the threshold IACTH and the normalized variance value IAC(j), so that effects of values around the threshold can be minimized to precisely reflect the state of deterioration.

Further, the predetermined threshold IACTH in said deteriorated combustion determining value calculation means 104 is updated corresponding to the state of operation of the engine by said threshold updating means 110.

Incidentally, the above-described suffix "j" indicates the number of each cylinder.

As an alternative, the deteriorated combustion determining value VAC(j) may also be determined by using a simpler program and cumulatively counting the number of detections in each of which the normalized variance value IAC(n) is smaller than the threshold IACTH (namely, VAC(j)= $\Sigma\{IAC(j)<IACTH\}$).

Computation results from said deteriorated combustion determining value calculation means 104, such as those described above, are employed at said combustion state controlling means 105. Namely, referring to the deteriorated combustion determining value VAC(j) calculated by said deteriorated combustion determining value calculation means 104, said combustion state controlling means 105 controls the combustion variance adjusting element 106 of the engine with respect to the predetermined reference values from reference value setting means 112.

The combustion variance adjusting element 106 is constructed so that during an operation of the internal combustion engine at the stoichiometric air/fuel ratio, it operates as said fuel injection quantity changing means 210 on the basis of a detection signal from said intercylinder air/fuel ratio variation detecting means 209.

Further, as the reference values for the control of the combustion variance adjusting element 106 by said combustion state controlling means 105, are provided, as in the above-described first and second embodiments, an upper limit reference value (VACTH1) set by upper limit reference value setting means 112U and a lower limit reference value (VACTH2) set by upper limit reference value setting means 112L.

The control by the combustion variance adjusting element 106 is performed so that the deteriorated combustion determining value VAC(j) falls between the upper limit reference value (VACTH1) and the lower limit reference value (VACTH2) by said lean-burn limit operation means 208.

More specifically, the control by the combustion variance adjusting element 106 is performed by correcting the basic injection pulse width upon injection of fuel as described above. The injection pulse width Tinj(j) is calculated in accordance with the following formula:

$$Tinj(j) = TB \times KAFL \times \{1 + KC + KAC(j)\} \times KAP \times \quad (3\text{-}8)$$
$$KAT \times KWUP \times (1 + KAS) \times KFI \pm$$
$$\text{acceleration/deceleration correction value} + Td$$

Further, the correction coefficient KAC(j) in the above formula can be adjusted, as in the above-described first and second embodiments, as will be described next.

Namely, where the deteriorated combustion determining value VAC(j) is greater than the upper limit reference value VACTH1, the combustion variance value is taken as having deteriorated to or beyond the predetermined level. An enriching correction for increasing the fuel injection quantity is therefore performed by calculating a correction coefficient KAC(j) in accordance with the following formula:

$$KAC(j) = KAC(j) + KAR \cdot \{VAC(j) - VACTH1\} \quad (3\text{-}9)$$

This is to calculate the correction value of the rich-side upper right characteristics among the correction characteristics shown in FIG. 7, and KAR is a coefficient indicating the gradient of the characteristics. KAC(j) on the right side indicates a correction coefficient calculated in the preceding computation cycle (n−1) and is updated according to the above formula.

On the other hand, where the deteriorated combustion determining value VAC(j) is smaller than the lower limit reference value VACTH2, the combustion is taken as permitting further leaning so that a leaning correction for reducing the fuel injection quantity is performed by calculating a correction coefficient KAC(J) in accordance with the following formula:

$$KAC(j) = KAC(j) - KAL \cdot \{VAC(j) - VACTH2\} \quad (3\text{-}10)$$

This is to calculate the correction value of the lean-side lower left characteristics shown in FIG. 7, and KAL is a coefficient indicating the gradient of the characteristics.

Further, where the deteriorated combustion determining value VAC(j) is equal to or greater than the lower limit reference value VACTH2 but is equal to or smaller than the upper limit reference value VACTH1, the engine is taken as being in an adequate operation state so that no change is made to the correction coefficient KAC(j) to maintain the fuel injection quantity in the preceding state. This corresponds to horizontal characteristics between the lean-side lower left characteristics and the rich-side upper right characteristics shown in FIG. 7, and forms a dead zone for corrections.

Here, the lower limit reference value VACTH2 and the upper limit reference value VACTH1 are set with a combustion variance target value VACO located at the center therebetween, that is, the lower limit reference value VACTH2 is set at the value of (VACO−ΔVAC) and the upper limit reference value VACTH1 at the value (VACO+ΔVAC).

The combustion variance target value VACO is, as in the above-described first and second embodiments, a value corresponding to a target value (10% or so) of COV (coefficient of variance). By preventing any fuel correction within the range of ΔVAC on both sides of the combustion variance target value VACO, it is possible to avoid a limit cycle which would otherwise be caused by an error due to evaluation of rotational variance within a limited period (128 cycles) or due to computation based on a value smaller than the threshold.

The above-described correction coefficient KAC(j) is designed to be clipped at both upper and lower limits and is set to meet, for example, the following inequality: 0.85<KAC(j)<1.1. The correction coefficient is therefore set to avoid any abrupt correction and to gradually perform a correction so that occurrence of a shock or the like can be prevented and the control can be performed stably.

Further, the deteriorated combustion determining value VAC(j) can be updated every preset number of combustions, for example, every 128 (or 256) cycles. By performing the control while ascertaining the state of combustion over a relative long period, the control can be performed stably and surely while reflecting statistical characteristics.

The misfire determining reference value is set on a combustion deteriorated side of the reference value set by said reference value setting means 112. Based on a change in the normalized variance value IAC(n) toward the combustion deteriorated side beyond the misfire determining reference value, a misfire is determined, information on the misfire is stored at a misfire information address (j) for the current cylinder, and control is performed against the misfire.

Said lean-burn limit operation means 208 is constructed as described above so that a lean-burn limit operation can be performed in a state as required. The correction coefficient KAC(j) detected by this lean-burn limit operation is referred to, and detection of intercylinder air/fuel ratio variations at said intercylinder air/fuel ratio variation detecting means 209 is conducted as described above.

Corresponding to each of the variations, the correction coefficient KCL(j) is calculated as described above. This correction coefficient KCL(j) is incorporated in the following formula:

$$Tinj(j) = TB \times KAFL \times (1 + KCL(j)) \times KAP \times \quad (3\text{-}11)$$
$$KAT \times KWUP \times (1 + KAS) \times KFI \pm$$
$$\text{acceleration/deceleration correction value} + Td$$

By conducting fuel injection at this injector drive pulse width Tinj(j), the correction at the injector drive correction means 211 is performed in an operation at the stoichiometric air/fuel ratio.

The injection of fuel is therefore performed in a stoichiometric operation while taking into account variations in air/fuel ratio among the cylinders.

Figure 24:
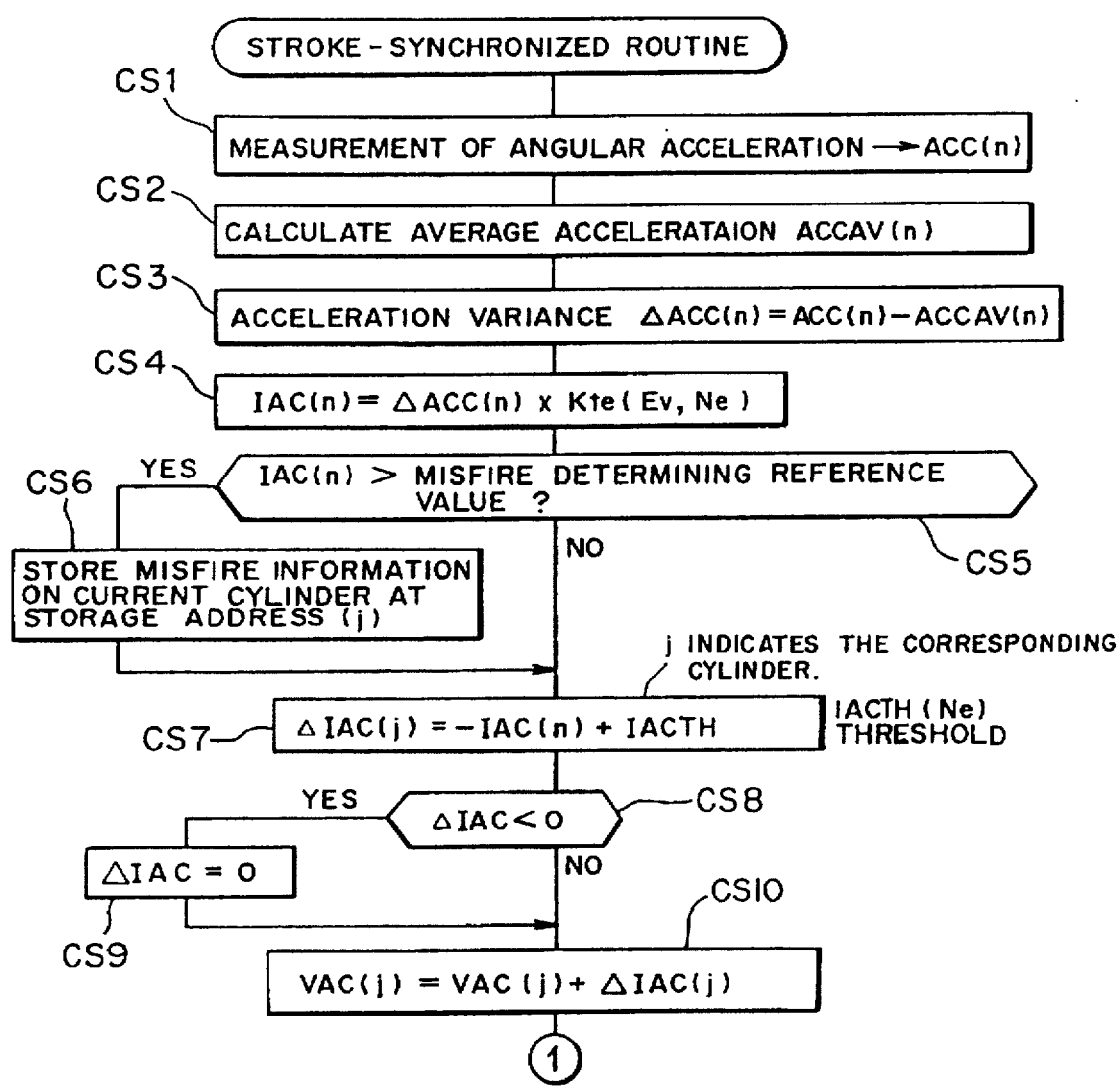
Figure 25:
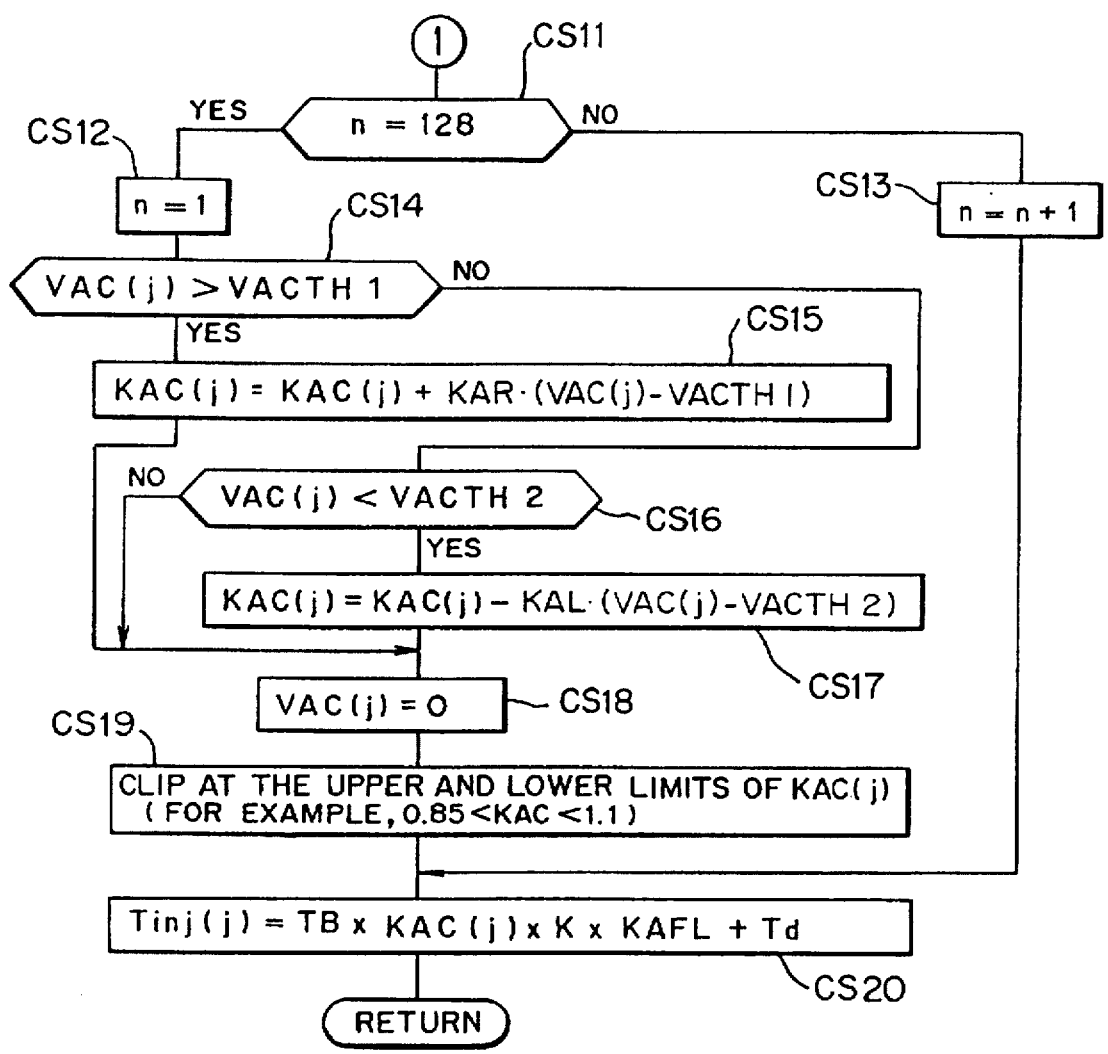
Figure 26:
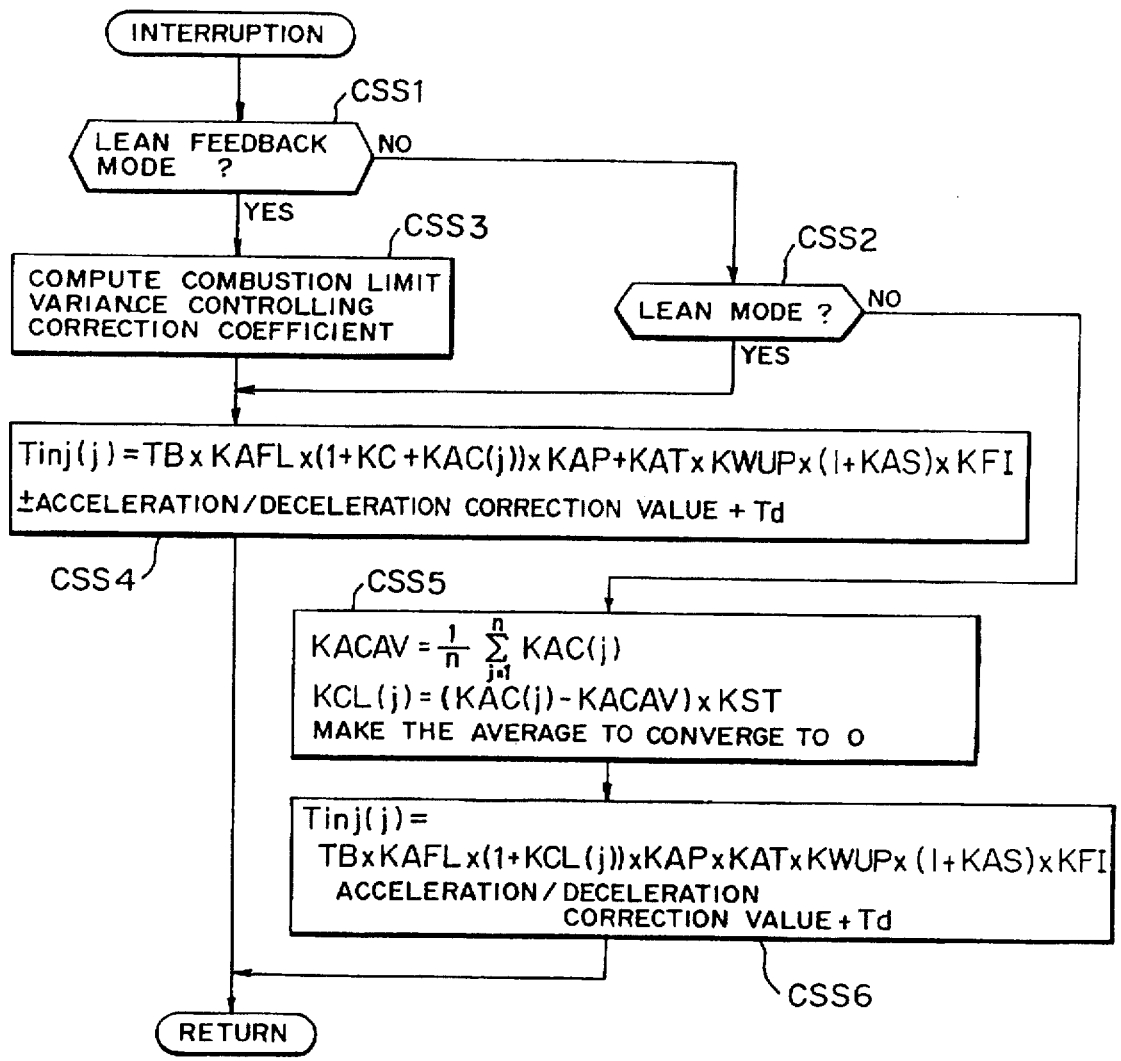
Figure 27:
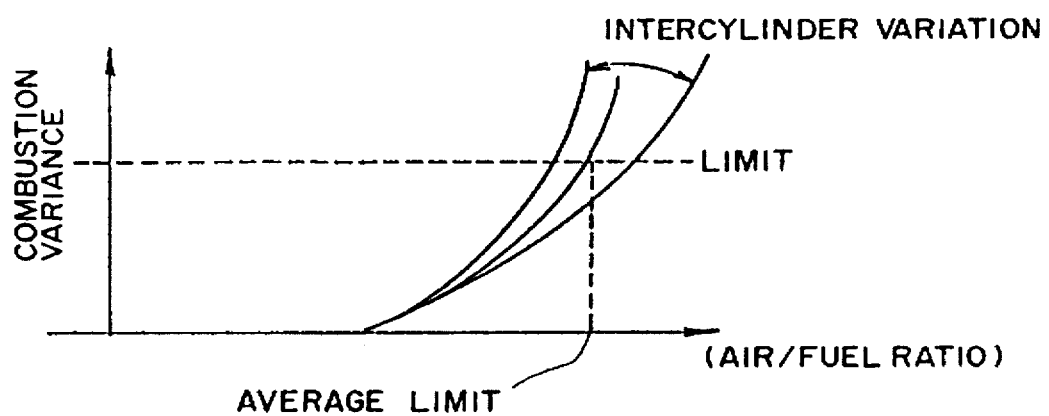
FIG. 27 is a graph showing characteristics of combustion variance in a lean-burn engine.
Figure 28:
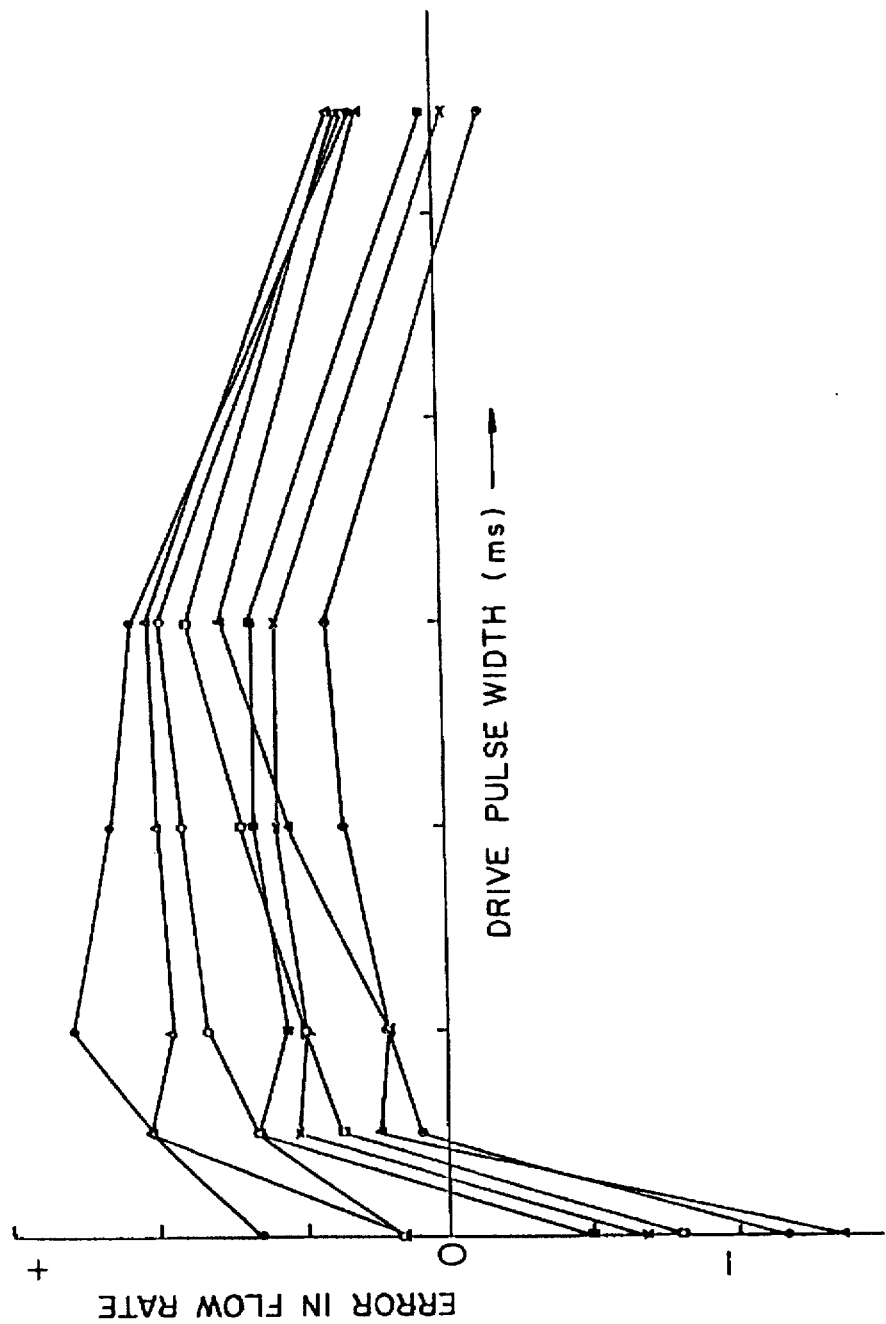
FIG. 28 is a graph illustrating variations in flow rate characteristic among injectors in the engine.
Figure 29:
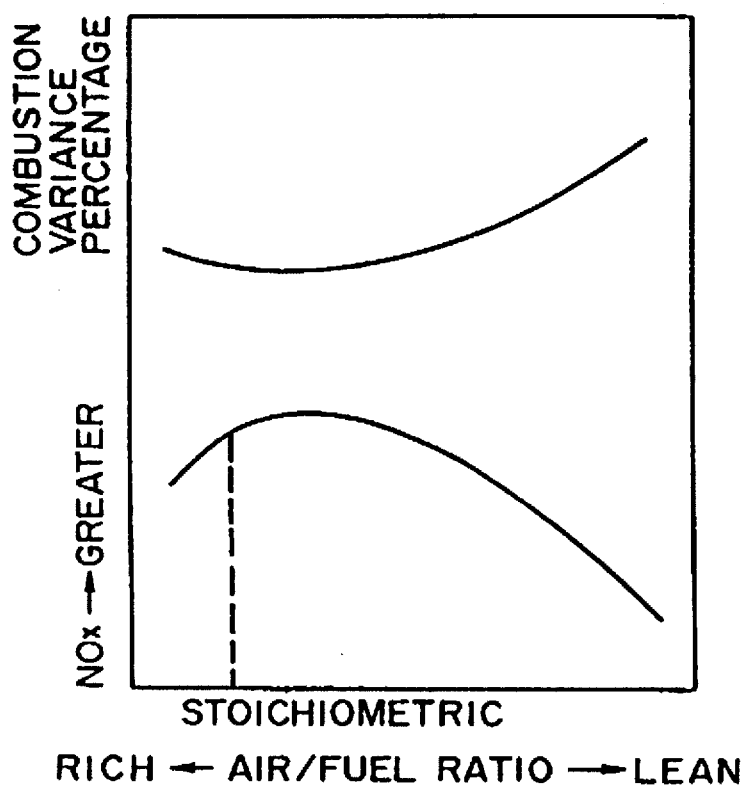
FIG. 29 is a diagram showing relationships between air/fuel ratio and combustion variance and NOx volume.

Since the internal engine combustion controlling method and combustion controlling system according to the third embodiment of the present invention are constructed as described above, operations by the individual means illustrated in FIGS. 22 and 23 are successively performed following the flow charts shown in FIGS. 24 to 26.

Namely, the operations of the flow charts shown in FIGS. 24 and 25 are performed in synchronization with the strokes of the internal combustion engine. First, in step CS1 in FIG. 24, an angular acceleration ACC(n) is detected by said angular acceleration detecting means 107 in FIG. 23, said angular acceleration detecting means constituting said revolution variance detection means 207 in FIG. 22.

Here, computation employed for the detection is performed in accordance with the following formula:

$$ACC(n)=1/TN(n) \cdot \{KL(m)/TN(n)-KL(m-1)/TN(n-1)\} \quad (3\text{-}12)$$

where KL(m) is a segment correction value. To perform correction with respect to the currently identified cylinder so that any error in the measurement of the period due to variations in the angular intervals of the vanes caused upon fabrication and mounting of the vanes can be eliminated, a segment correction value KL(m) is calculated in accordance with the following formula:

$$KL(m)=\{KL(m-3)\times(1-XMFDKFG)+KR(n)\times(XMFDKFD)\} \quad (3\text{-}13)$$

where XMFDKFG represents a segment correction value gain.

On the other hand, KR(n) in the above formula is determined in accordance with the following formula:

$$KR(n)=3 \cdot TN(n)/\{TN(n)+TN(n-1)+TN(n-2)\} \quad (3\text{-}14)$$

This is a measurement value corresponding to an average measurement time period from the measurement time period TN(n-2) of the two measurements ago until the measurement time period TN(n) of the current measurement. Upon calculation of the segment correction value KL(m), the primary filtering processing by the segment correction value gain XMFDKFG is performed by using the above-described formula.

An average acceleration ACCAV(n) is then calculated in step CS2.

Here, ACCAV(n) is the smoothed value obtained by smoothing the detected angular velocity ACC(n) by said smoothing means 108 and is calculated by conducting a primary filtering processing in accordance with the following formula:

$$ACCAV(n)=\alpha \cdot ACCAV(n-1)+(1-\alpha) \cdot ACC(n) \quad (3\text{-}15)$$

where $\alpha$ is an updating gain in the primary filtering processing and takes a value of 0.95 or so.

In step CS3, an acceleration variance value $\Delta ACC(n)$ is next detected by said variance detection means 101.

Namely, by determining the difference between the angular velocity ACC(n) detected by said angular acceleration detection means 107 and the average acceleration ACCAV(n) as the smoothed value obtained by smoothing by said smoothing means 108, an acceleration variance value $\Delta ACC(n)$ is calculated in accordance with the following formula:

$$\Delta ACC(n)=ACC(n)-ACCAV(n) \quad (3\text{-}16)$$

In step CS4, a normalized variance value IAC(n), which is available by normalizing the variance value $\Delta ACC(n)$ outputted from said variance detection means 101 in accordance with the state of operation of the engine, is calculated by said normalized variance value determining means 102 in accordance with the following formula:

$$IAC(n)=\Delta ACC(n) \cdot Kte(Ev,Ne) \quad (3\text{-}17)$$

where Kte(Ev,Ne) is an output correction coefficient and is set by the characteristics shown in FIG. 10.

In the characteristics of FIG. 10 stored as a map, the output correction coefficient Kte(Ev,Ne) is set at ECU 25 from the engine speed Ne calculated from the detection signal of the crank angle sensor 220 or the like and the volumetric efficiency Ev, so that normalization is performed by correction corresponding to an engine output.

Here, a description will be made of control characteristics where normalization is conducted corresponding to an engine output as described above.

Namely, an angular acceleration $\omega'$ is expressed as shown by the following formula:

$$\omega'=1/Ie \cdot (Te-Tl) \quad (3\text{-}18)$$

where Te is an engine torque, Tl is a load torque, and Ie is a moment of inertia.

On the other hand, $$\omega'=\omega_o'+\Delta\omega' \quad (3\text{-}19)$$

where $\omega_o'$ is an average angular acceleration.

From formulae (3-18) and (3-19), $$\begin{aligned}\omega_o' + \Delta\omega' &= 1/Ie \cdot (Te - Tl) \\ &= 1/Ie \cdot (Te_o - Tl) + \Delta Te/Ie\end{aligned}$$

Hence, $\Delta\omega'=\Delta Te/Ie$ \quad (3-20)

Incidentally, according to the above-described detection method of the angular acceleration ACC(n) in step CS1, engine torque information is stored relatively well where no load disturbance exists. Further, as is indicated by formula (3-20), by conducting the control while using a variance $\Delta\omega'$ from the average angular acceleration $\omega_o'$ [acceleration variance value $\Delta ACC(n)$] and the normalized output taking the average output $Te_o$ and the moment of inertia Ie into account [normalized variance value IAC(n)], the control can be performed while taking into account the statistical nature of combustion variance and surely reflecting the combustion variance.

After the operation of step CS4 has been performed, determination of a misfire is then performed in step CS5.

Namely, the misfire determining reference value set by said misfire determining reference value setting means 111 is set on the combustion deteriorated side than the reference value which is set by said reference value setting means 112 and is employed by said deteriorated combustion determining value calculation means 104. It is determined whether or not the normalized variance value IAC(n) has changed toward the combustion deteriorated side beyond the misfire determining reference value. If determined to have changed, occurrence of a misfire is determined.

If this determination has been made, step CS6 is performed to store information on the misfire at the misfire information address (j) for the current cylinder so that control against the misfire is performed.

On the other hand, if no misfire has been determined or after step CS6 has been performed subsequent to determination of a misfire, operations by said deteriorated combustion determining value calculation means 104 in step CS7 to step CS10 are performed, whereby the normalized variance value IAC(n) and the predetermined threshold IACTH are compared and a deteriorated combustion determining value VAC(j) is calculated in accordance with the following formula:

$$VAC(j)=\Sigma\{IAC(j)<IACTH\}\times\{IACTH-IAC(j)\} \quad (3\text{-}21)$$

First, in step CS7, the difference $\Delta IAC(n)$ between the normalized variance value IAC(n) and the predetermined threshold IACTH is calculated and in step CS8, it is then determined whether the difference ΔIAC(n) is negative or not.

This determination corresponds to the function {IAC(j) <IACTH} in the above formula, and an operation is performed to take "1" when IAC(j)<IACTH is met but "0" when this condition is not met.

Namely, when IAC(J)<IACTH is met, ΔIAC(n) is positive. The routine then advances through the "NO" route and cumulation of the deteriorated combustion determining value VAC(j) in step CS10 is performed, resulting in the state that the above-described function takes "1".

When IAC(J)< IACTH is not met, on the other hand, ΔIAC(n) is negative. The routine then advances through the "YES" route and ΔIAC(n)=0 is performed in step CS9. As a consequence, no cumulation of the deteriorated combustion determining value VAC(j) is performed in step CS10, resulting in the state that the above-described function takes "0".

Accordingly, when the normalized variance value IAC(n) is smaller than the predetermined threshold IACTH as indicated by the dots A to D in FIG. 8, these negative differences are cumulated as deterioration quantities.

Accordingly, the deteriorated combustion determining value VAC(j) is obtained by cumulating each deterioration quantity which is weighted by the difference between the threshold IACTH and the normalized variance value IAC(j), so that effects of values around the threshold can be minimized to precisely reflect the state of deterioration.

Further, the predetermined threshold IACTH in said deteriorated combustion determining value calculation means 104 is updated corresponding to the state of operation of the engine by said threshold updating means 110, thereby making it possible to realize an operation state still closer to the lean limit.

Incidentally, the above-described suffix "j" indicates the number of each cylinder. The deteriorated combustion determining value VAC(j) is cumulated with resect to each cylinder j.

Next. step CS11 is performed to determine whether n, which indicates the number of samplings, has exceeded 128 or not.

In other words, it is determined whether or not the integrating range shown in FIG. 8 has been gone through. If not, the routine advances through the "NO" route and step CS13 is performed to increase the number n by "1", whereby step CS20 is performed without conducting any fuel correction. As a consequence, in the integrating range of 128 cycles, the correction by the correction coefficient KAC(j) to the injection pulse width Tinj is not performed and cumulation of the deteriorated combustion determining value VAC(j) is performed primarily.

Accordingly, the deteriorated combustion determining value VAC(j) is updated every preset number of combustions, for example, every 128 cycles. By conducting control while ascertaining the state of combustion over a relatively long period, the control can be performed stably and surely while reflecting statistical characteristics.

Upon an elapse of the integrating period, the routine advances through the "YES" route from step CS11 and step CS12 to step CS18 are performed.

First, the number n is reset to "1" in step CS12. Then, in step CS14 and step CS16, the deteriorated combustion determining value VAC(j) is referred to and is compared with the predetermined reference value set by said reference value setting means 112.

First, the comparison between the deteriorated combustion determining value VAC(j) and the upper limit reference value VACTH1 is performed. When the deteriorated combustion determining value VAC(j) is greater than the upper limit reference value VACTH1, namely, when the deterioration quantity of combustion variance is greater than the upper limit reference value VACTH1 as shown in FIG. 9, calculation of the correction coefficient KAC(j) is performed in step CS15.

$$KAC(j)=KAC(j)+KAR \cdot \{VAC(j)-VACTH1\} \quad (3-22)$$

This is to calculate the correction value of the rich-side upper right characteristics shown in FIG. 7. Taking the combustion variance value as having deteriorated to or beyond the predetermined level, an enriching correction for increasing the fuel injection quantity is performed by calculating the correction coefficient KAC(j).

Here, KAR is the coefficient indicating the gradient of the characteristics. KAC(j) on the right side indicates a correction coefficient calculated in the preceding computation cycle (n−1) and is updated according to the above formula.

On the other hand, where the deteriorated combustion determining value VAC(j) is smaller than the lower limit reference value VACTH2, the routine advances through the "YES" route after step CS16, and the combustion is taken as permitting further leaning so that a leaning correction for reducing the fuel injection quantity is performed by calculating a correction coefficient KAC(j) in accordance with the following formula (see step CS17):

$$KAC(j)=KAC(j)-KAL \cdot \{VAC(j)-VACTH2\} \quad (3-23)$$

This is to calculate the correction value of the lean-side lower left characteristics shown in FIG. 7, and KAL is the coefficient indicating the gradient of the characteristics.

Further, where the deteriorated combustion determining value VAC(j) is equal to or greater than the lower limit reference value VACTH2 but is equal to or smaller than the upper limit reference value VACTH1, the routine advances through the "NO" route after both step CS14 and step CS16. The engine is taken as being in an adequate operation state so that no change is made to the correction coefficient KAC(j) to maintain the fuel injection quantity in the preceding state.

This corresponds to the horizontal characteristics between the lean-side lower left characteristics and the rich-side upper right characteristics shown in FIG. 7, and forms the dead zone for corrections.

Here, the lower limit reference value VACTH2 and the upper limit reference value VACTH1 are set with the combustion variance target value VAC0 located at the center therebetween, that is, the lower limit reference value VACTH2 is set at the value of (VAC0−ΔVAC) and the upper limit reference value VACTH1 at the value (VAC0+ΔVAC).

In this case, the combustion variance target value VAC0 is also the value corresponding to the target value (10% or so) of COV (coefficient of variance). By preventing any fuel correction within the range of ΔVAC on both sides of the combustion variance target value VAC0, it is possible to avoid a limit cycle which would otherwise be caused by an error due to evaluation of rotational within the limited period (128 cycles) or due to computation based on a value smaller than the threshold.

Step CS18 is then performed to reset the deteriorated combustion determining value VAC(j) at "0".

Further, if the correction coefficient KAC(j) is greater or smaller than the upper or lower limit value in step CS19, the correction coefficient is clipped at the limit value on the corresponding side. If KAC(j) is set to fall, for example, within the range of 0.85<KAC(j)<1.1, the correction coefficient is set at 1.1 when the value calculated in step CS15 exceeds 1.1 while the correction coefficient is set at 0.85 when the value calculated in step CS16 is smaller than 0.85.

By gradually conducting correction without conducting any abrupt correction as described above, occurrence of a shock or the like can be prevented and the control can be performed stably.

The correction coefficient KAC(j) is calculated as described above, and by operation of the combustion variance adjusting element 106 as said fuel injection quantity changing means 210 by said lean-burn limit operation means 208, the fuel injection quantity is corrected corresponding to the variance in revolution.

The combustion control for the lean operation and stoichiometric operation by said fuel injection quantity changing means 210 is performed following the flow chart of FIG. 26.

Assuming that running of the vehicle and combustion in the internal combustion engine are in such states that lean feedback control should be performed, it is first determined in step CSS1 whether ECU 25 has been set in a lean feedback mode.

If the setting is the lean feedback mode, the routine advances the "YES" route subsequent to step CSS1, and step CSS3 is performed.

In step CSS3, a correction coefficient KAC(j) corresponding to the combustion limit variance control is calculated and in step CSS4, a fuel injection pulse width Tinj is calculated in accordance with the following formula:

$$Tinj(j) = TB \times KAFL \times (1 + KC + KAC(j)) \times KAP \times KAT \times KWUP \times (1 + KAS) \times KFI \pm \text{acceleration/deceleration correction value} + Td \quad (3\text{-}24)$$

By the correction coefficient KAC(j), correction is therefore made to the basic injection pulse width for fuel injection.

In the lean feedback mode, the leaning correction coefficient KAFL is set at a value corresponding to a lean operation so that the lean operation is performed in accordance with the state of operation of the engine. This leaning correction coefficient KAFL is, however, set for all the cylinders in a wholesale manner, whereby the operation is performed by the same lean burn.

However, the correction to the fuel injection pulse width Tinj by the correction coefficient KAC(j) is performed using different values for the individual cylinders j, so that fuel injection control commensurate with the characteristics of each cylinder is performed.

Using the correction coefficient KAC(j) under such a controlled situation, the fuel injection pulse width Tinj is subjected cylinder by cylinder to correction in a stoichiometric operation while taking into account the variations in air/fuel ratio. The stoichiometric operation is therefore performed in the state that the variations in air/fuel ratio due to the shapes of the intake pipes, the mounting angles of the injectors and the like are corrected.

By the operation with the fuel injection pulse width Tinj corrected as described above, the control of the combustion variance adjusting element 106 by said combustion state controlling means 105 is performed so that the engine is maintained in the desired lean limit operation state. Incidentally, control of the ERG quantity can also be considered as a combustion adjusting element.

If it is determined by the ECU to be out of the lean feed-back mode in step CSS1, on the other hand, the routine advances through the "NO" route so that step CSS2 is performed.

If the lean mode is determined in step CSS2, such calculation and correction of the fuel injection quantity as described above are conducted in step CSS4 so that the predetermined lean operation is performed.

If ECU is determined to be out of the lean mode in step CSS2, step CSS5 and step CSS6 are performed.

In this case, a stoichiometric operation is performed at the stoichiometric air/fuel ratio instead of a lean operation. In this case, the correction of the fuel injection pulse with Tinj by the correction coefficient KC(j) is performed.

First, in step CSS5, the average KACAV of the correction coefficient KAC(j) is calculated in accordance with the following formula:

$$KACAV = (1/n) \cdot \Sigma KAC(j) \quad (3\text{-}25)$$

where $\Sigma KAC(j)$ means the sum for $j=1$ to n.

The deviation of the correction coefficient KAC(j) relative to the average KACAV is then calculated in accordance with the following formula:

$$KCL(j) = (KAC(j) - KACAV) \times KST \quad (3\text{-}26)$$

This deviation KCL(j) is adopted as an intercylinder air/fuel ratio variation at said intercylinder air/fuel ratio variation detecting means 209, whereby correction by said injector drive correction means 211 is performed to make the deviation KCL(j) converge toward "0".

In step ASS6, calculation of the fuel injection pulse width Tinj is then performed in accordance with the following formula:

$$Tinj(j) = TB \times KAFL \times (1 + KCL(j)) \times KAP \times KAT \times KWUP \times (1 + KAS) \times KFI \pm \text{acceleration/deceleration correction value} + Td \quad (3\text{-}27)$$

Accordingly, with respect to each cylinder having a large variation in air/fuel ratio, the fuel injection pulse width Tinj is increased by a degree corresponding to the deviation.

On the other hand, with respect to each cylinder having a small deviation in air/fuel ratio, the fuel injection pulse width Tinj is decreased by a degree corresponding to the deviation.

With respect to each cylinder whose air/fuel ratio is around the average, no change is made to the fuel injection pulse with Tinj so that the previous fuel injection pulse width Tinj is set.

In this mode, the leaning correction coefficient KAFL is set at "1", whereby the change to the fuel injection pulse width Tinj by the leaning correction coefficient KAFL is not made and a stoichiometric operation based on a basic fuel injection pulse width TB set corresponding to the stoichiometric air/fuel ratio is performed in accordance with the state of operation of the engine.

Here, the basic fuel injection pulse width TB is set for all the cylinders in a wholesale manner, whereby the operation is performed at the same air/fuel ratio.

The correction to the fuel injection pulse width Tinj by the correction coefficient KCL(j) is performed using different values for the individual cylinders j, so that fuel injection control commensurate with the characteristics of each cylinder is performed.

By the correction coefficient KCL(j), the fuel injection pulse width Tinj is subjected cylinder by cylinder to correction in correspondence to variations in air/fuel ratio. The operation is therefore performed in the state that the variations in air/fuel ratio due to the shapes of the intake pipes, the mounting angles of the injectors and the like are corrected.

By the operation with the fuel injection pulse width Tinj corrected as described above, the control of the combustion variance adjusting element 106 by said combustion state controlling means 105 is performed so that the engine is maintained at each cylinder thereof in a desired operation state at the stoichiometric air/fuel ratio.

Operations are performed as described above. According to this embodiment, the following effects or advantages are brought about.

(1) It is possible to perform estimation of a combustion variance by taking probabilistic characteristics into account and also to perform an air/fuel ratio control by using the estimation.

(2) Combustion state control of an engine, which has taken statistical nature of a combustion variance into account, can be performed in real time and by an on-vehicle computer.

(3) Differences in combustion variance limit among the cylinders due to variations in air/fuel ratio, which are in turn caused by variations in flow rates through injectors, variations in configuration among intake pipes and/or shifts in valving timing, can be surely corrected, whereby the individual cylinders can all be set at a combustion limit.

(4) Differences among the cylinders due to variations in air/fuel ratio, which are in turn caused by variations in flow rates through injectors, variations in configuration among intake pipes and/or shifts in valving timing, can be surely corrected in an operation at the stoichiometric air/fuel ratio, whereby the individual cylinders can all be controlled in combustion in an ideal state.

(5) A three-way catalyst can be used at a maximum efficiency so that cleaning of exhaust gas can be conducted efficiently.

(6) Owing to the above two items, the emission of NOx can be minimized.

(7) The detection of revolution variance and the correction and control of a variation in air/fuel ratio for each cylinder can be performed by a single crank angle sensor, thereby making it possible to perform surer lean-burn control and stoichiometric operation at low cost.

Capability of exploitation in industry

As has been described above, the present invention has made it possible to perform a lean limit operation in a broader operation range by performing control of the state of combustion in accordance with the state of operation of an engine and also conducting precise combustion control, especially precise combustion control cylinder by cylinder in a lean-burn operation while taking into account the probabilistic and statistical nature of combustion variance. The present invention is therefore suited for use in an engine control system which is mounted on an automotive vehicle and permits an operation with suppressed NOx emission while making an improvement in gas mileage.

We claim:

1. A method for a determination of a state of combustion in an internal combustion engine, comprising:

detecting a variance value in angular acceleration of a rotating shaft driven by said internal combustion engine;

normalizing said variance value in accordance with a state of operation of said internal combustion engine to obtain a normalized variance value;

comparing said normalized variance value with a first threshold to determine a state of deterioration in combustion; and comparing said normalized variance value with a second threshold to detect a misfire said second threshold being set on a more combustion-deteriorated side than said first threshold.

2. The method according to claim 1, wherein said predetermined threshold is updated corresponding to the state of operation of said internal combustion engine.

3. The method according to claim 1, wherein said determination of the state of deterioration in combustion is conducted by detecting a state in which said normalized variance value is smaller than said predetermined threshold.

4. The method according to claim 1, wherein said variance value detecting step includes the following steps, determining an angular acceleration of said rotating shaft, determining a smoothed value of said angular acceleration, and determining a variance value from the difference between said angular acceleration and said smoothed value.

5. A method for a control of a state of combustion in an internal combustion engine, comprising:

detecting a variance value in angular acceleration of a rotating shaft driven by said internal combustion engine;

normalizing said variance value in accordance with a state of operation of said internal combustion engine to obtain a normalized variance value;

comparing said normalized variance value with a first threshold to set a deteriorated combustion determining value;

comparing said deteriorated combustion determining value with a predetermined reference value and controlling a combustion variance adjusting element of said internal combustion engine so that said deteriorated combustion determining value approaches toward said reference value; and comparing said normalized variance value with a second threshold to detect a misfire, said second threshold being set on a more combustion-deteriorated side than said first threshold.

6. The method according to claim 5, wherein an upper limit reference value and a lower limit reference value are provided as said reference value, and said step for comparing said deteriorated combustion determining value with said predetermined reference value includes controlling said combustion variance adjusting element of said internal combustion engine so that said deteriorated combustion determining value falls between said upper limit reference value and said lower limit reference value.

7. The method according to claim 5, wherein said predetermined threshold is updated corresponding to the state of operation of said internal combustion engine.

8. The method according to claim 5, wherein said deteriorated combustion determining value is obtained by cumulating deterioration quantities of combustions in each of which said normalized variance value is smaller by the corresponding deterioration quantity than said predetermined threshold.

9. The method according to claim 8, wherein said deteriorated combustion determining value is updated every preset number of combustions.

10. A system for a control of a state of combustion in an internal combustion engine operable at an air/fuel ratio leaner than a stoichiometric air/fuel ratio, comprising:

variance detecting means for detecting a variance value in an angular acceleration of a rotating shaft driven by said internal combustion engine;

normalized variance value determining means for normalizing said variance value, which has been detected by said variance detecting means, in accordance with a state of operation of said internal combustion engine to determine a normalized variance value;

deteriorated combustion determining value calculating means for comparing said normalized variance value with a first threshold to obtain a deteriorated combustion determining value;

combustion state controlling means for referring to said deteriorated combustion determining value, comparing the same with a predetermined reference value and controlling a combustion variance adjusting element of said internal combustion engine so that said deteriorated combustion determining value approaches toward said reference value; and misfire determining means for comparing said normalized variance value with a second threshold to detect a misfire, said second threshold being set on a more combustion-deteriorated side than said first threshold.

11. A system for a control of a state of combustion in an internal combustion engine operable at an air/fuel ratio leaner than a stoichiometric air/fuel ratio, comprising:

variance detecting means for detecting a variance value in an angular acceleration of a rotating shaft driven by said internal combustion engine;

normalized variance value determining means for normalizing said variance value, which has been detected by said variance detecting means, in accordance with a state of operation of said internal combustion engine to determine a normalized variance value;

combustion state controlling means for performing leaning control of said air/fuel ratio on the basis of said normalized variance value;

rough road determining means for comparing said normalized variance value with a predetermined rough road determining threshold to determine rough road running; and leaning control limiting means for limiting said leaning control of said air/fuel ratio at said combustion state control means on the basis of the results of the determination by said rough road determining means.

12. A method for a control of combustion in a multicylinder internal combustion engine, said method including detecting, with respect to each cylinder, a revolution variance occurred upon operation of said internal combustion engine at an air/fuel ratio on a side leaner than a stoichiometric air/fuel ratio and permitting operation of said internal combustion engine in the vicinity of a lean-burn limit on the basis of the results of said detection, comprising:

changing a fuel injection quantity so that a combustion variance determined from said revolution variance upon lean-burn operation can be held within a permissible range;

detecting variations in intercylinder air/fuel ratio from the quantity of the change of said fuel injection quantity; and correcting, based on the results of said detection, an injector drive time upon operation at said stoichiometric air/fuel ratio.

13. A system for a control of a state of combustion in a multicylinder internal combustion engine, comprising:

revolution variance detecting means for detecting, with respect to each cylinder, a revolution variance occurred when said internal combustion engine is operated at an air/fuel ratio on a side leaner than a stoichiometric air/fuel ratio;

lean-burn limit operation means for operating said internal combustion engine in the vicinity of a lean-burn limit on the basis of the results of the detection by said revolution variance detecting means;

fuel injection quantity change means for changing a fuel injection quantity so that a combustion variance determined from said revolution variance upon lean-burn operation by said lean-burn limit operation means can be held within a permissible range;

intercylinder air/fuel ratio variation detecting means for detecting variations in intercylinder air/fuel ratio from the quantity of the change by said fuel injection quantity changing means; and injector drive correction means for correcting, based on the results of the detection by said intercylinder air/fuel ratio variation detecting means, an injector drive time upon operation at said stoichiometric air/fuel ratio.

14. A method for a determination of a state of combustion in an internal combustion engine, comprising:

detecting a variance value in angular acceleration of a rotating shaft driven by said internal combustion engine;

normalizing said variance value in accordance with a state of operation of said internal combustion engine to obtain a normalized variance value;

comparing said normalized variance value with a predetermined threshold to set a deteriorated combustion determining value; and controlling a combustion variance adjusting element of said internal combustion engine so that said deteriorated combustion determining value falls between a predetermined upper limit reference value and a predetermined lower limit reference value.

15. A method for a determination of a state of combustion in an internal combustion engine, comprising:

detecting a variance value in angular acceleration of a rotating shaft driven by said internal combustion engine;

normalizing said variance value in accordance with a state of operation of said internal combustion engine to obtain a normalized variance value;

comparing said normalized variance value with a predetermined threshold to set a deteriorated combustion determining value, said deteriorated combustion determining value being obtained by cumulating deterioration quantities of combustions in each of which said normalized variance value is smaller than said predetermined threshold; and comparing said deteriorated combustion determining value with a predetermined reference value and controlling a combustion variance adjusting element of said internal combustion engine so that said deteriorated combustion determining value approaches toward said reference value.

16. A method for a determination of a state of combustion in an internal combustion engine, comprising:

detecting a variance value in angular acceleration of a rotating shaft driven by said internal combustion engine;

normalizing said variance value in accordance with a state of operation of said internal combustion engine to obtain a normalized variance value;

comparing said normalized variance value with a predetermined threshold to set a deteriorated combustion determining value, said deteriorated combustion determining value being updated every preset number of combustions; and comparing said deteriorated combustion determining value with a predetermined reference value and controlling a combustion variance adjusting element of said internal combustion engine so that said deteriorated combustion determining value approaches toward said reference value.

* * * * *